United States Patent
Campbell et al.

(10) Patent No.: US 10,565,404 B2
(45) Date of Patent: Feb. 18, 2020

(54) AUTODETECTION OF TYPES AND PATTERNS

(71) Applicant: Microsoft Technology Licensing, LLC, Redmond, WA (US)

(72) Inventors: John Campbell, Woodinville, WA (US); Benjamin Edward Rampson, Woodinville, WA (US); Christian Canton, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

(21) Appl. No.: 15/340,374

(22) Filed: Nov. 1, 2016

(65) Prior Publication Data

US 2017/0124053 A1    May 4, 2017

Related U.S. Application Data

(60) Provisional application No. 62/249,884, filed on Nov. 2, 2015, provisional application No. 62/357,292, filed
(Continued)

(51) Int. Cl.
*G06F 17/24* (2006.01)
*G06F 40/18* (2020.01)
(Continued)

(52) U.S. Cl.
CPC ............ *G06F 40/18* (2020.01); *G06F 3/0482* (2013.01); *G06F 3/04817* (2013.01);
(Continued)

(58) Field of Classification Search
CPC ........................................................ G06F 17/24
See application file for complete search history.

(56) References Cited

U.S. PATENT DOCUMENTS

| 5,255,356 A | 10/1993 | Michelman et al. |
| 5,317,686 A | 5/1994 | Salas et al. |

(Continued)

FOREIGN PATENT DOCUMENTS

| WO | 157744 | 8/2001 |
| WO | 2015065864 | 5/2015 |

OTHER PUBLICATIONS

PCT International Search Report in PCT/US2016/060025, dated Apr. 7, 2017, 23 pages.
(Continued)

*Primary Examiner* — James J Debrow
(74) *Attorney, Agent, or Firm* — Merchant & Gould

(57) ABSTRACT

The present disclosure describes pattern detections for storing multiple values in a compound object. A compound object is a value that stores multiple values in a single cell, wherein those multiple values are organized according to a defined structure. The compound object may store multiple values according to a known defined data structure. In embodiments, the compound object may store multiple values as any nested combination of any one of the known or user-defined data structures (e.g., nesting an array within a vector, or nesting a record within a record, or nesting matrices within a table, etc.). Each of the values stored in the compound object are individually referenceable and can fully participate with spreadsheet functionality including calculations, referencing, and formatting.

20 Claims, 32 Drawing Sheets

Related U.S. Application Data on Jun. 30, 2016, provisional application No. 62/249,869, filed on Nov. 2, 2015, provisional application No. 62/357,284, filed on Jun. 30, 2016.

(51) Int. Cl.

| | |
|---|---|
| *G06F 40/106* | (2020.01) |
| *G06F 40/177* | (2020.01) |
| *G06F 40/197* | (2020.01) |
| *G06F 3/0484* | (2013.01) |
| *G06T 11/60* | (2006.01) |
| *G06F 3/0482* | (2013.01) |
| *G06F 3/0488* | (2013.01) |
| *G06F 3/16* | (2006.01) |
| *G06F 3/0481* | (2013.01) |
| *G06T 11/20* | (2006.01) |
| *G10L 15/26* | (2006.01) |
| *G06K 9/00* | (2006.01) |
| *G10L 13/033* | (2013.01) |
| *G11B 27/00* | (2006.01) |
| *G06F 17/21* | (2006.01) |
| *G06T 1/00* | (2006.01) |

(52) U.S. Cl.
CPC ...... *G06F 3/04842* (2013.01); *G06F 3/04845* (2013.01); *G06F 3/04847* (2013.01); *G06F 3/04883* (2013.01); *G06F 3/162* (2013.01); *G06F 3/165* (2013.01); *G06F 40/106* (2020.01); *G06F 40/177* (2020.01); *G06F 40/197* (2020.01); *G06K 9/00* (2013.01); *G06K 9/00442* (2013.01); *G06K 9/00449* (2013.01); *G06K 9/00463* (2013.01); *G06T 11/206* (2013.01); *G06T 11/60* (2013.01); *G10L 13/033* (2013.01); *G10L 15/26* (2013.01); *G11B 27/00* (2013.01); *G06T 1/0007* (2013.01); *G06T 2200/24* (2013.01)

(56) References Cited

U.S. PATENT DOCUMENTS

| | | | |
|---|---|---|---|
| 5,510,980 A | 4/1996 | Peters | |
| 5,548,703 A | 8/1996 | Berry et al. | |
| 5,890,174 A | 3/1999 | Khanna et al. | |
| 5,933,638 A | 8/1999 | Cencik | |
| 5,983,268 A | 11/1999 | Freivald et al. | |
| 6,138,130 A | 10/2000 | Adler et al. | |
| 6,292,811 B1 | 9/2001 | Clancey et al. | |
| 6,317,758 B1 | 11/2001 | Madsen | |
| 6,377,965 B1 | 4/2002 | Hachamovitch et al. | |
| 6,606,633 B1 | 8/2003 | Tabuchi | |
| 6,631,497 B1 | 10/2003 | Jamshidi et al. | |
| 6,640,234 B1 | 10/2003 | Coffen | |
| 6,701,485 B1 | 3/2004 | Igra et al. | |
| 6,986,099 B2 | 1/2006 | Todd | |
| 6,988,241 B1 | 1/2006 | Guttman et al. | |
| 7,007,033 B1* | 2/2006 | Rothschiller et al. .... G06F 7/00 | |
| 7,076,491 B2 | 7/2006 | Tsao | |
| 7,099,890 B2 | 8/2006 | Cahill et al. | |
| 7,350,141 B2 | 3/2008 | Kotler et al. | |
| 7,424,668 B2 | 9/2008 | DeSpain | |
| 7,461,077 B1 | 12/2008 | Greenwood | |
| 7,647,551 B2 | 1/2010 | Vigesaa et al. | |
| 7,735,003 B1 | 6/2010 | Hearn et al. | |
| 7,761,782 B1 | 7/2010 | Warren et al. | |
| 7,962,436 B2 | 6/2011 | Brelage et al. | |
| 8,091,024 B2 | 1/2012 | Graeber | |
| 8,166,385 B2 | 4/2012 | Garcia-Molina et al. | |
| 8,370,750 B2 | 2/2013 | Adachi et al. | |
| 8,601,361 B2* | 12/2013 | Berger et al. ........... G06F 17/27 | |
| 8,640,022 B2 | 1/2014 | Waldman et al. | |
| 9,020,999 B2 | 4/2015 | Rai | |
| 9,098,484 B2 | 8/2015 | Viry | |
| 9,798,889 B1 | 10/2017 | Karpel et al. | |
| 10,331,771 B2 | 6/2019 | Maresca | |
| 2003/0004853 A1 | 1/2003 | Ram et al. | |
| 2003/0182413 A1 | 9/2003 | Allen et al. | |
| 2005/0097464 A1 | 5/2005 | Graeber | |
| 2005/0119990 A1 | 6/2005 | Lee et al. | |
| 2006/0048044 A1 | 3/2006 | Genesereth et al. | |
| 2006/0179012 A1 | 8/2006 | Jacobs | |
| 2006/0212469 A1* | 9/2006 | Babanov et al. ......... G06F 7/00 | |
| 2007/0050702 A1 | 3/2007 | Chopin et al. | |
| 2007/0078872 A1* | 4/2007 | Cohen ...................... G06F 7/00 | |
| 2007/0136652 A1 | 6/2007 | Ellis et al. | |
| 2008/0046804 A1 | 2/2008 | Rui et al. | |
| 2008/0134089 A1 | 6/2008 | Adachi et al. | |
| 2008/0215959 A1 | 9/2008 | Lection | |
| 2009/0006466 A1* | 1/2009 | Ellis et al. ............... G06F 17/30 | |
| 2009/0044090 A1* | 2/2009 | Gur et al. ............... G06F 15/00 | |
| 2009/0160861 A1 | 6/2009 | Nakano | |
| 2009/0307190 A1 | 12/2009 | Maresca | |
| 2010/0083079 A1 | 4/2010 | Rapp et al. | |
| 2011/0022629 A1 | 1/2011 | Glover | |
| 2011/0314365 A1 | 12/2011 | Messerly | |
| 2012/0151315 A1 | 6/2012 | Campbell et al. | |
| 2012/0192050 A1 | 7/2012 | Campbell et al. | |
| 2012/0324421 A1 | 12/2012 | Boeckenhauer et al. | |
| 2013/0036346 A1 | 2/2013 | Cicerone | |
| 2013/0067305 A1 | 3/2013 | Golan | |
| 2013/0110884 A1 | 5/2013 | Eakins | |
| 2013/0298002 A1 | 11/2013 | Viry | |
| 2014/0074878 A1 | 3/2014 | Bomea et al. | |
| 2014/0122516 A1 | 5/2014 | Brewer et al. | |
| 2014/0359417 A1 | 12/2014 | Bar-On | |
| 2014/0372854 A1 | 12/2014 | Otero et al. | |
| 2014/0372857 A1 | 12/2014 | Otero et al. | |
| 2014/0372952 A1 | 12/2014 | Otero et al. | |
| 2015/0019540 A1 | 1/2015 | Ganjam et al. | |
| 2015/0142418 A1 | 5/2015 | Byron | |
| 2015/0161250 A1 | 6/2015 | Elbaz | |
| 2015/0242093 A1 | 8/2015 | Yost et al. | |
| 2016/0070733 A1 | 3/2016 | Gould | |
| 2016/0117412 A1 | 4/2016 | Mungi et al. | |
| 2017/0124049 A1 | 5/2017 | Campbell et al. | |
| 2017/0124050 A1 | 5/2017 | Campbell et al. | |
| 2017/0124051 A1 | 5/2017 | Campbell et al. | |
| 2017/0124052 A1 | 5/2017 | Campbell et al. | |
| 2017/0124054 A1 | 5/2017 | Campbell et al. | |
| 2017/0337040 A1 | 11/2017 | Salvi et al. | |

OTHER PUBLICATIONS

U.S. Appl. No. 15/340,187, Office Action dated May 18, 2018, 32 pages.
PCT International Preliminary Report on Patentability in PCT/US2016/060025, dated May 8, 2018, 16 pages.
PCT International Preliminary Report on Patentability in PCT/US2016/060180, dated May 8, 2018, 15 pages.
PCT International Preliminary Report on Patentability in PCT/US2016/060190 dated May 8, 2018, 9 pages.
U.S. Appl. No. 15/340,422, Amendment and Response filed May 22, 2018, 18 pages.
European Communications in Application 16798045.7, dated Jun. 8, 2018, 4 pages.
Robin Abraham and Martin Erwig, How to communicate unit error messages in spreadsheets, 30 ACM SIGSOFT Software Engineering Notes, pp. 1-5, 2005.
U.S. Appl. No. 15/340,422, Office Action dated Jun. 13, 2018, 15 pages.
Wilbert O. Galitz, The Essential Guide to user Interface Design 535, 2nd edition, Wiley, 2002, 786 pages.
Chang, et al., "A Spreadsheet Model for Handling Streaming Data", In Proceedings of the 33rd Annual ACM Conference on Human Factors in Computing Systems, Apr. 18, 2015, 4 pages.
PCT Invitation to Pay Additional Fees in PCT/US2016/060180, dated Feb. 9, 2017, 8 pages.
Brian C. Whitmer, "Brigham Young University Improving Spreadsheets for Complex Problems", All These and Dissertations, Paper

(56) References Cited

OTHER PUBLICATIONS

1713, Apr. 8, 2008, http://scholarsarchive.byu.edu/cgi/viewcontent.cgl?artcile=2712&context=etd, pp. 1-7, 15-26.
PCT International Search Report and Written Opinion in PCT/US2016/060180, dated Jul. 12, 2017, 22 pages.
Han et al., "Situational data integration with data services and nested table", Service Oriented Computing and Applications, vol. 7, No. 2, Apr. 27, 2012, pp. 129-150.
PCT Second Written Opinion in PCT/US2016/060188, dated Sep. 13, 2017, 7 pages.
PCT International Search Report in PCT/US2017/040251, dated Dec. 18, 2017, 14 pages.
PCT International Preliminary Report on Patentability in PCT/US2016/060188, dated Feb. 12, 2018, 8 pages.
U.S. Appl. No. 15/340,422, Office Action dated Feb. 22, 2018, 10 pages.
"Setting up Excel Spreadsheets for Single Item or Compound Object Metadata", Published on: Sep. 7, 2015, 6 pages, available at: http://www.nyheritage.org/sites/default/files/docs/MetadataExcel.pdf.
An Introduction to Data Validation in Excel, Published on: Mar. 15, 2014, http://trumpexcel.com/2014/03/learn-all-about-data-validation-in-excel/, 4 pages.
Canton et al., "Compound Data Types", Oct. 2, 2015, 16 pages.
Canton et al., "Condensed Core Design", Jul. 30, 2015, 312 pages.
Canton et al., "Rich Data Types", Jul. 30, 2015, 217 pages.
Chang, et al., "A spreadsheet model for using web service data", In Proceedings of IEEE Symposium on Visual Languages and Human-Centric Computing, Jul. 28, 2014, 8 pages.
Chang, et al., "Creating interactive web data applications with spreadsheets", In Proceedings of the 27th annual ACM symposium on User interface software and technology, Oct. 5, 2014, pp. 87-96.
Create an Excel Drop Down list with Search Suggestions, Published on: Oct. 19, 2013, http://trumpexcel.com/2013/10/excel-drop-down-list-with-search-suggestions/, 11 pages.
French, Ted, "Convert Measurements in Excel", Published on: Mar. 18, 2011, http://spreadsheets.about.com/od/excel2010functions/ss/2011-03-18-Convert-Measurements-In-Excel-2010.htm, 4 pages.
Hoydahl, Jan, "Cominvent AS—Enterprise Search Consultants", Published on: Jan. 25, 2012, http://www.cominvent.com/2012/01/25/super-flexible-autocomplete-with-solr/, 4 pages.
In-Cell Dropdown and Validation in Spreadsheets, Published on: Aug. 26, 2010, http://googledrive.blogspot.in/2010/08/in-cell-dropdown-and-validation-in.html, 27 pages.
Levoy, Marc, "Spreadsheets for Images", In Proceedings of 21st International ACM Conference on Computer Graphics and Interactive Techniques, Jul. 24, 1994, 8 pages.
Lim, Jon, "Google Spreadsheets: COUNT with Multiple Values in Cells", Published on: Apr. 7, 2014, http://jonlim.ca/2014/04/google-spreadsheets-count-multiple-values-cells/, 5 pages.
Sartain, JD., "How to create relational databases in Excel 2013", Published on: Aug. 7, 2014, http://www.ocworld.com/article/2462281/how-to-create-relational-databases-in-excel-2013.html, 11 pages.
Singh, et al., "Transforming Spreadsheet Data Types using Examples", In Proceedings of Annual Symposium on Principles of Programming Languages, Oct. 26, 2015, 13 pages.
Trevi, Javier, "Showing all available MySQL data types when creating a new table with MySQL for Excel", Published on: Jul. 23, 2014, https://blogs.oracle.com/MySqlOnWindows/entry/showing_all_available_mysql_data, 8 pages.
Use Formula AutoComplete, Retrieved on: Oct. 26, 2015, https://support.office.com/en-us/article/Use-Formula-AutoComplete-6d13daa5-e003-4431-abab-9edef51fae6b, 4 pages.
PCT International Search Report in PCT/US2016/060190, dated Feb. 9, 2017, 13 pages.
Kongdenfha et al., "Rapid development of spreadsheet-based web mashups", International World Wide Web Conference 18th ACM, Madrid, Apr. 20, 2009, 10 pages.
PCT International Search Report in PCT/US2016/060188, dated Feb. 15, 2017, 13 pages.
Bakke et al., "A spreadsheet-based user interface for managing plural relationships in structured data", Human Factors in Computing Systems, May 7, 2011, 10 pages.
Kapros et al., "Updating database schemas without breaking the UI: modeling using cognitive semantic categories" Proceedings of the 2014 ACM Sigchi Symposhium on Engineering Interactive Computing System, Jun. 17, 2014, 9 pages.
"Final Office Action Issued in U.S. Appl. No. 15/340,187", dated Jan. 2, 2019, 52 pages.
"Non-Final Office Action Issued in U.S. Appl. No. 15/340,201", dated Jan. 2, 2019, 14 pages.
"PCT International Preliminary Report on Patetability in PCT/US2017/040251", dated Jan. 1, 2019. 8 pages.
"Final Office Action Issued in U.S. Appl. No. 15/340,251", dated Mar. 6, 2019, 17 Pages.
"Final Office Action Issued in U.S. Appl. No. 15/340,422", dated Feb. 11, 2019, 12 Pages.
"Creating Compound Objects", Retrieved From: https://mediawiki.middlebury.edu/wikis/LIS/images/b/bd/Compound-wizard.pdf, Retrieved On: Sep. 2, 2010, pp. 1-34.
"Non Final Office Action Issued in U.S. Appl. No. 15/340,251", dated Aug. 10, 2018, 17 Pages.
"Non Final Office Action Issued in U.S. Appl. No. 15/340,321", dated Oct. 17, 2018, 11 Pages.
"Non Final Office Action Issued in U.S. Appl. No. 15/340,422", dated Sep. 26, 2018, 11 Pages.
"Notice of Allowance Issued in U.S. Appl. No. 15/340,422", dated Jun. 10, 2019, 6 Pages.
"Advisory Action Issued in U.S. Appl. No. 15/340,187", dated Mar. 26, 2019, 5 Pages.
"Non-Final Office Action Issued in U.S. Appl. No. 15/340,187", dated May 1, 2019, 60 Pages.
"Final Office Action Issued in U.S. Appl. No. 15/340,201", dated Jul. 11, 2019, 15 Pages.
"Final Office Action Issued in U.S. Appl. No. 15/340,321", dated Jul. 5, 2019, 13 Pages.
"Non Final Office Action Issued in U.S. Appl. No. 15/340,251", dated Oct. 3, 2019, 19 Pages.
Zarowin, Stanley, "Hiding Cells in Excel-just One or Two or Even 100 at a Time", In Journal of Accountancy, Oct. 1, 2008, pp. 1-2.
"Notice of Allowance Issued in U.S. Appl. No. 15/340,187", dated Sep. 18, 2019, 9 Pages.
"Advisory Action Issued in U.S. Appl. No. 15/340,321", dated Sep. 24, 2019, 6 Pages.
"Non Final Office Action Issued in U.S. Appl. No. 15/340,321", dated Nov. 4, 2019, 12 Pages.

* cited by examiner

| | | | | | | | | |
|---|---|---|---|---|---|---|---|---|
| File | Home | Insert | Page Layout | Forumlas | Data | Review | View | |

Paste — Cut / Copy / Format Painter | Calibri ∨ 8 pt. ∨ / B I U ∨ / A˄ A˅ / ◇ ∨ A ∨ | ≡ ≡ ≡ / ≡ ≡ ≡ / ab∨ ↕∨ | General ∨ / $ ∨ % , / ←.0 .00 / .00 →.0 | Conditional Formatting ∨ / Format as Table ∨ / Cell Styles ∨

Clipboard | Font | Alignment | Number | Styles

A2 | ∨ | $f_x$

| | A | B | C | D | E | F | G | H |
|---|---|---|---|---|---|---|---|---|
| 1 | Player | Position | Year | Height | City | | | |
| 2 | Desmond Smith | DB | Soph. | 5'11" | Detroit, MI | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |

1004 → (pointing to E2)

1002 ←

1006 (pointing to popup)

Suggested Type: Football Player

| First Name | Blake |
|---|---|
| Last Name | Smith |
| Position | DB |
| Height | 5'11" |
| Year | Sophomore |
| City | Detroit |

[ OK ]  [ Cancel ]

FIG. 10

AUTODETECTION OF TYPES AND PATTERNS

CROSS-REFERENCE TO RELATED APPLICATIONS

This application claims priority to U.S. Provisional Application Ser. No. 62/249,884, filed Nov. 2, 2015 and entitled "Compound Data Objects;" U.S. Provisional Application Ser. No. 62/357,292, filed Jun. 30, 2016 and entitled "Compound Data Objects;" U.S. Provisional Application Ser. No. 62/249,869, filed Nov. 2, 2015 and entitled "Rich Data Types;" and U.S. Provisional Application Ser. No. 62/357,284, filed Jun. 30, 2016 and entitled "Rich Data Types," the disclosures of which are incorporated herein by reference in their entirety.

BACKGROUND

Spreadsheet applications are used to organize and store data. Users typically store such data in a plurality of cells, wherein each cell holds a single value (e.g., a string, number, error, etc.). Users typically organize such values within columns and rows such that related values are stored within the same row or column of the spreadsheet. Still further, such columns or rows each typically include a header cell that stores a description of the values within that row or column. Because only a single value is stored in a single cell, spreadsheets can become extensive and cumbersome, especially if one or more values are related to other values, which need to be stored in adjacent cells or looked up on a different range or sheet. This type of organization oftentimes leads to large, complex spreadsheets, which are may be difficult to consume and comprehend. Furthermore, present spreadsheet applications are limited to understanding and operating on the following values: strings, numbers, scalar values, Booleans, and errors. This limited availability of data structures on which spreadsheet applications can operate requires users to construct complex spreadsheets, oftentimes implementing multiple tables and various lookups to work around such limitations.

It is with respect to these and other general considerations that embodiments have been described. Although relatively specific problems have been discussed, it is understood that the embodiments should not be limited to solving the specific problems identified in the background.

SUMMARY

The present disclosure describes pattern detections for storing multiple values in a compound object. A compound object is a value that stores multiple values in a single cell, wherein those multiple values are organized according to a defined structure. The compound object may store multiple values according to a known defined data structure such as, for example, a record, vector, matrix, table, or array. In other embodiments, the compound object may store multiple values as another defined data structure, such as, for example, a user-defined data structure. In other embodiments, the compound object may store multiple values as any nested combination of any one of the known or user-defined data structures (e.g., nesting an array within a vector, or nesting a record within a record, or nesting matrices within a table, etc.). Each of the values stored in the compound object are individually referenceable and can fully participate with spreadsheet functionality including calculations, referencing, and formatting.

In a first aspect, this disclosure describes a computer-implemented method for pattern identification associated with an input to a cell of a spreadsheet, comprising: receive a first value in a first cell; receive a second value in a second cell; identify a pattern corresponding to the first value and the second value, wherein the pattern is related to a schema; and based on identification of the pattern, store the first value and the second value in an object defined by the schema.

In a second aspect, this disclosure describes a computer-implemented method for pattern identification associated with an input to a cell of a spreadsheet, comprising: receive a first value in a cell; receive a second value in the cell; create an object storing the first value and the second value; identify a pattern corresponding to the first value and the second value, wherein the pattern is related to a schema; and based on identification of the pattern, store the first value and the second value in an object defined by the schema.

In a third aspect, this disclosure describes a system comprising: at least one processing unit; and at least one memory storing computer executable instructions that, when executed by the at least one processing unit, cause the system to perform a method, the method comprising: receiving a first value in a first cell; receiving a second value in a second cell; identifying a pattern corresponding to the first value and the second value, wherein the pattern is related to a schema; and based on identification of the pattern, storing the first value and the second value in an object defined by the schema.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 2B illustrates a compound object that stores, in a single cell, a plurality of values organized according to an example record data structure.

FIG. 3A illustrates an example compound object stored in a single cell of a spreadsheet.

FIG. 5B illustrates an example card view from which a compound object can be created.

FIG. 5C illustrates an example embodiment in which a compound object can be edited from the card view.

FIG. 6A illustrates an example embodiment in which values of a compound object are referenced.

FIG. 6C illustrates an example embodiment in which values of multiple compound objects can be referenced and used in calculations.

FIG. 6D illustrates an example embodiment in which an error message is displayed in response to a formula referencing incompatible values from one or more compound objects.

FIG. 6E illustrates an example embodiment in which values of multiple compound objects are referenced and used in calculations.

FIG. 7B illustrates a compound object including a calculated field as viewed from the card view.

FIG. 7C illustrates a compound object including a calculated attribute that can be referenced.

FIG. 8A illustrates an example embodiment in which a referenced part of the compound object is focused in the formula definition.

FIG. 8B illustrates an example embodiment in which a referenced part of the compound object is focused in the formula definition.

FIG. 9B illustrates an example embodiment in which the values stored in multiple cells of a row or a column are collapsed into a compound object stored in a single cell.

FIG. 10 illustrates pattern matching an input to a compound object.

DETAILED DESCRIPTION

Figure 1:
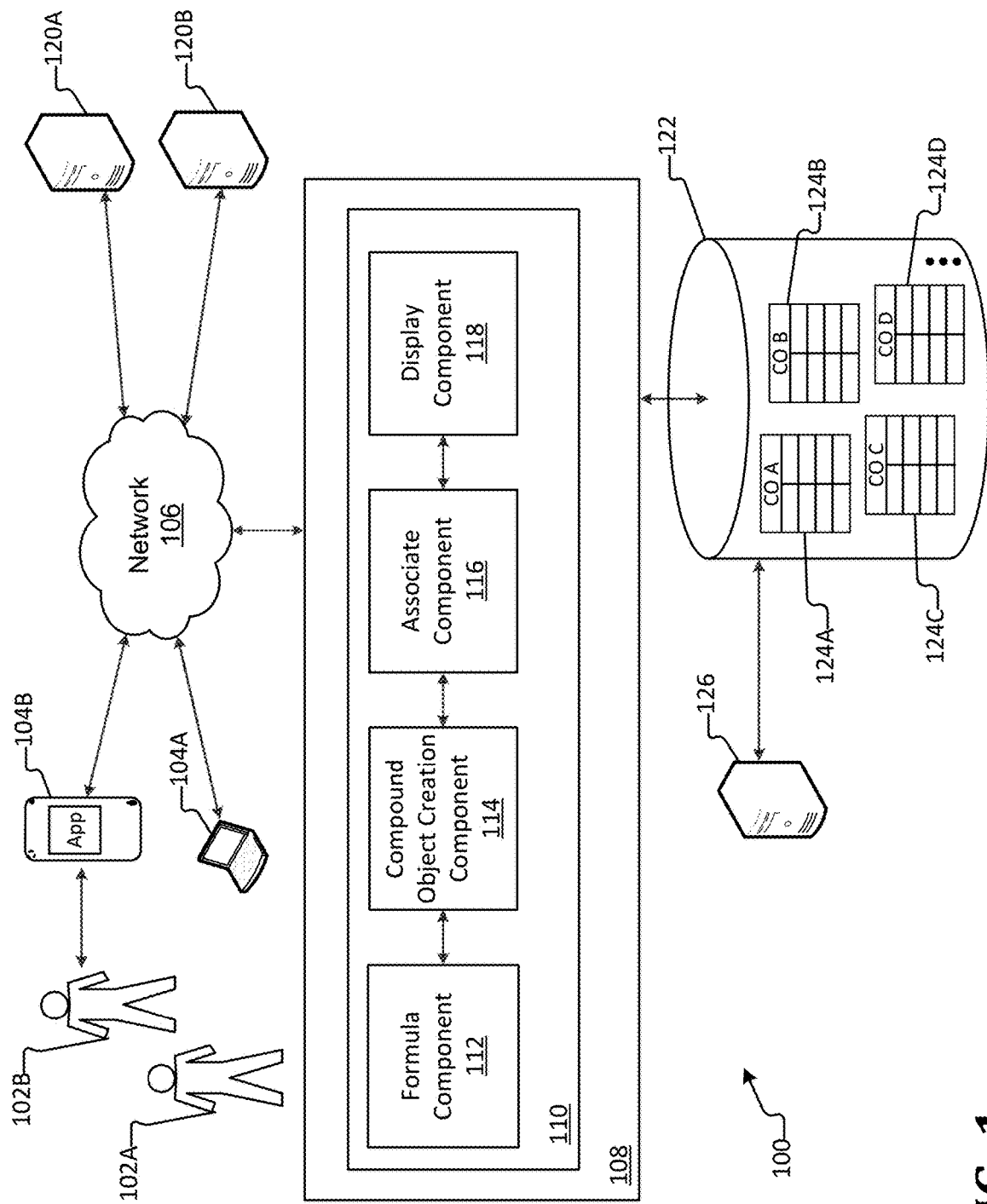
FIG. 1 illustrates a system for implementing compound data types in a spreadsheet application.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure provides a novel approach to storing multiple values in a single cell. In particular, the present disclosure provides a value referred to herein as a compound object that stores multiple values in a single cell, wherein those multiple values are organized according to a defined structure. The compound object may store multiple values according to a known defined data structure such as, for example, a record, vector, matrix, table, or array. In other embodiments, the compound object may store multiple values as another defined data structure, such as, for example, a user-defined data structure. In other embodiments, the compound object may store multiple values as any nested combination of any one of the known or user-defined data structures (e.g., nesting an array within a vector, or nesting a record within a record, or nesting matrices within a table, etc.). Each of the values stored in the compound object are individually referenceable and can fully participate with spreadsheet functionality including calculations, referencing, and formatting. In the example of a record data structure, values are organized in attribute-value pairs such that each value is stored with a corresponding attribute that describes the particular value. In some embodiments, the attribute can be used to individually reference the corresponding value. For example, a formula may reference the attribute and obtain, as a result, the corresponding value. In the example of an array data structure, a value can be referenced by an index of the value. For example, a formula can reference the cell in which the compound object is stored and an index of the array to obtain, as a result, the corresponding value. Formulas can also take into account nested values in order to appropriately reference a nested value. For example, an array may be nested within a record. Referencing a value of the nested array may reference the attribute of the record storing the nested array and the particular index of the nested array to obtain the nested value. Types of values that can be stored in a compound object may be, for example, string values, numerical values, error values, and Boolean values. A compound object may further store extended values such as, for example, graphs, charts, images, audio files, video files, dynamically updatable data, etc.

As described herein, compound objects may store nested values to multiple levels of depth. By contrast, in present spreadsheet applications, cells can only store a single value. Accordingly, in present spreadsheet applications, multiple related values are spread across multiple cells in various rows and columns, requiring users to use other methods such as formatting styles or descriptive headers and document structure to keep sets of data that represent an object together for consumption. Compound objects make it possible to logically store information in a spreadsheet that best represent a user's needs while also providing the ability to fully participate with spreadsheet functionality. Accordingly, compound objects may be used to more efficiently, logically, and compactly store multiple related values in a single cell.

Novel aspects of the present disclosure further provide the ability to extend compound objects to include user-defined compound object types. A compound object type is a structural definition of a compound object that can be reused or shared. In some embodiments, the structural definition of the compound object may be expressed by a schema. A schema may identify the data structure by which the values are organized (e.g., record, vector, matrix, table, array, or other data structure) and properties of the compound object (e.g., types of values to be received, a particular pattern by which values are received, cell and card views, validation rules, behavior of the compound object in calculations, etc.). Accordingly, a compound object type can be stored, reused or shared, and populated with values, which are stored according to the defined structure. In an example, a "Person" compound object type may be defined and stored so as to be reused or shared. The "Person" compound object type therefore defines a particular structure by which values are stored within the compound object. For example, the "Person" compound object type may define a structure as a record, for example. As is described herein, a record data structure organizes values in attribute-value pairs. Therefore, the "Person" compound object type may define a record of attributes so that when the "Person" compound object type is opened and ready to be populated with values, the attributes are provided and organized according to the pre-defined structure. In some embodiments, the "Person" compound object type may have a nested definition, such as, for example, a matrix stored within a record. In such an example, the "Person" compound object type may include attributes (of the record) such as "First Name," "Last Name," and "Scores" wherein the "Scores" attribute include a nested matrix of test scores. Regardless of the structure, each value stored in a compound object type is individually referenceable and can fully participate in spreadsheet functionality. Such user-defined compound object types can be stored in a local or shared database and can be reused or shared among users. In such an embodiment, the structural definition, or the schema, of the user-defined compound object type is stored and reused or shared. Accordingly, another user can open the stored compound object type having and populate it with the user's own values, wherein the populated values are organized according to the defined structure.

Aspects of the present disclosure further provide extending standard spreadsheet features to function with user-defined compound data types. In an example, spreadsheet features, such as, for example, sort or filter used to organize tables may be extended to also work inside a compound object type including a table data definition. Furthermore, user-defined compound object types may also be extended to include additional or customized spreadsheet functionality. For example, when providing values to be stored in a compound object type, the spreadsheet application may display customized autocomplete features. In some embodiments, extended spreadsheet functionality associated with the user-defined compound object type can also be stored and accessible to other applications, products, or users. Such features will be described in further detail herein.

Additionally provided in the present disclosure is a cell view and card view user interface from which compound objects may be viewed. The cell view user interface may display a subset of values stored in the compound object (including string values, numerical values, images, etc.) and viewable among other cells. The cell view user interface may further specify that the cell stores a compound object so as to indicate to a user that additional values are stored therein. The card view user interface may be an expanded view that displays all or more values stored in the compound object. Such user interfaces can be used to display features of the compound object, including, for example, the compound object type name, if any, values, attributes, etc. Custom rendering may also be implemented to view the information stored in a compound object. For example, a compound object may store the name of a city and the card view may display the location of the city on a map rendering. In another example, the compound object may store a person's daily exercise information (e.g., number of steps, running distance, heart rate, etc.) and the card view (or cell view) may display a dashboard rendering of the various statistics. The card view can also be used to edit the compound object. Example editing features that may be performed from the card view include, but are not limited to, copy/cut/paste data, creation or deletion of new rows or columns, sorting/filtering, editing data, etc. Such features will be described in further detail herein.

Compound objects can be used to store a variety of information. In an example, a compound object may store information about a person. Such a compound object may store, for example, a record of a person, including attributes such as a person's first name, last name, social security number, phone number, and address and associated values. As yet another example, a compound object may store a record of a car that stores, in a single cell, multiple car attributes, such as, for example, make, model, year, color, engine type, and price, and associated values. In another example, a compound object may store an array of charts. For example, a 10×10 array of charts can be stored in a compound object, wherein each chart displays the population of each state over the last 100 years. Accordingly, each value of the array may represent a chart for a particular year. Accordingly, when a value in the array is referenced, the chart for the referenced year is presented. In yet another example, a compound object may store a record of a company that stores, in a single cell, multiple company attributes such as, for example, company name, address, telephone number, and a list of board members and associated values. In this example, the list of board members may store a 1×n array and each value in that array stores a record that includes information about that board member (e.g., name, phone number, email address, division, product responsibility, etc.). This is an example of a nested compound object. In another example, a compound object stores an array of stock records in a single cell, wherein the array contains 52 weeks of records and each record represents a specific trading day within the 52 weeks. For example, the compound object can store an array of records, wherein each stock record stores multiple attributes, such as, for example, an open attribute, a close attribute, a volume attribute, a high attribute, a low attribute and associated values. Alternatively, the open attribute, close attribute, volume attribute, high attribute, and low attribute may be represented in a table wherein each of the attributes are column headers and the rows represent a week or day. In yet another example, a compound object may store a record of a product that stores, in a single cell, multiple product attributes, such as, for example, the product name, pricing information, sales information, part names, and associated values. Furthermore, in this example, the value associated with the part names attribute may store a table. That table may include, for example, parts listed in a single column and specifications associated with each part listed in multiple rows. Such specifications may include, for example, the part number, part price, part dimensions, part material, and vendor name. Still further, the value associated with the vendor name may be a 5 value array, wherein the first value represents the vendor name, the second value represents the vendor street number and street name, the third value represents the city and state, the fourth value represents the zip code, and the fifth value represents the phone number. Accordingly, it is understood that compound objects may nest values within other values according to a defined structure to multiple levels of depth. Although only a few examples are described, it is understood that compound objects are used to store and display a wide variety of values in any combination of known or user-defined data structures. Additionally, compound objects make available to the calculation engine of the spreadsheet application each value stored therein and the structure by which those values are arranged. Thus, each value, whether nested or not, can be referenced and used by the spreadsheet application's calculation engine to perform a variety of functions.

Novel aspects of the present disclosure therefore provide methods and systems for storing, in a single cell, a compound object that stores multiple values organized according to a defined structure. Further novel aspects provide the ability to make available to the spreadsheet application, each value and the defined structure. By doing so, the calculation engine of the spreadsheet application can perform calculations on values stored within the compound object. For example, a compound object can be provided as a parameter in a charting formula. Based on an understanding of the structure of the compound object and the values stored therein, the calculation engine can return a chart. In some embodiments, the chart includes one or more values stored in the compound object and in other embodiments, the chart also includes values not stored in the compound object.

In present spreadsheet applications, cells can only store a single value. Accordingly, spreadsheets can easily become large, highly complex, and unorganized. Accordingly, compound objects may be used to more efficiently, more logically, and more simply store information because multiple values can be stored in a single cell rather than spread across numerous rows and columns of a spreadsheet. Compound objects can greatly reduce the overall size and complexity of a spreadsheet as well as provide users to define domain specific data structures and behaviors.

FIG. 1 illustrates a system 100 for implementing compound data types in a spreadsheet application, according to an example embodiment.

As illustrated, system 100 may include one or more client computing devices 104 (e.g., client computing devices 104A and 104B) that may execute a client version of a spreadsheet application capable of storing multiple attributes and values as a compound object in a single cell of a spreadsheet. In some examples, the client spreadsheet application may execute locally on a client computing device 104. In other examples, a client spreadsheet application (e.g., a mobile app on a thin client computing device 104) may operate in communication (e.g., via network 106) with a corresponding server version of spreadsheet application 110 executing on one or more server computing devices, e.g., server computing device 108. In still other aspects, rather than executing a client version of a spreadsheet application, the one or more client computing devices 104 may remotely access, e.g., via a browser over network 106, the spreadsheet application 110 implemented on the server computing device 108 or multiple server computing devices (e.g., in a distributed computing environment such as a cloud computing environment).

As illustrated by FIG. 1, a server version of spreadsheet application 110 is implemented by server computing device 108. As should be appreciated, the server version of spreadsheet application 110 may also be implemented in a distributed environment (e.g., cloud computing environment) across a plurality of server computing devices (not shown). Moreover, as should be appreciated, either a client or a server version of the spreadsheet application 110 may be capable of storing compound objects and schemas in a spreadsheet. While a server version of the spreadsheet application 110 and associated components 112-118 are shown and described, this should not be understood as limiting. Rather, a client version of spreadsheet application 110 may similarly implement components 112-118 on a client computing device 104.

In a basic configuration, the one or more client computing devices 104 are personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client spreadsheet application and/or remotely accessing spreadsheet application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the spreadsheet application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud computing environment). Server computing device 108 may provide data, including compound objects or schemas, to and from the one or more client computing devices 104 and/or one or more other server computing devices (e.g., server computing devices 120A and/or 120B) via network 106.

As used herein, each compound object or schema may be stored and may be retrieved based on a reference pointer or a file locator, which may be a uniform resource locator (URL) identifying a file path from a local storage location or a remote storage location. For instance, one or more compound objects (e.g., objects 124A, 124B, 124C, and 124D) may be stored in a storage location (e.g., storage 122) accessible to spreadsheet application 110. As described herein, a schema is the structural definition of a compound object that may be stored, reused, and shared among users and applications.

In some examples, the one or more compound objects or schemas may be stored in different storage locations within a distributed environment (e.g., cloud computing environment) accessible to spreadsheet application 110 over a network, e.g., network 106. As described herein, the location of a compound object or schema in storage may be represented by a reference pointer, a file locator, which may be a URL to local storage or to remote storage accessible over a network. In particular, a URL may provide a file path to a storage location hosted by a third party (e.g., Dropbox®, etc.), in a public or private cloud storage location (e.g., OneDrive®, iCloud®, Amazon® Cloud Drive, etc.), in an enterprise storage location (e.g., SharePoint®, etc.), in a public storage location accessed over the Internet, and the like.

As illustrated in FIG. 1, the spreadsheet application 110 may include various components for creating, editing, and storing compound objects or schemas, including, for example, a formula component 112, a compound object creation component 114, an associate component 116, and a display component 118. In aspects, each component may communicate and pass data between the other components. The various components may be implemented using hardware, software, or a combination of hardware and software. Moreover, the various components may be executed on a single server computing device (e.g., server computing device 108), on multiple server computing devices (e.g., server computing devices 120A, 120B and/or 126), or locally on a client computing device (e.g., client computing device 104A or 104B). Although four specific components are described and illustrated, it is understood that the present disclosure is not meant to be limited to such a configuration and more or fewer components may be used to implement aspects of the present disclosure.

As described above, the spreadsheet application 110 may be configured to store, in a single cell of a spreadsheet, a compound object. As should be appreciated, while examples and descriptions provided herein may generally reference storing, in a single cell of a spreadsheet, a compound object having multiple values organized according to one or more known or user-defined data structures, the methods and systems described may similarly be applied to multiple compound objects stored in multiple cells or a single compound object expanded across multiple cells. In cases where application of the methods or systems may differ, additional disclosure will be provided.

In aspects, the formula component 112 may provide a user interface such as a formula bar or another user interface in which a formula of the compound object can be created, edited, or displayed. In some embodiments in which the compound object does not have a formula definition, the formula component 112 may provide a description of the compound object. For example, the formula component 112 may provide a descriptive rendering representing the data stored in the compound object, such as, for example, an icon, an image, a textual description, the first few data fields, etc. Yet in other examples in which the compound object has a formula definition, the formula component 112 may provide a formula bar that displays the formula definition of the compound object. The user may create or edit a formula of a compound object. In such an example in which the formula bar displays the formula definition of a compound object, the formula definition may include the values and associated structure by which the values are organized.

In aspects the compound object creation component 114 may create a compound object. In some embodiments, the compound object creation component 114 creates a compound object that is defined by a formula or it may create a compound object that is defined in another manner. The compound object creation component 114 may also store that compound object in a cell. Additionally, the compound object creation component 114 may create a corresponding card view of the compound object. In some embodiments, the compound object creation component 114 may parse and translate a formula defining the compound object to create the card view. Yet in embodiments in which the compound object is not defined by a formula, the compound object creation component 114 may create the card view using other rendering methods. Alternatively, the compound object creation component may create, from a compound object created from a card view, a corresponding formula of the compound object.

In some aspects, the associate component 116 associates compound object values with corresponding structure so as to allow each value to be individually referenced. In an example in which the compound object data structure is a record, the associate component 116 may associate each stored value with an attribute. In some embodiments, these values and structure are defined through the card view, from a formula, or some other user experience capable of storing values in compound objects. The associate component 116 therefore enables the one or more values of the compound object to be individually referenced.

In some aspects, the display component 118 may provide UI controls for displaying information in a cell storing a compound object. In some embodiments, the display component 118 may be used to generate the cell view display and the card view display. As will be described in further detail herein, the cell view and the card view can both be used to display various depths of information stored in the compound object. In some embodiments, the cell view may display one or more values, a rendering, or an icon indicating that a compound object is stored therein. The card view display may alternatively display all the values stored in the compound object including custom renderings of that data.

As should be appreciated, a compound object may store multiple values such as, for example, string values, numerical values, error values, and Boolean values. A compound object may further store extended values such as, for example, graphs, charts, lists, images, audio files, video files, dynamically updatable data, etc. In aspects, for a compound object storing information, an image rendering representing that data may be displayed in the cell or card view. Still further, other data such as string values or numerical values may also be displayed alongside such an image rendering of the data. In an example, a compound object stores a table of car information. In such an example, the cell view may display an image of that particular car alongside the make and model of the car. The card view may display additional information relating to the car such as the year, price, color, etc. As will be described further below, display component 118 may provide UI controls for editing the display information of the cell view and card view of a compound object.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2A:
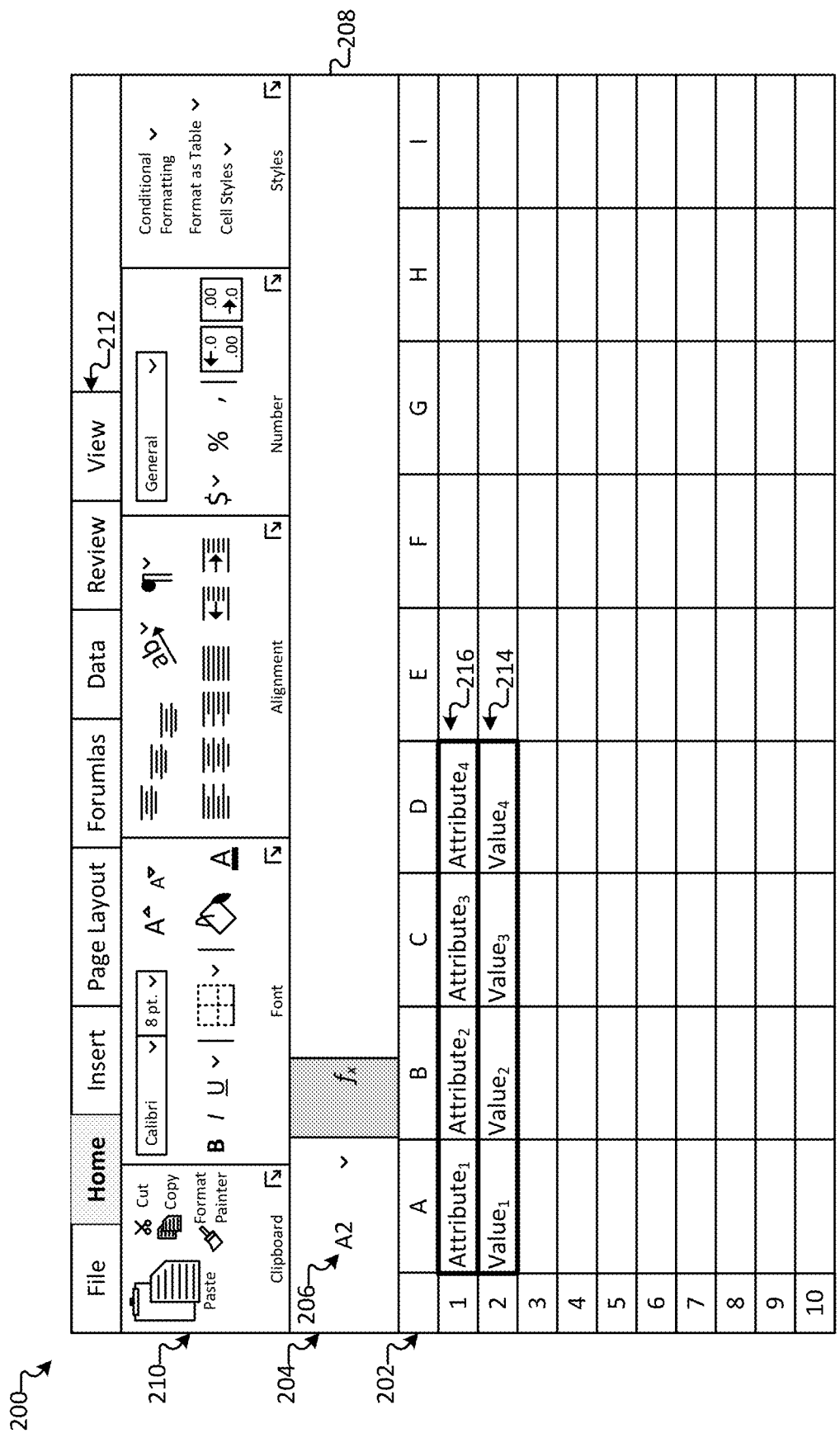
FIG. 2A illustrates an example representation of values and corresponding attributes stored in across several cells of a spreadsheet.
Figure 2B:
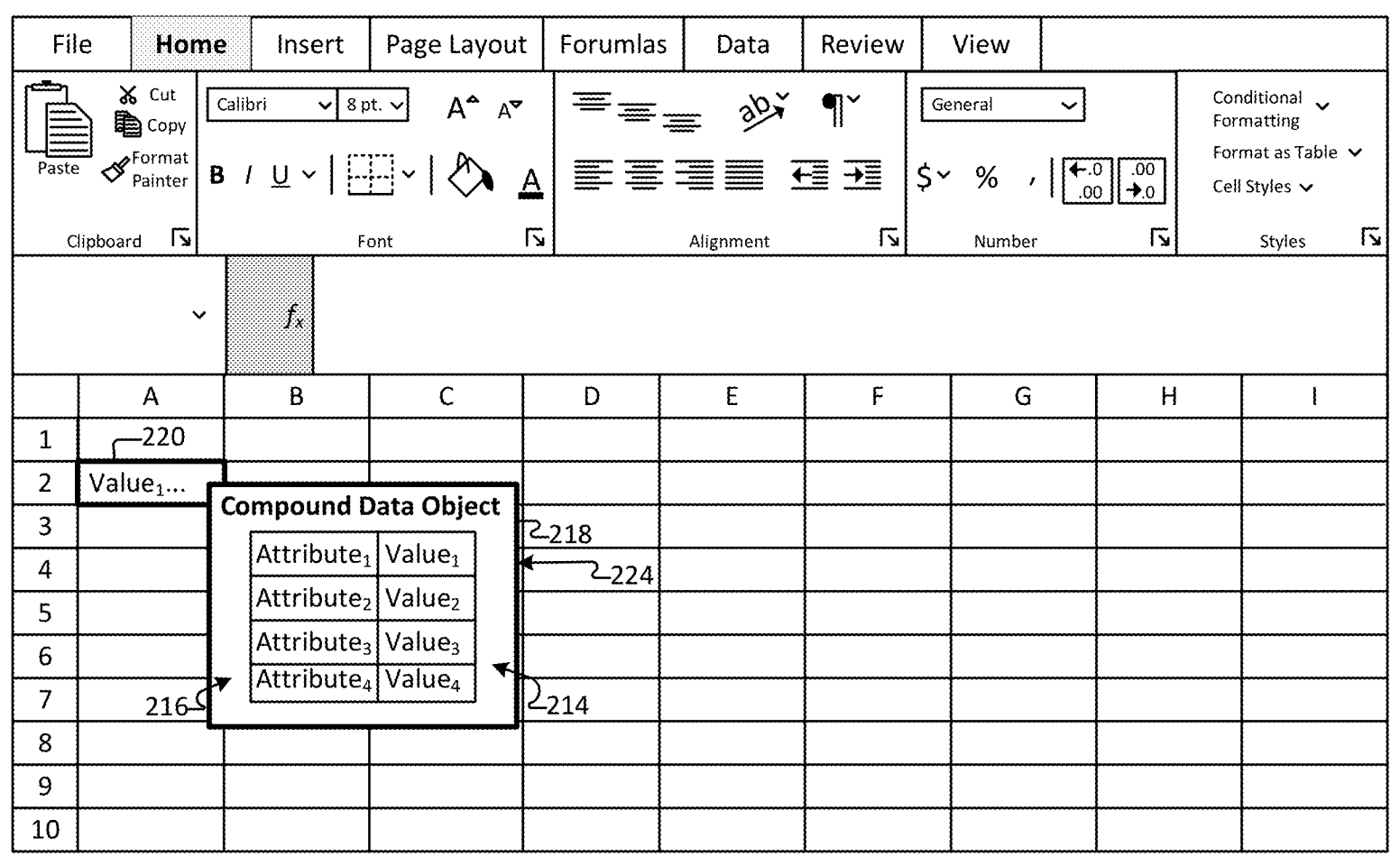

FIG. 2A and FIG. 2B provide an overview of compound objects.

FIG. 2A illustrates an example representation of values and corresponding attributes stored in across several cells of a spreadsheet.

As illustrated, an interface 200 of a spreadsheet application is provided. Interface 200 includes a spreadsheet 202, and a navigation ribbon 204 (including a cell identifier 206 and a formula bar 208) and a toolbar 210. Interface 200 further includes a plurality of tabs 212 for accessing various aspects and operations of the spreadsheet application.

As described herein, present spreadsheet applications can store only one value in a single cell, as illustrated in FIG. 2A. In the example illustrated, multiple values 214 are stored in individual cells across a row of a spreadsheet (e.g., cells A2-D2 of row 2). In some embodiments, these values are related. The example further illustrates multiple associated attributes 216 stored in individual cells across another row of the spreadsheet (e.g., cells A1-D1 of row 1). The attributes 216 may be, for example, a header row used to describe the corresponding values stored in the same column. For example, "Attribute$_1$" may be used to describe "Value$_1$." Although this is a simplified example of information that can be stored in a spreadsheet, it can be easily understood that by only allowing the storage of a single value in a single cell, multiple cells across multiple rows or columns may be required, thus adding to the complexity of a spreadsheet. Further complexity is added when values may be associated with sub-values, causing odd breaks within the spreadsheet. Accordingly, novel aspects of the present disclosure provide the ability to store, in a single cell, a compound object storing multiple values according to a defined structure.

FIG. 2B illustrates a compound object that stores, in a single cell, a plurality of values organized according to an example record data structure.

A compound object, as defined herein is a value that stores multiple values in a single cell, wherein the values are organized according to a defined structure. In this particular example, the defined structure is a record data structure, which stores values according to attribute-value pairs in which each value is associated with an attribute. As illustrated in FIG. 2A, numerous values are stored in multiple cells and under associated headers. In FIG. 2B, these values are stored in a compound object and organized in a record data structure. In other examples, the values are organized according to other data structures, such as, for example, a table data structure.

As illustrated, attributes 216 and associated values 214 are stored in a compound object 218. The compound object 218 is, in turn, stored in cell A2 220. In this example, five attributes and five corresponding values are stored in the compound object 218, wherein each attribute may correspond to a header value illustrated in FIG. 2A. Each of the attributes 216 and associated values 214 stored in the compound object 218 are displayed in a card view 224. In this example card view 224, the record is displayed such that each attribute is adjacent to the corresponding value, however in other card views, records may be displayed differently. Accordingly, the attributes 216 and associated values 214 are logically, compactly, and efficiently stored in cell A2 220.

As described herein, a compound object can store nested values. In particular, a compound object can store one or more levels of nested values, wherein each nested level of values is arranged according to a particular data structure. In particular, the compound object may store multiple values as any nested combination of any one of the known data structures (e.g., nesting an array within a vector, nesting one or more records within a record, nesting matrices within a table, etc.) or nesting according to one or more user-defined data structures. Alternatively, values may not be nested and therefore stored in a single level (e.g., a record, vector, matrix, table, array, or other data structure). Such storage of multiple values in a compound object enables large amounts of information to be efficiently and logically stored in a single cell, thereby reducing the overall size and complexity of a spreadsheet. Compound objects further provide users with better ways to display and consume more complex objects that are stored in the spreadsheet across multiple cells in various columns and rows. As will be described in further detail herein, each value of the compound object can be referenced. Each value can further be individually used in calculations.

Figure 3A:
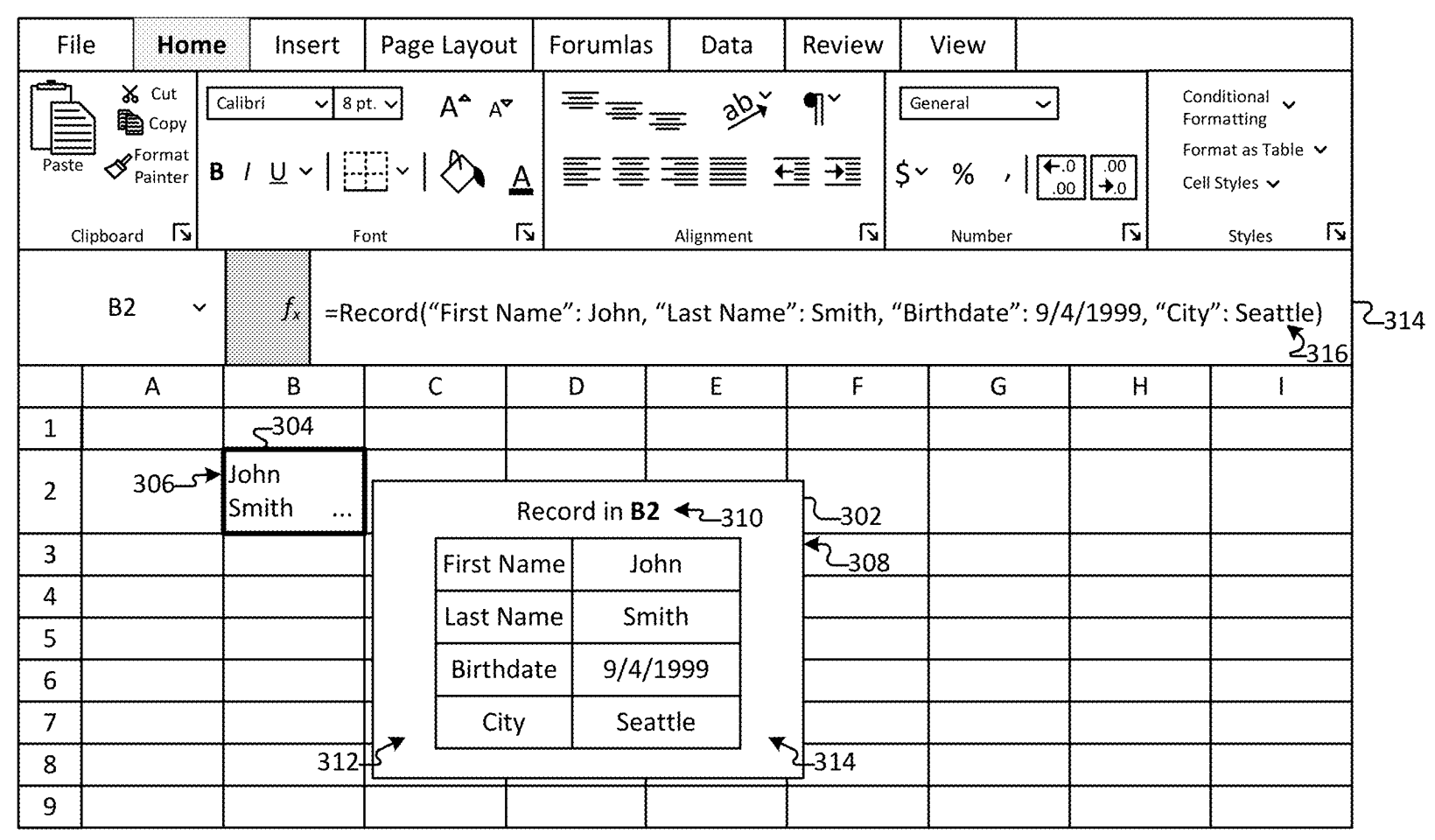
Figure 3B:
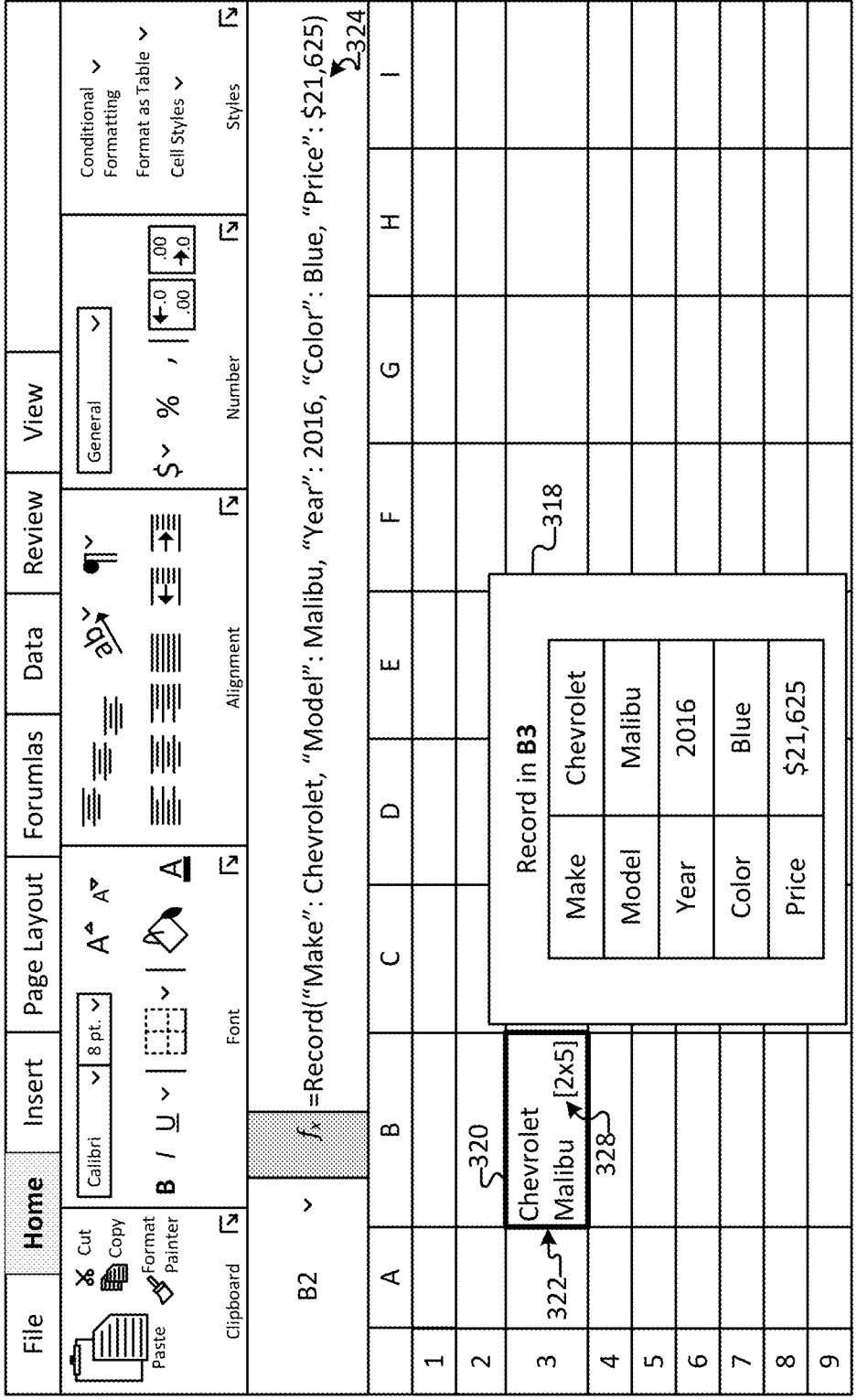
FIG. 3B illustrates another example compound object stored in a cell of a spreadsheet.
Figure 3C:
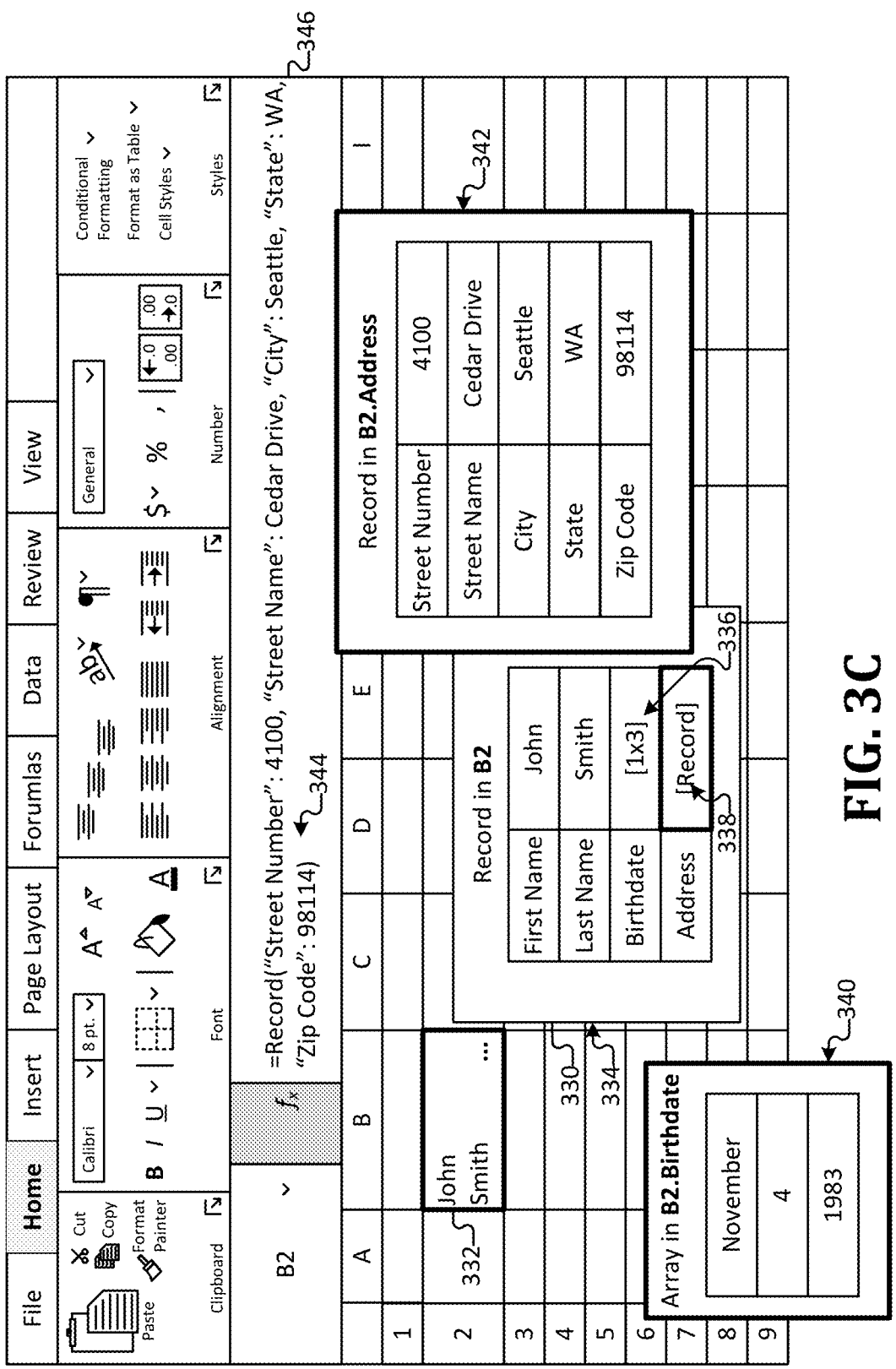
FIG. 3C illustrates an example compound object having nested values.

FIGS. 3A-3C describe and illustrate compound object views.

FIG. 3A illustrates an example compound object stored in a single cell of a spreadsheet.

In the example illustrated, the compound object 302 is stored in cell B2 304. As described herein, a compound object is a value that stores multiple values in a single cell, wherein those multiple values are organized according to a defined structure. In an example, the compound object 302 has two views: a cell view 306 and a card view 308. As will be described in further detail herein, the cell view may be a partial display of the compound object and is viewable from the cell of the spreadsheet. As will also be described herein, the card view is an expanded or full display of the values stored in the compound object.

In the example illustrated, the compound object 302 stores multiple values according to a record data structure, as also indicated in the heading 310 of the card view 308. As described herein, a record data structure stores values according to attribute-value pairs. Thus, in this example, the compound object 302 stores four attributes 308 and four associated values as named value pairs: a "First Name" attribute and value "John", a "Last Name" attribute and value "Smith", a "Birthdate" attribute and value Sep. 4, 1999, and a "City" attribute and value "Seattle." Accordingly, the compound object 302 stores, in a single cell (e.g., cell B2 304) four separate and distinct values according to a record data structure, wherein each value has a corresponding attribute. As will be described in further detail herein, each value can be individually referenced and used in calculations.

As described herein, compound objects have two views: a cell view and a card view. In this example, the cell view 306 displays the first two values (e.g., "John" and "Smith) stored in the compound object 302 and an ellipsis (e.g., " . . . ") indicating that further information is stored in that cell. Accordingly, a person viewing the cell view 306 can readily understand that cell B2 304 stores a compound object, which stores within it, additional values. In embodiments in which the compound object stores just a few values, the corresponding cell view may display those one or two values entirely, depending on the size of the cell. Accordingly, as the cell storing a compound object is resized to larger or smaller dimensions, more or fewer values may also be displayed. In some embodiments, the cell view may further display additional information such as information about the data structure by which the values of the compound object are organized (e.g., the cell view may display attributes, array information, nesting information, etc.). In some embodiments, the cell view of the cell storing a compound object may display values based on a user's preference. For example, the cell view may display one or more values of the compound object as selected by the user. In other embodiments, the cell view may display one or more values of the compound object as selected by a user-defined algorithm. In other embodiments, the cell view may display one or more values, one or more images, or any combination thereof. In yet other embodiments, the cell may display information other than a value of the compound object (e.g., an image or graphic representation of the compound object, a title, a description, etc.). In other embodiments, compound object schema may specify the cell view or the user may select a display view from a set of selectable styles. In some embodiments, the cell view may display data that is not a direct view of the values stored in the compound object. As an example, the cell view may summarized display of the values stored in the compound object (e.g., a summary histogram of test scores that are stored as an array in the compound object).

Further illustrated in this example is a card view 308 of the compound object 302. In some embodiments, the card view is an expanded view that displays additional (and sometimes all) values stored in the compound object. In some embodiments, the card view can live in a cell or it may be a floating object that is displayed on top of the spreadsheet grid. In this example, the card view 308 floats above the grid and displays a header 310, attributes 312, and associated values 314. Accordingly, in this example, the card view 308 displays the values stored in the compound object 302 and the structure (e.g., record data structure) by which the values are organized. In particular, the card view 308 displays the values as organized in attribute-value pairs. In particular, the card view 308 displays the compound object 302 such that each attribute is organized adjacent to the corresponding value. The card view 308 further includes a header 310 identifying the type of structured data (e.g., "Record") and the corresponding cell in which that compound object 302 is stored (e.g., cell "B2"). In some embodiments, the card view 308 is resizable. Based on the number of values stored in the compound object and the size of the card view 308, a full or partial view of the values stored in the compound object 302 may be displayed. In some embodiments, the card view 308 may display more or fewer features and the features displayed may also be based on a user's preference. As with the cell view, the card view may also display the values stored therein based on a user's preference, schema settings, or a user-defined algorithm. Additionally, one or more values may be stored as an image or graphical representation of the value. Custom rendering may also be implemented. For example, a compound object may store the name of a city and the card view may display the location of the city as rendered on a map. In another example, the compound object may store a person's daily exercise information (e.g., number of steps, running distance, heart rate, etc.) and the card view (or cell view) may display a dashboard rendering of the various statistics. Additional example displays are described in further detail with reference to FIG. 3B and FIG. 3C.

As will be described in further detail herein, the card view 308 may also be used to edit the compound object. Example editing features that may be performed from the card view include, but are not limited to, copy/cut/paste, creation or deletion of new rows and columns, sorting/filtering, editing data, editing formulas, etc. Such features will be described in further detail herein.

As also described herein, values stored within the compound object can be used in calculations and referenced in formulas. In other words, the values stored in a compound object can fully participate with spreadsheet functionality and does not lose functionality simply because it is stored in a single cell, among other values. Additionally, a compound object may also be defined by a formula and therefore it can be displayed, for example, in the formula bar 314. As illustrated, a formula 316 displayed in the formula bar 314 expresses the compound object 302. In an example, selection of the cell B2 304 in which the compound object 302 is stored may cause the spreadsheet application to display the formula 316 in the formula bar 314. In this particular example, the formula 316 is defined as "=Record("First Name": John, "Last Name": Smith, "Birthdate": Sep. 4, 1999, "City": Seattle)." The formula 316 therefore includes an identification of the type of structured data (e.g., "Record"), a definition of each attribute (e.g., "First Name," "Last Name," "Birthdate," and "City"), and the corresponding value (e.g., "John," "Smith," "Sep. 4, 1990," and "Seattle"). In this example formula 316, the attribute-value pairs are defined collectively, wherein each attribute is defined in quotations and the corresponding value is specified next to the associated attribute, following a colon. It is understood that this formula 316 is merely exemplary and is not intended to be limited to this particular syntax or functionality. As will be described in further detail herein, in some embodiments, attributes and values may be edited, added, or deleted from the formula bar.

Further illustrated is the city "Seattle" as a value in the record of the compound object 302. In some embodiments, the city "Seattle" may be a rich data type. A rich data type, as used herein, is defined as a type of data that has established relationships with other types of data. A rich data type is a type of value that is further described in U.S. Provisional Patent Ser. No. 62/249,869, the disclosure of which has been incorporated herein by reference. The value "Seattle" therefore may be a rich data type and understood to be a city having established relationships with other types of data (e.g., location, population, distances to other cities, weather, etc.). As such, the value "Seattle" may be, for example, a record containing additional information relating to the city Seattle such as population data, government official data, weather data, etc.

FIG. 3B illustrates another example compound object stored in a cell of a spreadsheet.

As illustrated, a compound object 318 is stored in cell B3 320. In this example, the compound object 318 stores multiple values according to a record data structure. In this particular example, the compound object 318 stores values relating to a car and organized according to a record data structure. The compound object 318 includes five attributes (e.g., "Make," "Model," "Year," "Color," and "Price") and five corresponding values (e.g., "Chevrolet," "Malibu," "2016," "Blue," and "$21,625"). This example compound object 318 is also displayed in the card view 322 as being arranged in attribute-value pairs.

Further illustrated is a formula 324 in the formula bar 326 expressing the compound object 318. The formula 324 is defined as "=Record("Make": Chevrolet, "Model": Malibu, "Year": 2016, "Color": Blue, "Price": $21,625)." As described with reference to FIG. 3A, formula 324 also includes an identification of the type of structured data (e.g., "Record"), a definition of each of the five attributes (e.g., "Make," "Model," "Year," "Color," and "Price") and the corresponding values (e.g., "Chevrolet," "Malibu," "2016," "Blue," and "$21,625"). Also illustrated in this example formula 324, the attribute-value pairs are defined in combination, wherein each attribute is defined in quotations and the corresponding value is specified next to the associated attribute, following a colon. It is understood that this formula 324 is merely exemplary and is not intended to be limited to this particular syntax.

As is further illustrated, the cell view 322 displays the first two values of the compound object 318 (e.g., "Chevrolet" and "Malibu"). In this example, the cell view 322 displays a symbol 328 (e.g., "[2×5]") indicating that cell B3 320 stores a compound object. In this example, the symbol 328

"[2×5]" is used to describe a record having the size 2 columns and 5 rows. Alternatively, the symbol 328 may be used to describe an array or a table. Although a particular symbol is illustrated, it is understood that any symbol can be used to denote the existence of a compound object in a cell. In some embodiments, the symbol differs for the structured data stored in the compound object, and in other embodiments, the symbol is a universal symbol representing a compound object generally. In some embodiments, the symbol 328 may be selectable such that in response to a selection of the symbol 328, the card view 324 of the compound object 318 is displayed.

FIG. 3C illustrates an example compound object having nested values.

As illustrated, the compound object 330 is stored in cell B2 332. In this example, the compound object 330 stores values relating to a person and organized according to a record data structure and therefore the values are organized in attribute-value pairs. As shown in the card view 334, the example compound object 330 includes four attributes (e.g., "First Name," "Last Name," Birthdate," and "Address") and four corresponding values (e.g., "John," "Smith," "[1×3]," and "[Record]"). In this example, the "Birthdate" and "Address" attributes are associated with nested values that are also organized according to a defined data structure, as indicated by symbols 336 (e.g., "[1×3]") and 338 (e.g., "[Record]"). In this example, symbols 336 and 338 are used to indicate nested values. Symbol 336 (e.g., "[1×3]") associated with the "Birthdate" attribute indicates that the birthdate attribute stores one or more nested values organized according to a 1×3 dimension array data structure. Accordingly, in this example, the "Birthdate" attribute stores three values that are organized according to an array data structure, as displayed in the card view 340. Symbol 338 (e.g., "[Record]") associated with the "Address" attribute indicates that the address attribute stores one or more nested values organized according to a record data structure. Accordingly, in this example, the "Address" attribute stores five values that are organized according to a record data structure, as displayed in the card view 342. In particular, the record data structure includes five attributes (e.g., "Street Number," "Street Name," "City," "State," and "Zip Code") and five associated values (e.g., "4100," "Cedar Drive," "Seattle," "WA," "98114").

As illustrated, the nested values also have corresponding card views. In particular, the array associated with the "Birthdate" attribute can be displayed from the card view 340 and the record associated with the "Address" attribute can be displayed from the card view 342. As with other card views, the card views 334, 340, and 342 may also be used to edit data. Example editing features that may be performed from the card view include, but are not limited to, copy/cut/paste, creation, or deletion of new rows and columns, sorting/filtering, editing data, etc. While the nested values are illustrated in this example in card views, it is understood that in other embodiments, all such nested values may be displayed in the card view 334 of the compound object 330 rather than a popped out card view 340 and 342. In other embodiments, a nested sub-card may be displayed.

Accordingly, the compound object 330 stores multiple levels of values, wherein each level is organized according to a defined data structure. Furthermore, although this example depicts the nested values organized according to a record data structure, it is understood that the nested values may be organized according to another type of structured data. A nested value may be organized according to, for example, a record, vector, matrix, table, or array, or another defined data structure. Aspects of the present disclosure provide that each of the nested values can also be referenced and used in calculations.

Aspects of the present disclosure also provide that a nested compound object can be expressed by a formula definition and optionally displayed in the formula bar. Such formula definition may also include nested values. As illustrated in this example, the value corresponding to the "Address" attribute of the compound object 330 is selected, as indicated by the thickened outlining of the cell border. In this example, in response to the selection, the formula 344 (e.g., "=Record("Street Number": 4100; "Street Name": Cedar Drive; "City": Seattle; "State": WA; "Zip Code": 98114") representing the nested value is displayed in the formula bar 346. It is understood that this formula 344 is a subset of the formula representing the entire compound object 330. As will be described in further detail herein, compound objects, including values stored therein, may be edited from the formula bar. In some embodiments, values may be one or more images, graphs, charts, videos, or audio files. In such embodiments, the nested value may be represented in the formula 344 as a file path or URL to the location in which the image, graph, chart, video, or audio file is saved. Other settings may also be represented, such as, for example, pixel values, contrast, brightness, position, etc. Alternatively, a thumbnail rendering of an image representing the nested value may be provided in the formula 344.

FIGS. 4A-4D illustrate the creation of compound objects through a formula definition, the creation of compound objects from a schema definition of a compound object type, and user interfaces to guide the user in providing values.

Figure 4A:
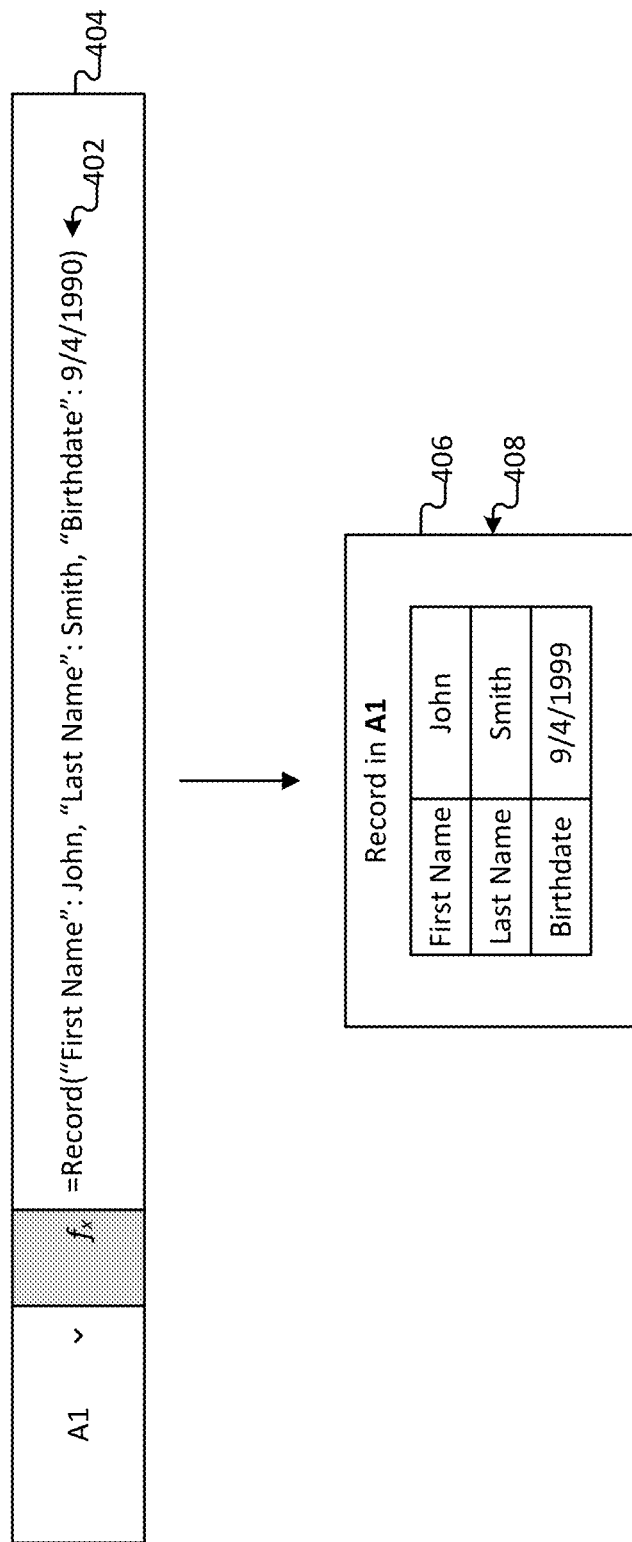
FIG. 4A illustrates an example embodiment in which a compound object can be created through the definition of a formula.

FIG. 4A illustrates an example embodiment in which a compound object can be created through the definition of a formula.

Novel aspects of the present disclosure are directed to the creation of a compound object through a formula definition. Illustrated is a formula 402 (e.g., "=Record("First Name": John, "Last Name": Smith, "Birthdate": Sep. 4, 1990)") displayed in the formula bar 404. In particular, the formula 402 defines the structural organization (e.g., "Record") of the compound object as well as each attribute (e.g., "First Name," "Last Name," and "Birthdate") and associated value (e.g., "John," "Smith," and "Sep. 4, 1990"). Accordingly, by providing a formula such as formula 402, a compound object 406 storing multiple values in a single cell (e.g., cell A1) and organized according to a defined structure (e.g., Record) may be created.

In some embodiments, a compound object may store multiple values organized according to an array data structure. A formula definition for an array may be represented as, for example, "=Array(1,2; 3,4; 5,6)" to represent a 2-D array with three rows, wherein the first row is represented by the values (1,2), the second row is represented by the values (3,4), and the third row is represented by the values (5,6).

In some embodiments, a compound object may store multiple values organized according to a table data structure. A formula definition for an array may be represented as, for example, "=Table("Column1", {1,2,3,4}, "Column2", {a,b,c,d})." In such an example, "Column1" and "Column2" represent the string values stored in header columns of the table. Furthermore, in this example, the values "1, 2, 3, 4" are values stored in the column under the "Column1" header, and the values "a, b, c, d" are values stored in the column under the "Column2" header. Accordingly a compound object storing eight values and organized according to a 2×5 dimension table may be created through a formula definition.

Although particular formula syntaxes are provided, it is understood that aspects of the present disclosure are not limited thereto and any suitable formula syntax may alternatively be used. In an example, the formula "=Bing("Seattle")" might be a function that calls a service such as the search entity, Bing, and returns the search engine entity that represents Seattle, wherein the information returned is stored in a single cell. Accordingly, the formula may not include all the information stored in the compound object.

It is understood that in embodiments, the formula 402 generates a compound object, such as compound object 406. As illustrated, the compound object 406 can also be viewed and displayed in a corresponding card view 408. As will be described in further detail herein, this card view 408 may be an editable user experience in which the compound object 406 may edited. Accordingly, the creation of a compound object through a formula definition further creates a compound object that can be viewed and displayed in a corresponding card view.

It is further understood that a schema could also be created through a formula definition. As described herein, a schema may express the structural definition of a compound object, identifying the structured organization of the data (e.g., record, vector, matrix, table, array, or other data structure) and any properties of the compound object (e.g., numerical values are to be received, a particular pattern in which values are received, any attributes, etc.). In some embodiments, a formula may define the schema and not specify the corresponding values. For example, a formula may be defined as (e.g., "=Record("First Name", "Last Name", "Birthdate")") which defines the structural definition of the compound object (i.e., schema). In that example, the formula "=Record("First Name", "Last Name", "Birthdate")" defines the structure in which the values are organized (e.g., "Record") and attributes such as "First Name," "Last Name," and "Birthdate." Schemas created through such a formula definition may be saved in storage (e.g., storage 122) and re-used or shared. In one example embodiment, once the schema definition is created from the formula definition, a user interface may be displayed that prompts the user to provide further property information. In yet other embodiments, the properties may be provided in the formula definition itself (an example formula may be written as "=NewSchemaRecord('person',{'first name', string, 'last name', string, "Birthday", ShortDate})"). As is described in further detail herein, the schema may also be created through the card view.

Similarly, compound objects or schemas may be edited using a formula definition. As described herein, schemas may be saved in storage, such as, for example, storage 122. Accordingly, pre-existing compound objects may be selected or schemas may be opened from storage 122 and edited from the formula definition. In some embodiments, such editing may be performed by entry, in the formula bar, of the schema name (e.g., receiving the schema label associated with a compound object type "=Person( . . . ")" or a partial entry of the schema label), and in response, the associated schema would be populated in the formula bar. In an example in which a compound object is stored in a cell, a selection of that cell may correspondingly display the formula definition of that compound object in the formula bar. Accordingly, the structure or the values may be edited by editing the formula displayed in the formula bar 404.

Figure 4B:
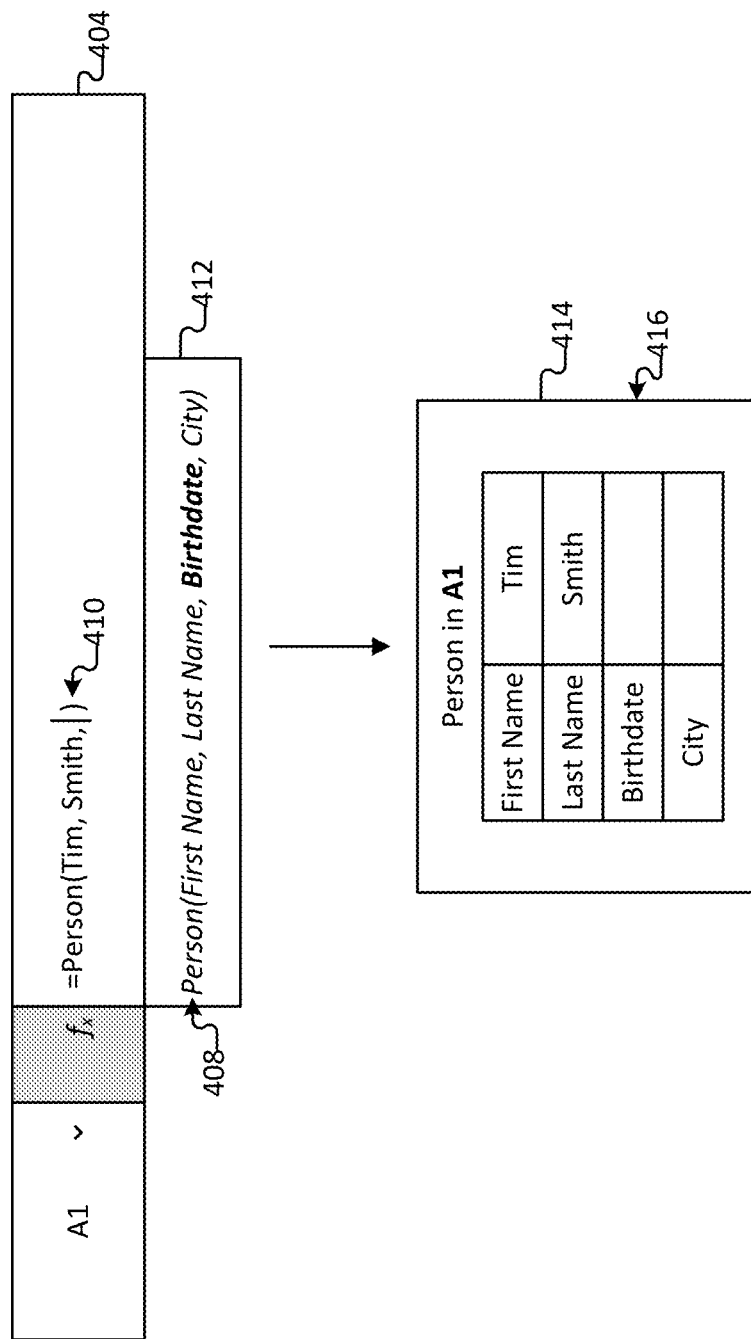
FIG. 4B illustrates an alternative example embodiment in which a compound object can be created from a pre-existing schema definition.

FIG. 4B illustrates an alternative example embodiment in which a compound object can be created from a pre-existing schema definition.

As described herein, a schema may express the structural definition of a compound object type, identifying the structured organization of the data (e.g., record, vector, matrix, table, array, or other data structure) and any properties of the compound object (e.g., numerical values are to be received, a particular pattern in which values are received, etc.). For example, a schema may express the structural definition of a "Person" compound object type or a "Car" compound object type. As also described herein, pre-existing schemas may be saved in storage (e.g., storage 122). Novel aspects of the present disclosure are therefore also directed to the creation of a compound object from a pre-existing schema expressing the structural definition of a compound object type as well as compound object properties. In particular, a compound object can be created by selecting a pre-existing schema (e.g., from storage 122), which, in some embodiments, is represented by a formula definition. Based on such a selection of a pre-existing schema, values can be specified and organized according to the structural definition expressed by the schema.

Referring now to FIG. 4B, illustrated is a pre-existing schema 408 of a person compound object type. In this example, the schema 408 expresses the structural definition of a "Person" compound object type and is organized according to a record data structure. The schema is expressed in terms of the following formula: "Person(First Name, Last Name, Birthdate, City)." The pre-existing schema 408 therefore defines the schema label (e.g., "Person") and four attributes, listed in a particular order: "First Name," "Last Name," "Birthdate," and "City." In this example, the order defines the order in which the corresponding values are to be received during the creation of the compound object. In some embodiments, a user may provide, for example, in the formula bar 404, the schema label (e.g., "Person") or provide the beginning of the schema label (e.g., "Pe . . . "), and the spreadsheet application, in response, will identify the corresponding pre-existing schema 408. Next, the corresponding attributes may be displayed in a guide user interface (e.g., guide display 412) such that the user understands which corresponding values are to be provided and in which order, as will be described in further detail herein. Accordingly, in this example, a new compound object is created using a pre-existing schema 408.

As illustrated, aspects of the present disclosure provide an intelligent user interface experience to guide the user in entering the values associated with the pre-existing schema so that a user need not have memorized the particular order in which the values are to be provided. The example guide display 412 may be displayed in response to receiving, in the formula bar 404, the schema label for the compound object type (e.g., receiving the schema label "=Person( . . . )" or a partial entry of the schema label). The guide display 412 may identify the pre-existing schema (e.g., pre-existing schema 408), which expresses the structural definition of the compound object type. In this example, the guide display 412 displays the "Person" pre-existing schema 408 and the ordered list of attributes. Accordingly, a user need not have memorized each required attribute or the particular order of the attributes when entering the associated values to create the Person compound object type. Rather, the user can identify the order in which the values are to be provided using the guide display 412. In some embodiments, as the user types, the corresponding attribute may be highlighted to further indicate the corresponding value to be entered. In this example, as the user provides the formula 410, the spreadsheet application identifies whether a pre-existing schema for that compound object type exists. If a pre-existing schema exists, the guide display 412 may be displayed. In this example, the user has entered the first two values (e.g., "Tim" and "Smith") corresponding to the first two attributes (e.g., "First Name" and "Last Name") of the compound object type structural definition. The next expected value is the "Birthdate" attribute. Accordingly, in this example, the "Birthdate" attribute is highlighted in the guide display 412, thereby indicating to the user to provide a birthday value. Accordingly, a compound object 414 is created upon receiving the values expressed by the pre-existing schema definition of the compound object. In this example, because only the first two values (e.g., "Tim" and "Smith") corresponding to the first two attributes (e.g., "First Name" and "Last Name") of the compound object type have been received, only those values are displayed in the corresponding card view 416 of the compound object 414. In some embodiments, the card view may be displayed during construction of the formula, and in other embodiments, the card view may be displayed after the values have been committed.

Figure 4C:
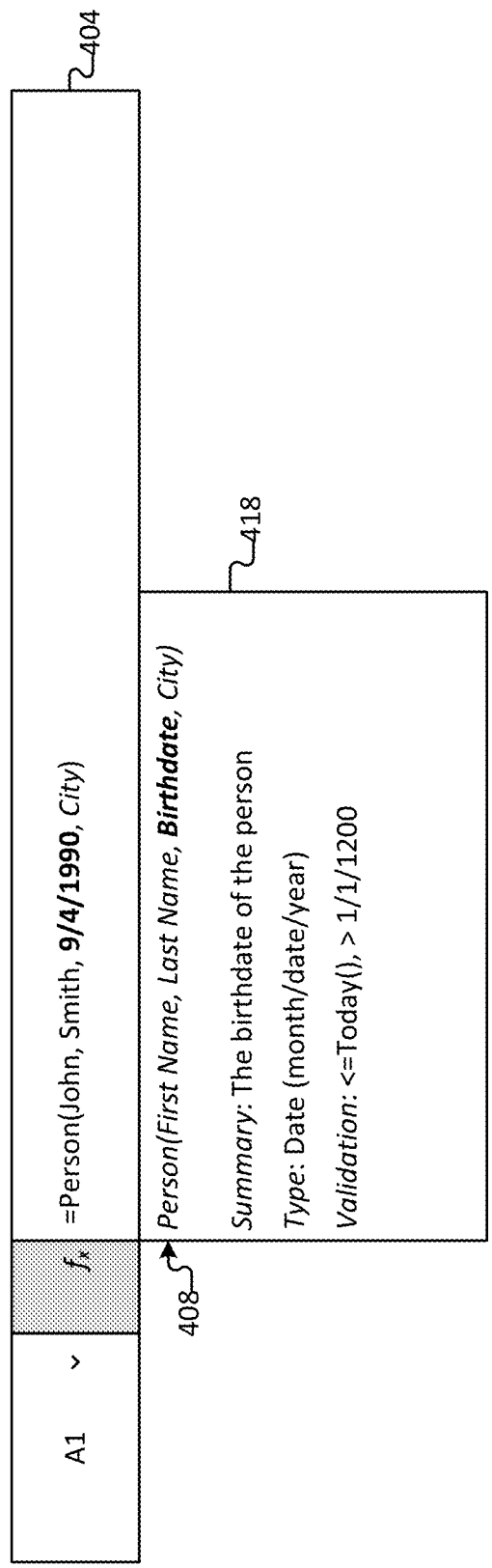
FIG. 4C illustrates an example alternative user interface that may be provided during creation of a compound object from a pre-existing schema definition.

FIG. 4C illustrates an example alternative user interface that may be provided during creation of a compound object from a pre-existing schema definition.

As described herein, a schema may express the structural definition of a compound object, identifying the structured organization of the data (e.g., record, vector, matrix, table, array, or other data structure) and any properties of the compound object (e.g., numerical values are to be received, a particular pattern in which values are received, any attributes, etc.). As illustrated in FIG. 4B, the spreadsheet application may provide a guide display 412 to assist users in correctly entering values based on the order in which the values are to be received, as defined by the schema, which expresses the structural definition of the compound object type. Illustrated in FIG. 4C is an alternative embodiment of a guide display (e.g., guide display 418). In this example, the guide display 418 displays additional information to guide the user in entering values when creating a compound object from a pre-existing schema (e.g., schema 408), which defines the compound object type. As the user types the values in the formula bar 404, for example, the guide display 418 updates to provide detailed information about each value to be received. Although relatively specific details are illustrated in the guide display 418, it is understood that different, additional, or fewer informational hints may be provided.

As illustrated in this example, the schema 408 expresses the structural definition of a "Person" compound object type, which is organized according to a record data structure (and therefore storing values in attribute-value pairs). The example guide display 418 further displays a summary of each attribute, the type of each attribute, and any validation conditions associated with each attribute. The summary of each attribute provides a brief description of the attribute. In this example, for the "Birthdate" attribute, the corresponding summary describes the attribute as "The birthdate of the person." The attribute type indicates the expected value type and the corresponding format. In this example, for the birthdate attribute, the expected value type is "Date" and the corresponding format is "month/day/year." Finally, the attribute validation condition specifies valid values. In this example, valid birthdate values are dates from Jan. 1, 1200 to today. It is understood that these hints provided in the guide display 418 are merely exemplary and are not intended to be limiting. It is understood that more, fewer, or different descriptions may be provided in a guide display 418. Such descriptions may vary and depend, for example, on the particular expected value. In some embodiments, the one or more value descriptions may be provided by the user who creates the schema, which defines the compound object type. Accordingly, the guide display 418 assists users during the entry of values using a pre-existing schema by providing, for example, value descriptions, formatting information, and validation conditions.

Figure 4D:
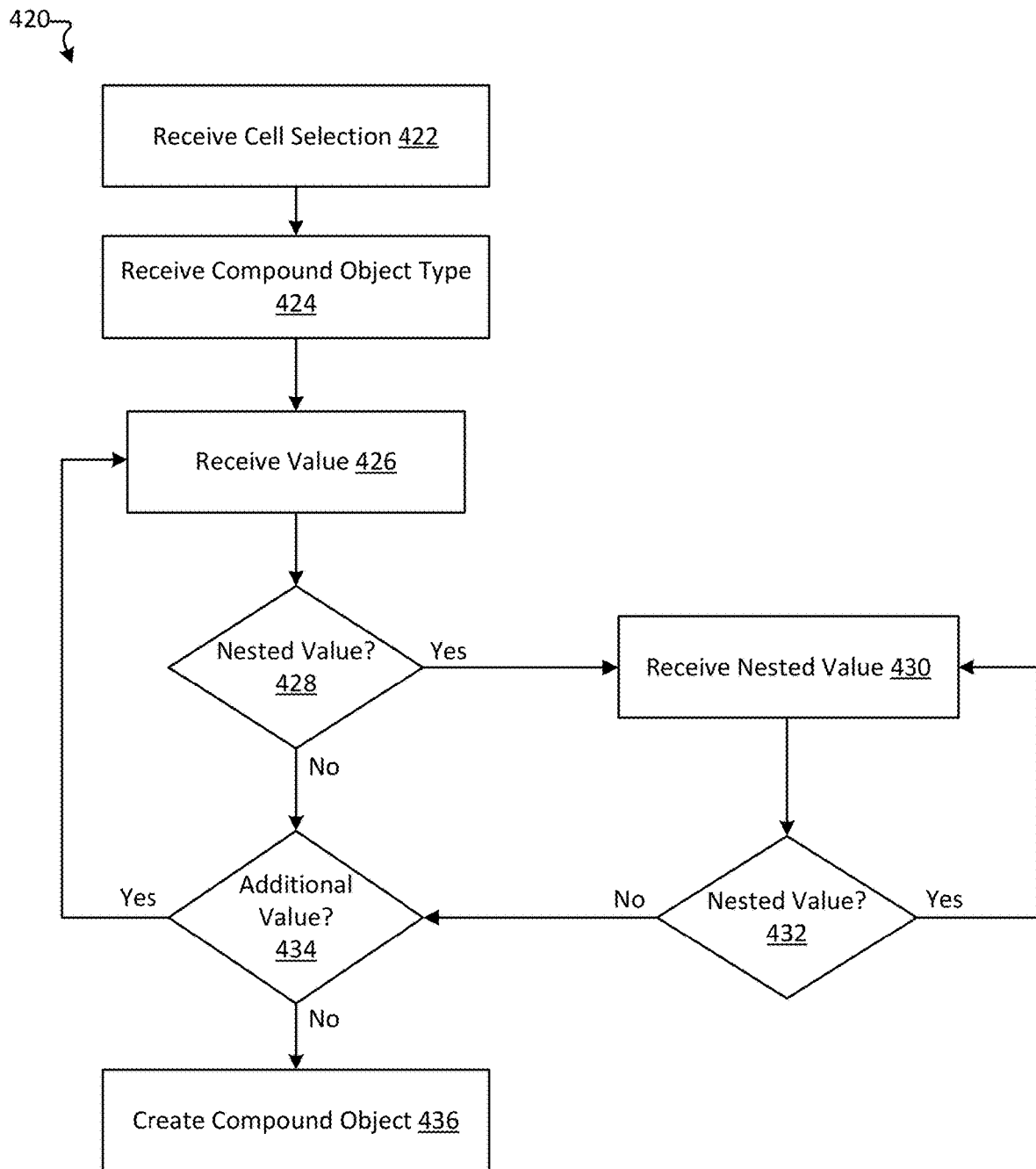
FIG. 4D illustrates a method 420 for creating a compound object type from a pre-existing schema definition, as described and illustrated with reference to FIG. 4A and FIG. 4B.

FIG. 4D illustrates a method 420 for creating a compound object type from a pre-existing schema definition, as described and illustrated with reference to FIG. 4A and FIG. 4B.

In the receive selected cell operation 422, at least one cell of a spreadsheet may be selected. In aspects, a spreadsheet application (e.g., spreadsheet application 110) may provide the spreadsheet to a user, the spreadsheet including one or more sheets, each sheet having a plurality of rows and columns of cells. Cells may be selected by highlighting or otherwise identifying the cell or range of cells using a gesture, touch, mouse click, keyboard input, and the like. When a single cell is selected, the cell may be identified in a toolbar of the user interface by a cell identifier that specifies the location of the selected cell within the spreadsheet. For example, the cell identifier of "A1" specifies that the cell is located in column A, row 1 of the spreadsheet, while a cell identifier of "B5" specifies that the cell located in column B, row 5 of the spreadsheet. The cell identifier may further be displayed adjacent to or near a formula bar (e.g., formula bar 404) identifying the contents of the cell in the toolbar of the user interface. When a range of cells is selected, the cell at the top left corner of the range may be displayed by a cell identifier next to the formula bar, with the range of cells being represented by a range identifier including cell identifiers for the cell at the top left corner and the cell at the bottom right corner (e.g., A1:C5).

At the receive compound object type operation 424, the name of the compound object type is received. As described herein, a compound object type is a structural definition of a compound object that can be reused or shared, which may be expressed by a schema. In some embodiments, such compound object types are stored in memory, locally or externally. Accordingly, in the receive compound object type operation 424, the compound object type, such as the name of a saved compound object type, may be received. In some embodiments, only a partial entry of the compound object type is received. For example, for a compound object type named "ExamResults" only a portion of the name may be required for the spreadsheet application to identify the appropriate compound object type. In some embodiments, as the user types the name of the compound object type, a list of appropriate compound object types may be displayed and filtered as the user continues to type. In some embodiments, the compound object type name is received in the formula bar. For example, a formula component (e.g. formula component 112) may provide a user interface (e.g., a formula bar or another type of formula creation user interface) for receiving the compound object type. In some aspects, in response to a selection of a cell (or a range of cells), the formula component may provide a formula bar or other user interface for entry of the compound object type, wherein that formula identifies the name of the compound object type (e.g., "=Person( . . . "; "=Corporation( . . . "; "=Scores ( . . . "). In other embodiments, the compound object type may be received in another formula user interface.

In the receive value operation 426, a value is received. The value can be, for example, a string, number, graph, chart, error, etc. In an example, the formula component (e.g. formula component 112) may provide a formula bar or separate user interface that allows entry of a value to be stored in the resulting compound object. The formula component may further provide a user interface (e.g., guide display 418) that guides the user in providing values according to the structure defined by the schema of the particular compound object type. For example, the guide display may step the user through each value to be provided in the appropriate order, as well as provide a description of each value (e.g., what the value represents, the type of value, the format of the value, etc.).

In the nested value decision operation 428, it is determined whether the value entered in operation 426 is a nested value. As described herein, a compound object type is a structural definition of a compound object that can be reused or shared, wherein that structural definition may include nested values. Compound object types may nest values to multiple levels of depth. Accordingly, it is determined, at the nested value decision operation 428, whether the value entered in the receive value operation 426 is a nested value. In an example, the formula component (e.g., formula component 112) determines whether the compound object type includes nested values and whether the particular value received in operation 426 is a nested value. In some embodiments, the schema, which is the structural definition of the compound object type, may identify a particular syntax indicating nesting. For example, a nested value may be defined by the schema as: "=TestScores("Name": "John's Test Scores", "Test Scores": {Apr. 19, 2016, 89; Jun. 20, 2016, 100; Jul. 22, 2016, 98})." In this example, the compound object type entitled "TestScores" is a record having two attributes (e.g., Name and Test Scores) wherein the value associated with the "Test Scores" attribute nests a 2D array (a date and the associated test score). Accordingly, the formula component may determine, based on the syntax of the schema, whether the value received in operation 426 is a nested value. If it is determined that the received value is a nested value, the method 420 proceeds to the receive nested value operation 430. If, however, it is determined that the received value is not a nested value, the method 420 proceeds to the additional value decision operation 434.

In the receive nested value operation 430, a nested value is received. The nested value can be, for example, a string, number, graph, chart, error, etc. As described herein, the formula component (e.g. formula component 112) may provide a formula bar or separate user interface that guides the user in providing values according to the nested structure defined by the schema of the compound object type.

In the nested value decision operation 432, it is determined whether the value provided in the receive nested value operation 430 represents another nested value. As described herein, compound objects may nest values to multiple levels of depth. Accordingly, a nested value may nest yet another one or more values, wherein those values are organized according to a predefined or user defined structure. Thus, at the nested value decision operation 432, it is determined whether the value provided in the receive nested value operation 430 is a nested value. In some embodiments, the schema, which is the structural definition of the compound object type, may identify a particular syntax indicating nesting. In an example, the formula component (e.g., formula component 112) determines whether the value received in operation 430 is a nested value by identifying the particular syntax of the schema definition. For example, a nested value may be defined by the following example formula: "=Contact("Name": [First Name, Last Name]; "Fitness Tracker": FitnessTable("Date": [mm/dd/yyyy]; "Activity": ExerciseTable("Step Count": [Numerical Value]; "Running Distance": [Numerical Value]; "Heart Rate": [Numerical Value])))." In this example, the compound object type entitled "Contact" tracks a person's fitness activity, and is organized according to a record data structure having two nested tables. In particular, the "Contact" compound object type has two attributes: "Name" and "Fitness Tracker," wherein the value associated with the "Fitness Tracker" attribute is a nested table entitled "FitnessTable" The nested "FitnessTable" compound object type is a table having two columns: "Date," and "Activity," wherein the value associated with the "Activity" column is yet another nested table entitled "ExerciseTable." The nested "ExerciseTable" compound object type is a table having three columns: "Step Count," "Running Distance," and "Heart Rate." Accordingly, in operation 432, the formula component may determine whether the value received in operation 430 is a nested value (such as, for example, the value associated with the "ExcerciseTable" column. If it is determined that the received value is a nested value, the method 420 proceeds to the receive nested value operation 430. If, however, it is determined that the received value is not a nested value, the method 420 proceeds to the additional value decision operation 434.

In the additional value decision operation 434, it is determined whether additional values are to be received. As described by the example method 420, values are provided in a predefined order, wherein that order may lead to nested values. Accordingly, at operation 434, it is determined whether additional values are to be received, apart from the nested values. In some embodiments, the formula component (e.g., formula component 112) determines whether additional values are to be received by identifying the particular syntax of the schema definition. If additional values are to be received, the method 420 proceeds to the receive value operation 426. If, however, additional values are not to be received, the method 420 proceeds to the create compound object operation 436.

In the create compound object operation 436, the compound object defined by the particular schema definition of the compound object type is created. In particular, the compound object type received at operation 424 is obtained and the corresponding values provided in operations 424, 426, and 430 are used to create the compound object. In particular, a compound object creation component (e.g., compound object creation component 114) may create and store the defined compound object in the cell selected in operation 422. Additionally, the compound object creation component may create both a cell view and a card view of the created compound object.

As should be appreciated, operations 422-436 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 5A-5D illustrate creating and editing compound objects and compound object types from a card view.

As described herein, the card view user interface is an expanded view that displays one or more values stored in the compound object and custom rendering. The card view can further display nested values or an indication that a nested value is stored in the compound object (e.g., ellipses, array symbol, or other indication). The card view can also be an editable user interface, providing the ability to edit the values or structure of the compound object. In some embodiments, the card view can be used to create a compound object entirely, through the specification of the structure and values. Yet in other embodiments, the card view may be used to create or edit a compound object type (e.g., a new schema that identifies of the structured organization of the data and any properties of the compound object), which can be saved and re-used or shared. The editable card view can be used to also specify values to be stored according to the defined structure to thereby create a compound object. As described herein with reference to FIGS. 4A-4D, a compound object may be created through the definition of a formula. In some embodiments, the card view is an alternative way to create a compound object type (e.g., schema definition that can be saved and re-used) or a compound object.

Figure 5A:
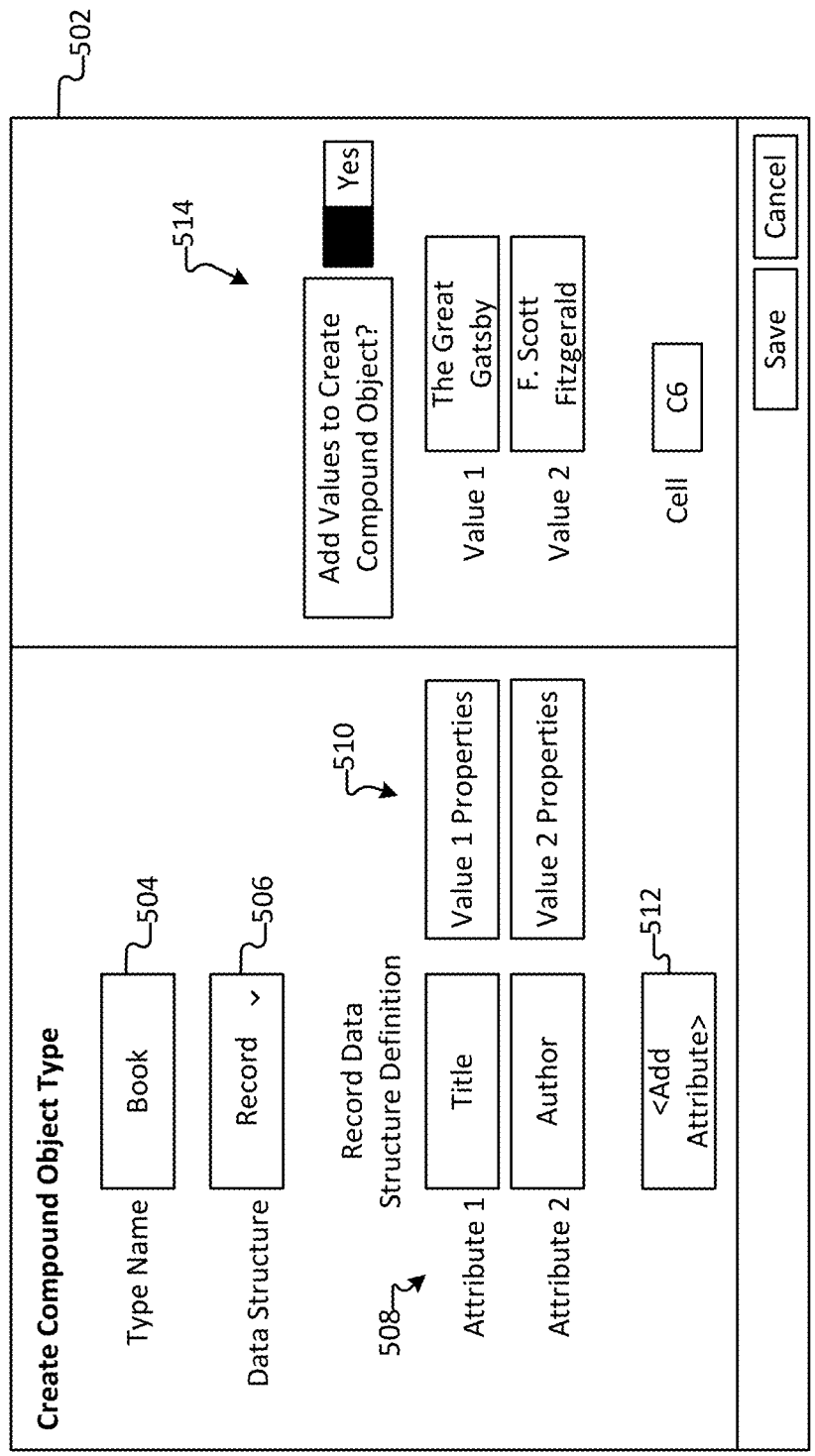
FIG. 5A illustrates an example in which a compound object type and corresponding compound object is created from a card view.

An example of an editable card view 502 is illustrated in FIG. 5A. As described with reference to FIGS. 4A-4D, a compound object can be created through the definition of a formula. As also described herein, such a formula definition, in turn, creates a corresponding card view of the compound object. Conversely, the card view also enables users to create a compound object type and specify the corresponding values to create a compound object in a single step. In turn, a corresponding formula definition of the compound object may be automatically created. The editable card view allows users to more easily create compound object types and compound objects without requiring the knowledge of potentially complex formulaic language.

FIG. 5A illustrates an example in which a compound object type and corresponding compound object is created from a card view.

As described herein, a compound object type is a structural definition of a compound object that can be reused or shared and is expressed by a schema. A schema identifies the data structure by which the values are organized (e.g., record, vector, matrix, table, array, or other data structure) and properties of the compound object (e.g., types of values to be received, a particular pattern by which values are received, cell and card views, validation rules, behavior of the compound object in calculations, display formatting, conditional formatting rules, etc.). In this example, the card view 502 is used to create a compound object type, which defines the structure and compound object properties. The example card view 502 is also used to create a compound object because values are specified. Although this example illustrates the creation of a compound object type and a compound object, embodiments of the present disclosure also provide the ability to solely create a compound object type without specifying values or using the card view to create a new compound object from a pre-existing compound object type.

Referring back to FIG. 5A, in some embodiments, the user may select an "Insert New Object" option from the spreadsheet application, to obtain the card view 502. In this example, the card view 502 is used to create a compound object type 504 named "Book." Also in this example, the card view 502 provides the option to select, from a drop down menu, a data structure 506. In this example, the record data structure is selected. In some embodiments, the card view may update based on a selection of the data structure. For example, if a table data structure is selected, the card view may update to provide row or column details. In this example, because a record data structure is specified, the card view 502 is updated to provide attribute and value details. More specifically an attribute user interface 508 for specifying one or more attributes is provided and a corresponding value properties user interface 510 for specifying properties of each expected value is also provided. Value properties may be, for example, type of data (e.g., number, string, etc.), format (e.g., "mm/dd/yyyy" for a date value, "_ _ _ - _ _ _ _ - _ _ _ _" for a credit card value, "(_ _ _) _ _ _ - _ _ _ _" for a phone number, etc.), validation rules, behavior of the value in calculations, etc. Accordingly, in this example, the schema for the Book compound object type identifies the data structure 506 as a record having two attributes 506: "Title" and "Author" as well as user-defined value properties. Additional attributes may be added by selection of the add attribute button 512. Upon definition of the structure and properties, the compound object type is saved, locally or externally, so that it may be reused or shared with other users.

Furthermore, in this example, the card view 502 is also used to create a corresponding compound object by the specification of values. Accordingly, the example card view 502 provides a value user interface 514 to specify values to create a compound object. As illustrated in FIG. 5A, the value user interface 514 includes a text box in which to enter the values (e.g., "The Great Gatsby" and "F. Scott Fitzgerald") corresponding to the attributes (e.g., "Title" and "Author") defined by the schema. In this example, the value user interface 514 further provides a text box to select the cell (e.g., "Cell C6") in which to store the compound object. As will be described in further detail herein, creation of a compound object may also automatically create a formula definition of the compound object.

In other embodiments, a compound object can be created using a pre-existing compound object type. In such an example, a similar user interface may be provided, specifying the data structure of the compound object type and information regarding value properties. Accordingly, values may be provided to create a corresponding compound object.

Figure 5B:
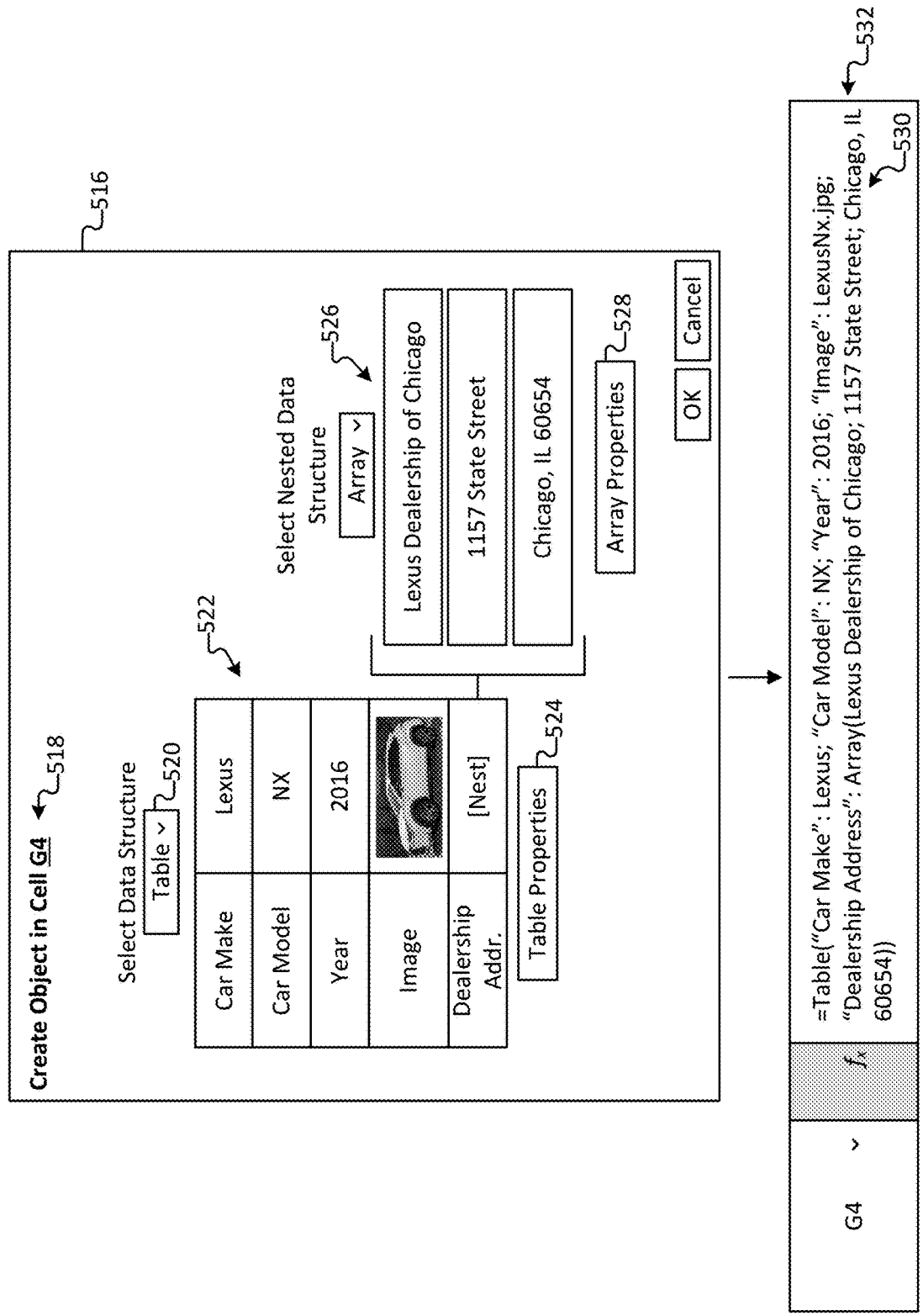
FIG. 5B illustrates an example editable card view from which a schema or a compound object can be created.

FIG. 5B illustrates an example card view from which a compound object can be created.

As described in FIG. 5A, a compound object may be created from the card view, simultaneously with the creation of a compound object type. FIG. 5B illustrates an example in which a compound object is created through the specification of the data structure and corresponding values.

Much like a compound object type, a compound object can be created through the specification of the data structure and compound object properties, however such a compound object is not typically stored in memory so that it can be reused or shared. It is, rather, a standalone object. Accordingly, the card view can be used to create such a compound object.

In some embodiments, the card view 516 may be displayed, for example, through the selection of a "create object" or "edit object" option of the spreadsheet application. In other embodiments, the card view 516 may be displayed by selecting the cell in which the compound object is to be stored and selecting an option to store a compound object therein. In this example, the card view 526 is a user interface by which a compound object may be created. More specifically, the data structure by which values are organized may be defined as well as the corresponding values. Accordingly, in this example, the card view 516 includes a header 518 (e.g., "Create Object in Cell G4") indicating the cell in which the compound object is to be stored (e.g., cell G4). Furthermore, the card view 516 includes a structure selection menu 520 from which a data structure (e.g., record, vector, matrix, table, array, etc.) may be selected. In this example, a table data structure is selected and in response to such a selection, a table 522 is populated. In some embodiments, the table dimensions may be specified in the table properties menu 524 and in other embodiments, another user interface for specifying such dimensions may be provided.

As illustrated, the table is a 2×5 dimension table, wherein the first column specifies header values (e.g., "Car Make," "Car Model," "Year," "Image," and "Dealership Address") while the second column specifies the corresponding values (e.g., "Lexus," "NX," "2016," "[Vehicle Image]," and "[Nest]"). In this example, the "[Nest]" value is an indication that the value is a nested value, which is organized according to a defined data structure. Thus, based on a selection of a nested value as the value associated with the "Dealership Address" header, a nested structure selection menu 526 may be provided. The example nested structure selection menu 526 allows a user to select a data structure by which the one or more nested values will be organized. In this example, an array data structure is selected and in response to such a selection, an array 526 is populated. In some embodiments, the array dimensions may be specified in the array properties menu 528 and in other embodiments, another user interface for specifying such dimensions may be provided. As illustrated, the array is a 1×3 dimension array having the values "Lexus Dealership of Chicago, " "1157 State Street, " "Chicago, Ill. 60654. "

Additionally, in some embodiments, properties or conditions associated with each value (or at an attribute level, for example) may be defined from the editable card view. In an example, a preferred or required format may be provided (e.g., mm/dd/yyyy for a date, or (_ _ _) _ _ _ - _ _ _ - _ _ _ _ for a phone number pattern), type of data permitted (numerical value, string, graph, image, etc.), and any validation conditions. In some embodiments, these properties and conditions may be set at an extended user interface or in the table properties menu 524 or array properties menu 528. Accordingly, aspects of the present disclosure provide the ability for a user to, using the editable card view 516, create a new compound object. As a result, the spreadsheet application may automatically generate a corresponding formula, such as, for example, formula 530 (e.g., =Table("Car Make": Lexus; "Car Model": NX; "Year": 2016; "Image": LexusNx.jpg; "Dealership Address": Array(Lexus Dealership of Chicago; 1157 State Street; Chicago, Ill. 60654))." The example formula 530 illustrated in the formula bar 532 defines the table 522, including each header and associated value, the nested array 526, and each corresponding value. Although a particular formula syntax is provided, it is understood that aspects of the present disclosure are not limited to this particular syntax and any suitable formula syntax may alternatively be used.

Figure 5C:
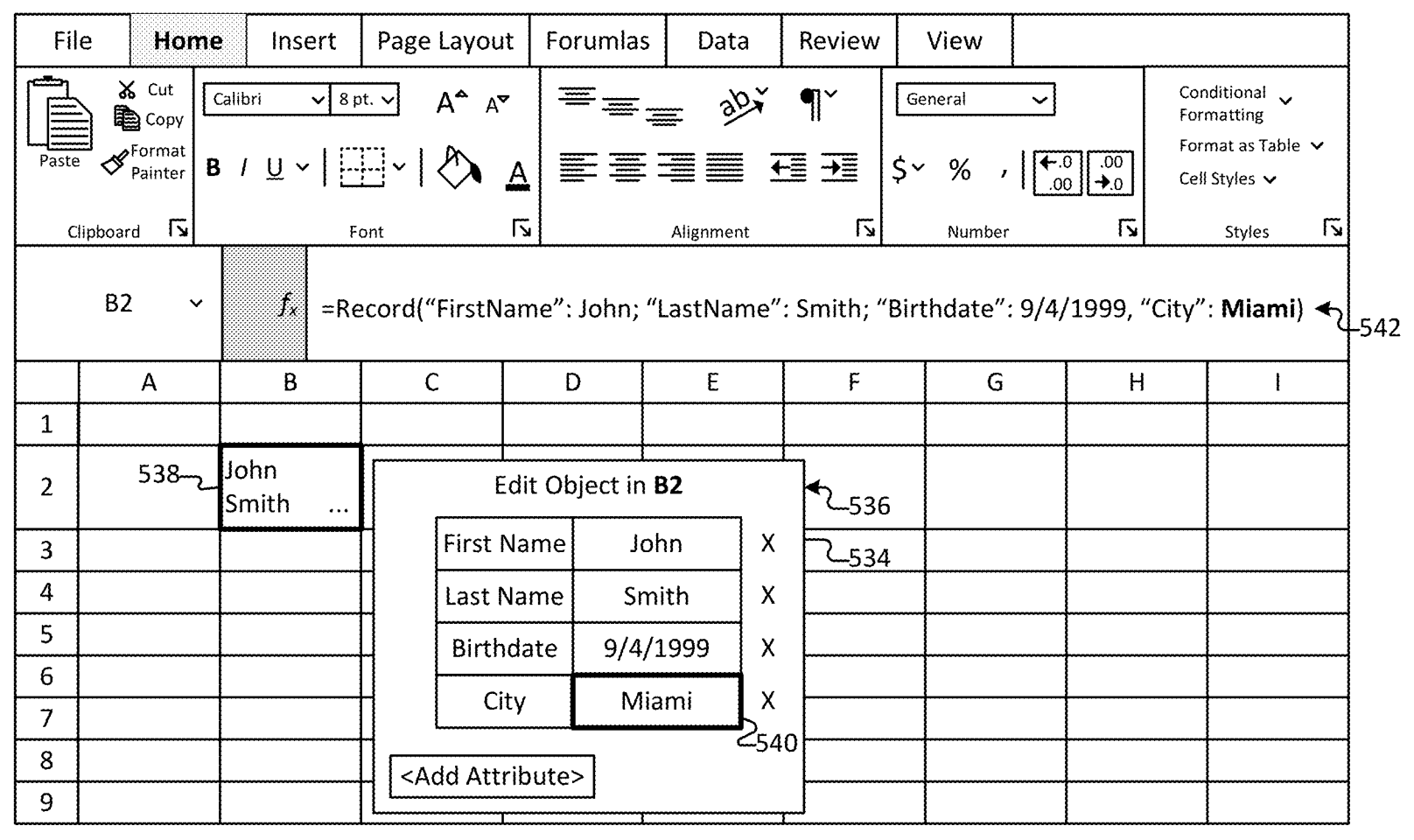

FIG. 5C illustrates an example embodiment in which a compound object can be edited from the card view.

Illustrated in this example is an editable card view 534 of a compound object 536 stored in cell B2 538. In this example, a compound object is structured according to a record data structure having four attributes (e.g., "First Name," "Last Name," "Birthdate," and "City") and four corresponding values (e.g., "John," "Smith," "Sep. 4, 1999," and "Miami"). In this example, the attributes or values of the compound object 536 may be edited from the editable card view 534. In an example, editing an attribute or value of a pre-existing compound object may be performed by simply selecting (e.g., double-click, right click to an edit selection, selection of an edit mode, etc.) and editing a particular attribute or value. Additionally, any change to an attribute or value from the editable card view 534 will correspondingly alter the formula definition of the compound object 536. In an example, the city value 540 may be selected and edited to reflect the name of a new city. Such a change would, in turn, automatically update the corresponding formula 542 to reflect the value change. Although editing of a value is illustrated, in some embodiments, the editable card view 534 may also be used to edit other aspects of the compound object, such as, for example, header values of a table, attribute values of a record, properties, validation conditions, etc. Such changes would also correspondingly change the formula definition of the compound object. Accordingly, users may more easily edit a compound object without having the requisite understanding of potentially complex formulaic language.

In yet other embodiments, an editable card view may be used to open a pre-existing schema defining a compound object type and edit the schema. In such an embodiment, the new schema definition may be saved in storage (e.g., in storage 122) to overwrite the existing schema definition or it may be saved as a new schema altogether.

Figure 5D:
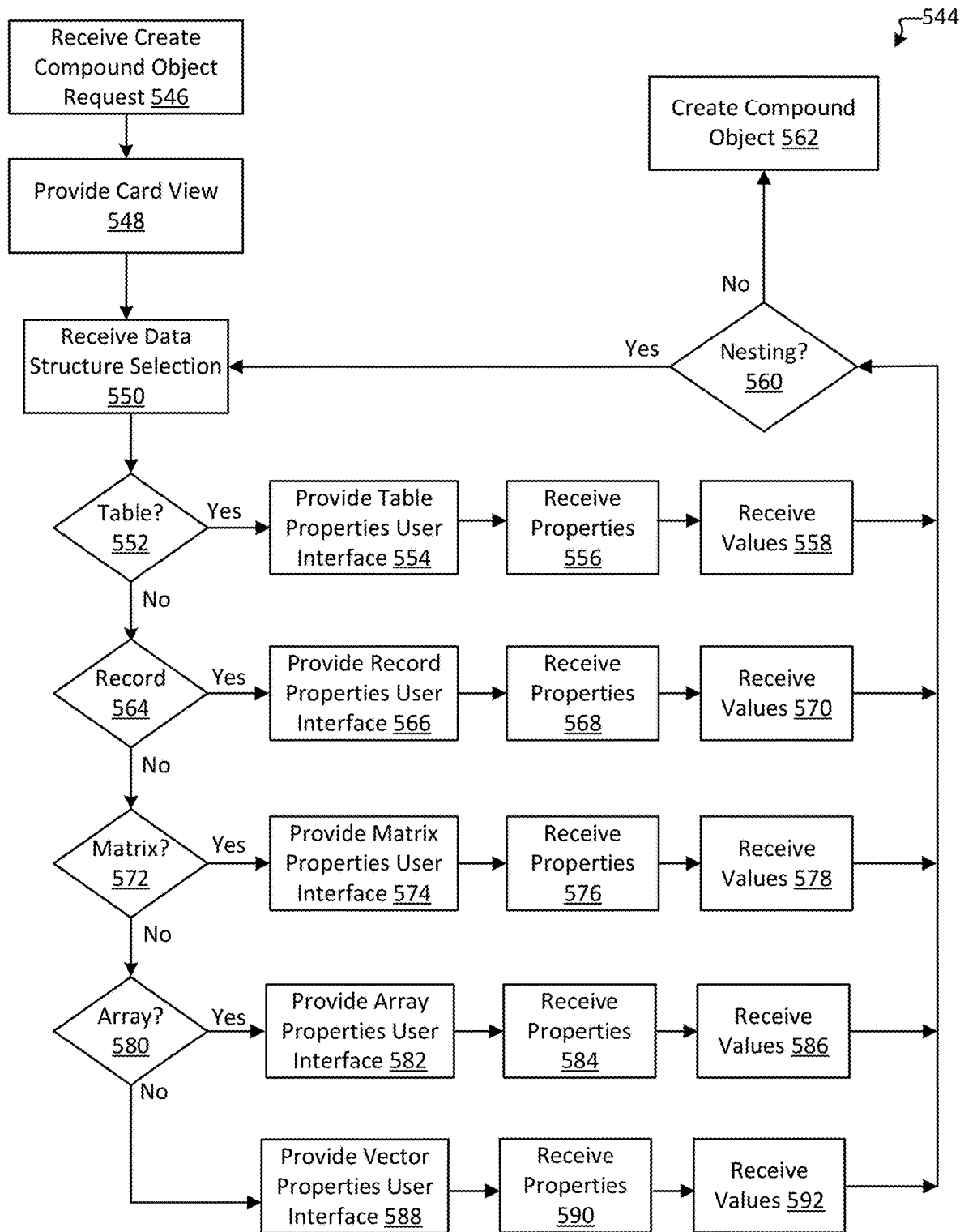
FIG. 5D illustrates a method for creating a compound object from a card view, as described and illustrated with reference to FIG. 5A-5C.

FIG. 5D illustrates a method 544 for creating a compound object from a card view, as described and illustrated with reference to FIG. 5A-5C.

At the receive create compound object request operation 546, the spreadsheet application 110 receives a request to create a compound object. This may be performed through a user interface, for example.

In response to receiving the create compound object request, the spreadsheet application 110 provides, in the provide card view operation 548, a card view for creating a compound object. Such an example card view is illustrated and described with reference to FIG. 5A and FIG. 5B. As illustrated in those examples, the card view may be a user interface by which a compound object can be defined. In particular, the data structure and values may be defined at the card view. In some embodiments, the editable card view may be provided, for example, in response to the selection of a "create object" option. The editable card view may include text boxes for defining attributes or headers, if any, as well as corresponding values. In some embodiments, the editable card view user interface may provide the ability to further specify properties associated with each value, such as, the format (e.g., mm/dd/yy for a date, or (_ _ _) _ _ _ - _ _ _ - _ _ _ _ for a phone number pattern) of each value, the particular type of value (e.g., a numerical value, a string value, a graph, an image, etc.), and any validation conditions. In some embodiments, the editable card view may additionally provide a value text box (e.g., value text box 510) to allow specification of values. Furthermore, it is understood that any values provided may be rich data types (e.g. 5 kg or Chicago). Generally, a value being of a rich data type is defined as a type of data that has context and established relationships with other types of data. Accordingly, a rich data type is a data value having associated context, which may be units (e.g., inches, miles, meters, kilograms, seconds, joules, hertz, Fahrenheit, etc.) or other information about the data's type (e.g., city, stock, NCAA football team, car, restaurant, school, etc.). Additionally, a value being of a rich data type further includes established relationships with other types of data that provides the spreadsheet application with further information regarding how that value fits in context with other values. Rich data values also have associated behaviors (e.g., error checking, tokens to edit units, etc.). The editable card view may additionally provide the ability to add or delete attributes and headers. Accordingly the editable card view allows for the creation of a new compound object.

At the receive data structure operation 550, one or more data structures are defined and received at the editable card view. As described herein, a compound object includes multiple values that are organized according to a data structure. Accordingly, in the receive data structure operation 550, the structural definition is received at the editable card view. Such a data structure may refer to, for example, a table, record, matrix, array, or vector. Furthermore, the compound object may store multiple values as any nested combination of any one of the known or user-defined data structures (e.g., nesting an array within a vector, or nesting a record within a record, or nesting matrices within a table, etc.).

At the table decision operation 552, the spreadsheet application determines whether, in operation 550, a table data structure was selected. In particular, the table data structure may have been identified as the data structure by which the values are to be organized. If a table data structure was selected (YES at decision operation 552), the method 544 proceeds to the provide table properties user interface operation 554.

In the provide table properties user interface operation 554, the spreadsheet application provides a user interface to define table properties. In some embodiments, table properties may refer to, for example, the specification of row or column header values as well as the number of rows and columns. The table properties may further provide the ability to specify value properties, such as the format (e.g., mm/dd/yy for a date, or (_ _ _) _ _ _ - _ _ _ - _ _ _ _ for a phone number pattern) of each expected value, the particular type of value (e.g., a numerical value, a string value, a graph, an image, etc.), and any validation conditions.

In the receive properties operation 556, the properties described in operation 554 are received at the card view. For example, row or column header values are received as well as the number of rows and columns. Alternatively or additionally, value properties are also received.

In the receive values operation 558, one or more values are received at the card view and organized according to the table data structure.

In the nesting decision operation 560, the spreadsheet application determines whether nested values are indicated. As described herein, the compound object may store multiple values as any nested combination of any one of the known or user-defined data structures (e.g., nesting an array within a vector, or nesting a record within a record, or nesting matrices within a table, etc.). Accordingly, in the nesting decision operation 560, it is determined whether nesting is indicated. In particular, one or more values specified in the table may store nested values. If nesting is not indicated (NO at decision operation 560), the method 544 proceeds to the create compound object operation 562. In the create compound object operation 562, a compound object is created and stored in the identified cell. Furthermore, a formula definition of the compound object may also be created.

If, however, one or more nested values are indicated (YES at decision operation 560), the method 544, proceeds to the receive data structure selection operation 550 in which the data structure for the nested value is defined. At the receive data structure selection operation 550, a data structure is received.

Referring back to the table decision operation 552, if a table data structure was not selected (NO at decision operation 552), the method 544 proceeds to the record decision operation 564.

At the record decision operation 564, the spreadsheet application determines whether, in operation 550, a record data structure was selected. In particular, the record data structure may have been identified as the data structure by which the values are to be organized. If a record data structure was selected (YES at decision operation 564), the method 544 proceeds to the provide record properties user interface operation 566.

In the provide record properties user interface operation 566, the spreadsheet application provides a user interface to define record properties. In some embodiments, record properties may refer to, for example, the specification of attributes as well as the number of attributes. The record properties may further provide the ability to specify value properties, such as the format (e.g., mm/dd/yy for a date, or (_ _ _) _ _ _ - _ _ _ - _ _ _ _ for a phone number pattern) of each expected value, the particular type of value (e.g., a numerical value, a string value, a graph, an image, etc.), and any validation conditions.

In the receive properties operation 568, the properties described in operation 566 are received at the card view. For example, attributes are received as well as the number of attributes. Alternatively or additionally, value properties are also received.

In the receive values operation 570, one or more values are received at the card view and organized according to the record data structure. In particular, a value for each specified attribute is received.

The method 544 proceeds to the nesting operation 560, the spreadsheet application determines whether nested values are indicated. In particular, one or more values specified in the record may store nested values. If nesting is not indicated (NO at decision operation 560), the method 544 proceeds to the create compound object operation 562. If, however, nesting is indicated (YES at decision operation 560), the method 544 proceeds to the receive data structure selection operation 550 in which the data structure for the nested value is defined. At the receive data structure selection operation 550, a data structure is received.

Referring back to the record decision operation 564, if a record data structure was not selected (NO at decision operation 564), the method 544 proceeds to the matrix decision operation 572.

At the matrix decision operation 572, the spreadsheet application determines whether, in operation 550, a matrix data structure was selected. In particular, the matrix data structure may have been identified as the data structure by which the values are to be organized. If a matrix data structure was selected (YES at decision operation 572), the method 544 proceeds to the provide matrix properties user interface operation 574.

In the provide matrix properties user interface operation 574, the spreadsheet application provides a user interface to define matrix properties. In some embodiments, matrix properties may refer to, for example, the specification of the dimension of the matrix. The matrix properties may further provide the ability to specify value properties, such as the format of each expected value, the particular type of value, and any validation conditions.

In the receive properties operation 576, the properties described in operation 576 are received at the card view. For example, matrix dimension is received. Alternatively or additionally, value properties are also received.

In the receive values operation 578, one or more values are received at the card view and organized according to the matrix data structure.

The method 544 proceeds to the nesting operation 560, the spreadsheet application determines whether nested values are indicated. In particular, one or more values specified in the record may store nested values. If nesting is not indicated (NO at decision operation 560), the method 544 proceeds to the create compound object operation 562. If, however, nesting is indicated (YES at decision operation 560), the method 544 proceeds to the receive data structure selection operation 550 in which the data structure for the nested value is defined. At the receive data structure selection operation 550, a data structure is received.

Referring back to the matrix decision operation 572, if a matrix data structure was not selected (NO at decision operation 572), the method 544 proceeds to the array decision operation 580.

At the array decision operation 580, the spreadsheet application determines whether, in operation 550, an array data structure was selected. In particular, the array data structure may have been identified as the data structure by which the values are to be organized. If an array data structure was selected (YES at decision operation 580), the method 544 proceeds to the provide array properties user interface operation 582.

In the provide array properties user interface operation 582, the spreadsheet application provides a user interface to define array properties. In some embodiments, array properties may refer to, for example, the specification of the dimension of the array. The array properties may further provide the ability to specify value properties, such as the format of each expected value, the particular type of value, and any validation conditions.

In the receive properties operation 584, the properties described in operation 582 are received at the card view. For example, the array dimension is received. Alternatively or additionally, value properties are also received.

In the receive values operation 586, one or more values are received at the card view and organized according to the array data structure.

The method 544 proceeds to the nesting operation 560, the spreadsheet application determines whether nested values are indicated. In particular, one or more values specified in the record may store nested values. If nesting is not indicated (NO at decision operation 560), the method 544 proceeds to the create compound object operation 562. If, however, nesting is indicated (YES at decision operation 560), the method 544 proceeds to the receive data structure selection operation 550 in which the data structure for the nested value is defined. At the receive data structure selection operation 550, a data structure is received.

Referring back to the array decision operation 580, if a matrix data structure was not selected (NO at decision operation 580), the method 544 proceeds to the provide vector properties user interface operation 588. In the vector properties user interface operation 588, the spreadsheet application provides a user interface to define vector properties. In some embodiments, vector properties may refer to, for example, the specification of the dimension of the vector. The vector properties may further provide the ability to specify value properties, such as the format of each expected value, the particular type of value, and any validation conditions.

In the receive properties operation 590, the properties described in operation 588 are received at the card view. For example, the vector dimension is received. Alternatively or additionally, value properties are also received.

In the receive values operation 592, one or more values are received at the card view and organized according to the vector data structure.

The method 544 proceeds to the nesting operation 560, the spreadsheet application determines whether nested values are indicated. In particular, one or more values specified in the record may store nested values. If nesting is not indicated (NO at decision operation 560), the method 544 proceeds to the create compound object operation 562. If, however, nesting is indicated (YES at decision operation 560), the method 544 proceeds to the receive data structure selection operation 550 in which the data structure for the nested value is defined. At the receive data structure selection operation 550, a data structure is received.

As should be appreciated, operations 544-592 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 6A-6E illustrate examples of referencing values in compound objects.

Figure 6A:
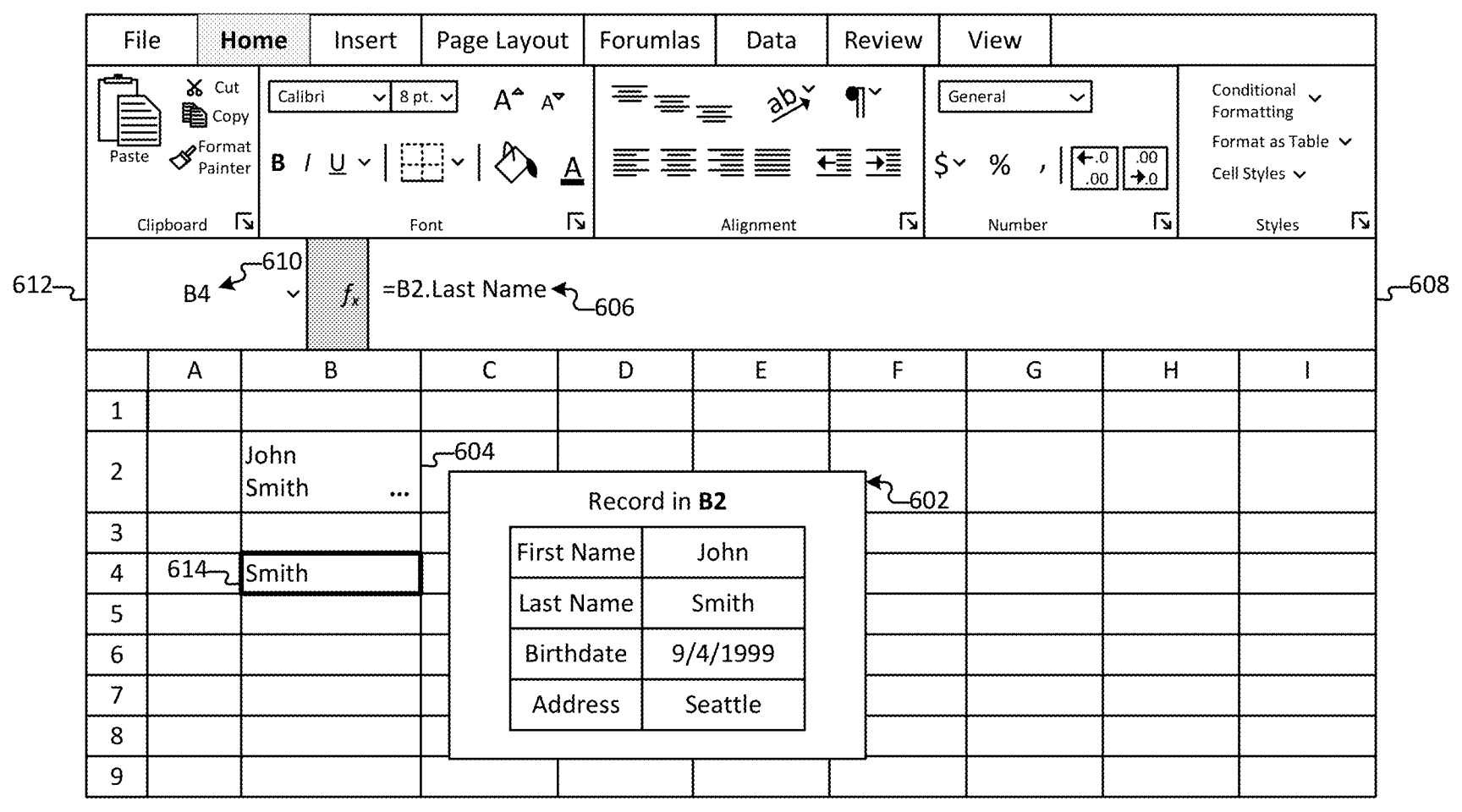

FIG. 6A illustrates an example embodiment in which values of a compound object are referenced.

As described herein, a compound object may store multiple values according to a known defined data structure such as, for example, a record, vector, matrix, table, or array. In other embodiments, the compound object may store multiple values as another defined data structure, such as, for example, a user-defined data structure. In other embodiments, the compound object may store multiple values as any nested combination of any one of the known or user-defined data structures (e.g., nesting an array within a vector, or nesting a record within a record, or nesting matrices within a table, etc.). Each of the values stored in the compound object are individually referenceable and can fully participate with spreadsheet functionality including calculations, referencing, and formatting. As illustrated in FIG. 6A, a compound object 602 is stored in cell B2 604. The compound object 602 is organized according to a record data structure and is therefore organized in attribute-value pairs. The compound object 602 therefore includes four attributes (e.g., "First Name," "Last Name," "Birthdate," and "City") and four corresponding values (e.g., "John," "Smith," "Sep. 4, 1999" and "Seattle"). In this example, each of the values of the compound object may be individually referenced in a formula by the corresponding attribute. For example, the formula 606 (e.g., "=B2.Last Name") displayed in the formula bar 608 uses the attribute "Last Name" to reference the corresponding value "Smith." In this example, the formula is represented by a particular notation. Such a notation is referred to herein as dot notation and may take the following example format: [Cell].[Attribute] for a record data structure. Such notation identifies the cell storing the compound object and the attribute, within that cell, to yield the value. As illustrated by the cell identifier 610, the result (e.g., "Smith") of the formula "=B2.Last Name" is to be stored in cell B4 614. Accordingly, as illustrated, the value (e.g., "Smith") corresponding to the referenced attribute (e.g., "Last Name") of the compound object 602 stored in cell B2 604 is now stored and displayed in cell B4 614. In other embodiments, such notation can be used within a formula and used in calculations. Accordingly, the example dot notation may be used to easily reference a value among multiple values of a compound object that is stored in a single cell.

The dot notation may also be used for the other data structures. For example, a value stored in a compound object that is organized according to an array data structure may be referenced by the formula "=G7.[5]" to yield the fifth value of the array.

It is further contemplated that a notation may be used to reference more than one value of the compound object, which will be described in further detail herein. Although the particular dot notation is illustrated in this example, it is understood that this disclosure is not limited to a particular notation. Rather, any such notation may be used to reference one or more individual values of a compound object.

Figure 6B:
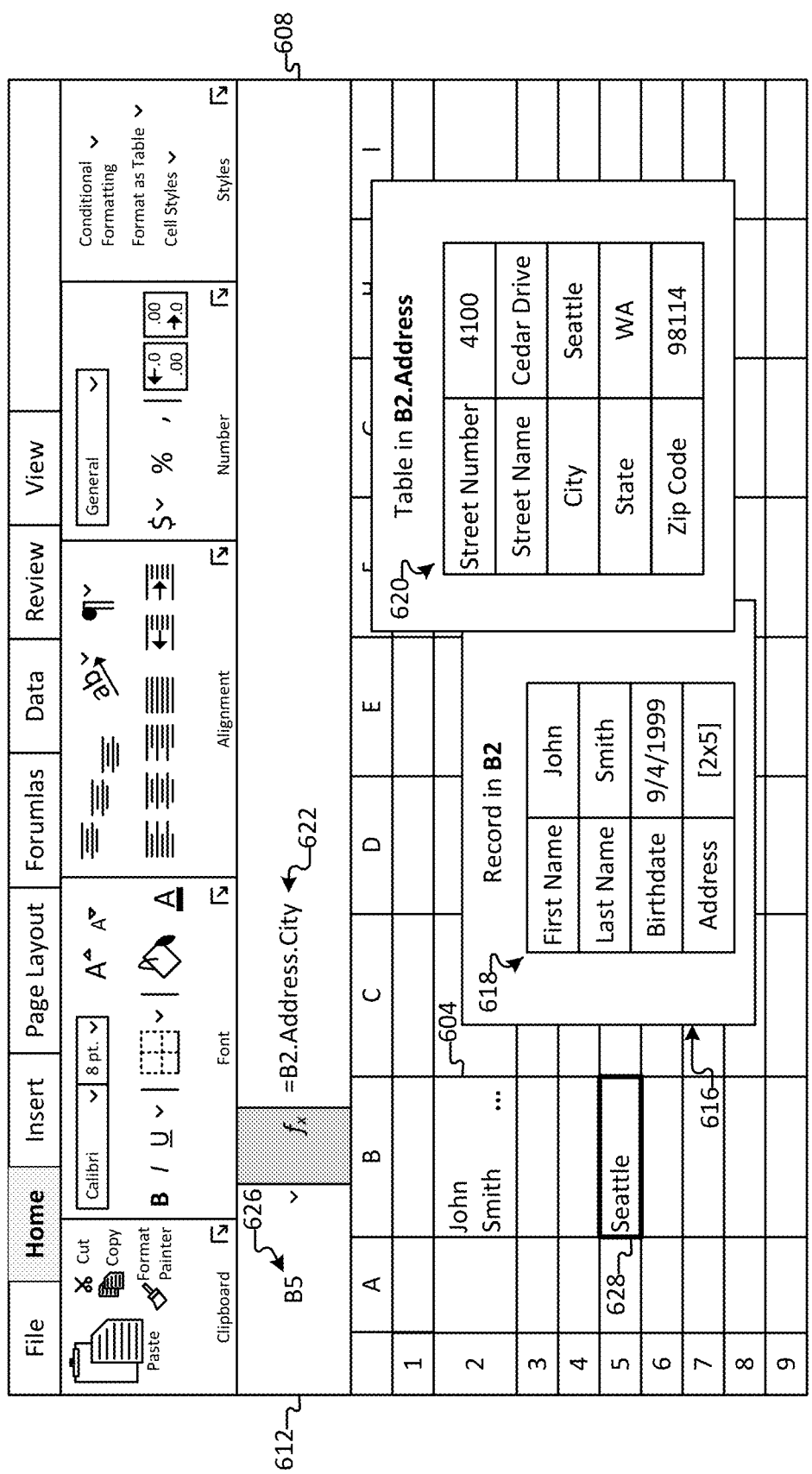
FIG. 6B illustrates an example embodiment in which values of a nested compound object are referenced.

FIG. 6B illustrates an example embodiment in which values of a nested compound object are referenced.

As described herein, a compound object may store multiple values as any nested combination of any one of the known or user-defined data structures (e.g., nesting a matrix within a table that is nested within another table, or nesting a record within a record, etc.). Each of these values can be individually referenced and used in calculations. As illustrated in FIG. 6B, a compound object 616 is stored in cell B2 604. The compound object 616 is organized according to a record data structure 618 and is therefore organized according to attribute-value pairs. The record 618 includes four attributes (e.g., "First Name," "Last Name," "Birthdate," and "Address") and four corresponding values (e.g., "John," "Smith," "Sep. 4, 1999" and "[2×5]"). The value corresponding to the "Address" attribute is symbol "[2×5]," which, in this example, indicates that the value stores a nested, 2×5 dimension table 620. The nested 2×5 dimension table 620 has five headers (e.g., "Street Number," "Street Name," "City," "State," and "Zip Code") and five corresponding values (e.g., "4100," "Cedar Drive," "Seattle," "WA," "98114").

In this example, each value of the nested table 620 may be referenced in a formula. For example, the formula 622 (e.g., "=B2.Address.City") displayed in the formula bar 608 references the value corresponding to the "Address" attribute of the record 618 and the value corresponding to the "City" header of the nested table 620 to thereby return the value "Seattle." The returned value, "Seattle" is therefore stored and displayed in cell B5 628 as indicated by the cell identifier 626. In another example, if the table had multiple non-header rows, the formula 622 may return a row of values related to the "City" column of the nested table 620.

In this example, the formula 622 is also represented by dot notation of the following format: [Cell].[Attribute]. [Header]. Such a notation references the cell storing the compound object, the value corresponding to the attribute of the record data structure 618, and the value corresponding to the header of the table 620 nested within the value of the referenced attribute. In other words, the example notation identifies the cell (e.g., cell B2 604) in which the compound object is stored, the value (e.g., "[2×5]") corresponding to the referenced attribute (e.g., "Address") of the record data structure 618, and the value (e.g., "Seattle") corresponding to the header (e.g., "City") of the nested table 620. Accordingly, based on the cell identifier 626 referenced in the navigation ribbon 612, the value "Seattle" returned by the formula 622 is stored and displayed in cell B5 628. It is further contemplated that a notation may be used to reference more than one nested value, which will be described in further detail herein. Accordingly, the example dot notation may be used to easily reference a nested value of a compound object.

In other embodiments, if the data structure of the nested value is an array, an example syntax may reference an index value associated with the value. For example, the dot notation may simply be represented as the following: "=B2.Address.[3]" wherein the value [3] refers to the third value of the nested array. In another example, to obtain the value in the 4th row and 3rd column of an array stored in cell B2, the following formula may be used "=B2[4][3]" or alternatively, "=B2.[4,3]." For an array containing a record, for example, the following syntax may be used: "=B2.[4,3] .Address.City" assuming that, in such an example, a record has an address that has a city field. Accordingly, values at any nested level can be referenced. For example, the following syntax may be provided: "B2.[4,3].Address.City. CrimeStats[1,2].HomicidesTotal."

Although the particular dot notation is illustrated in this example, it is understood that this disclosure is not limited to a particular notation. Rather, any such notation may be used to reference one or more individual values of a compound object and nested values.

Figure 6C:
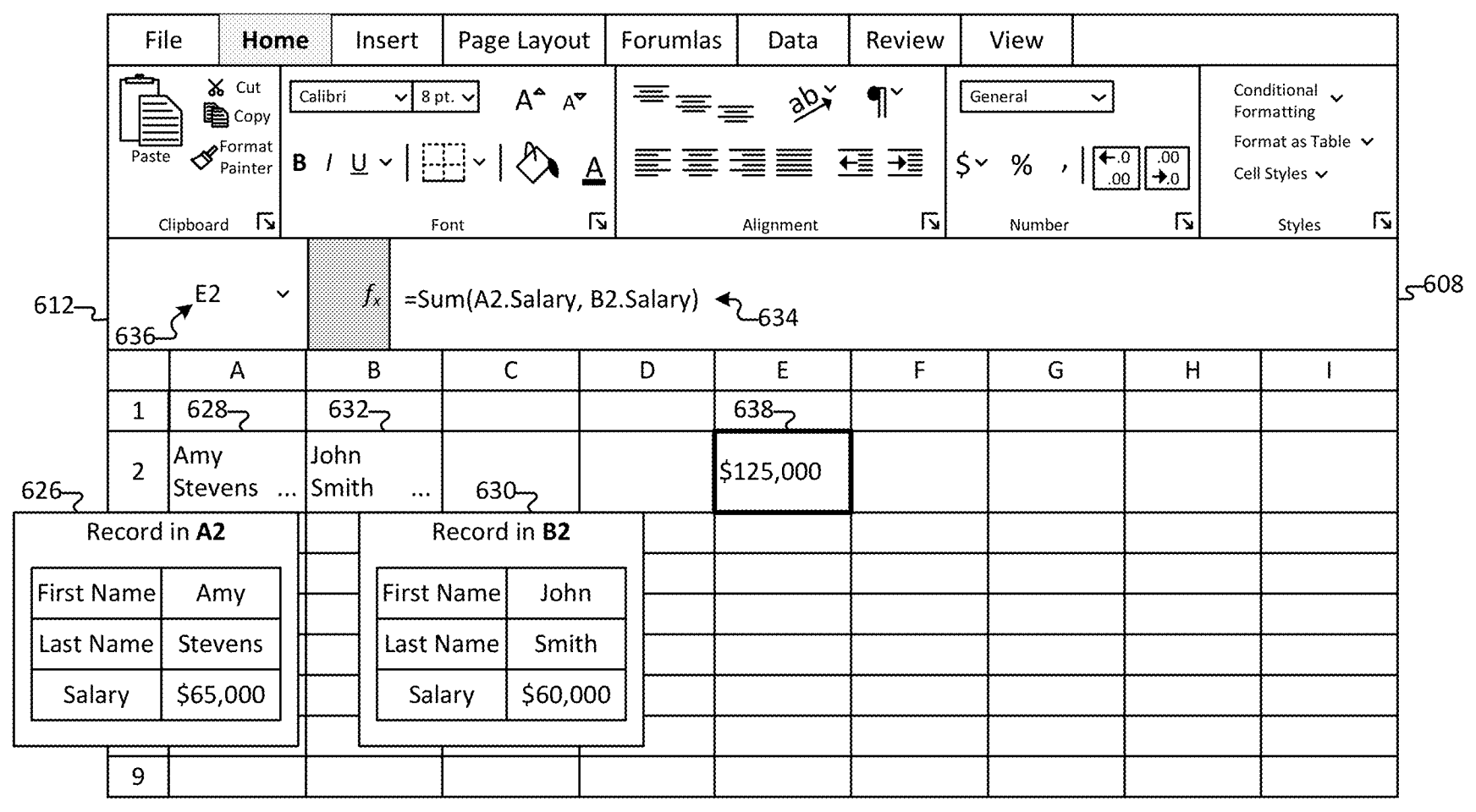

FIG. 6C illustrates an example embodiment in which values of multiple compound objects can be referenced and used in calculations.

As described herein, a compound object may store multiple values according to a known defined data structure such as, for example, a record, vector, matrix, table, or array. In other embodiments, the compound object may store multiple values as another defined data structure, such as, for example, a user-defined data structure. In other embodiments, the compound object may store multiple values as any nested combination of any one of the known or user-defined data structures. Regardless of the structure, each of the values stored in the compound object are individually referenceable and can fully participate with spreadsheet functionality including calculations, referencing, and formatting. As illustrated in FIG. 6C, a first compound object 626 is stored in cell A2 628 and a second compound object 630 is stored in cell B2 632. The first compound object 626 is organized according to a record data structure and includes three attributes (e.g., "First Name," "Last Name," and "Salary") and three corresponding values (e.g., "Amy," "Stevens," and "$65,000"). Likewise, the second compound object 630 is also organized according to a record data structure and includes three attributes (e.g., "First Name," "Last Name," and "Salary") and three corresponding values (e.g., "John," "Smith," and "$60,000").

In this example, values of multiple compound objects may be individually referenced, in a single formula, and used in calculations. For example, the formula 634 (e.g., "=Sum(A2.Salary, B2.Salary)") displayed in the formula bar 608 references the value corresponding to the attribute "Salary" of both the first compound object 626 and the second compound object 630. In this example, the formula 634 is a sum function that adds each of the referenced values, which are separated by commas. Accordingly, in the illustrated example, the sum function formula 634 adds values stored in two separate compound objects. In particular, the sum function formula 634 adds a first value (e.g., "$65,000") corresponding to the "Salary" attribute of the first compound object 626 stored in the cell A2 and a second value (e.g., "$60,000") corresponding to the "Salary" attribute of the second compound object 630 stored in the cell B2 632. Thus, it is understood that although a compound object stores, in a single cell, multiple values, those values may still be individually referenced. It is further understood that compound objects, and associated values, can fully participate in spreadsheet calculations, similarly as if those values were stored in individual cells. In the example illustrated in FIG. 6C, the formula 634 is a standard sum function formula that references the values corresponding to the respective "Salary" attribute of two compound objects. Based on the cell identifier 636 referenced in the navigation ribbon 612, the result of the sum function (e.g., "$125,000" which is the addition of "$65,000" and "$60,000") is stored and displayed in cell E2 638.

In this example, the formula 634 is also represented in dot notation having the following format: [Cell].[Attribute], wherein an attribute is used because the compound objects are organized according to a record data structure. Such a notation identifies the cell storing the compound object and the value, within that cell, corresponding to the referenced attribute of that compound object. In other embodiments, values within compound objects that are organized according to different data structures may also be used in computations. For example, a value of a compound object organized according to an array may be referenced in a formula alongside a value of a compound object organized according to a table data structure. It is further contemplated that more than one value of a compound object may be referenced in a formula. Although the formula 634 references values from two different compound objects, aspects of the present disclosure are also directed to a formula referencing multiple values of a single compound object and multiple values of multiple compound objects. Although the particular dot notation is illustrated in this example, it is understood that this disclosure is not limited to a particular notation. Rather, any such notation may be used to reference one or more individual values of a compound object and nested values.

Figure 6D:
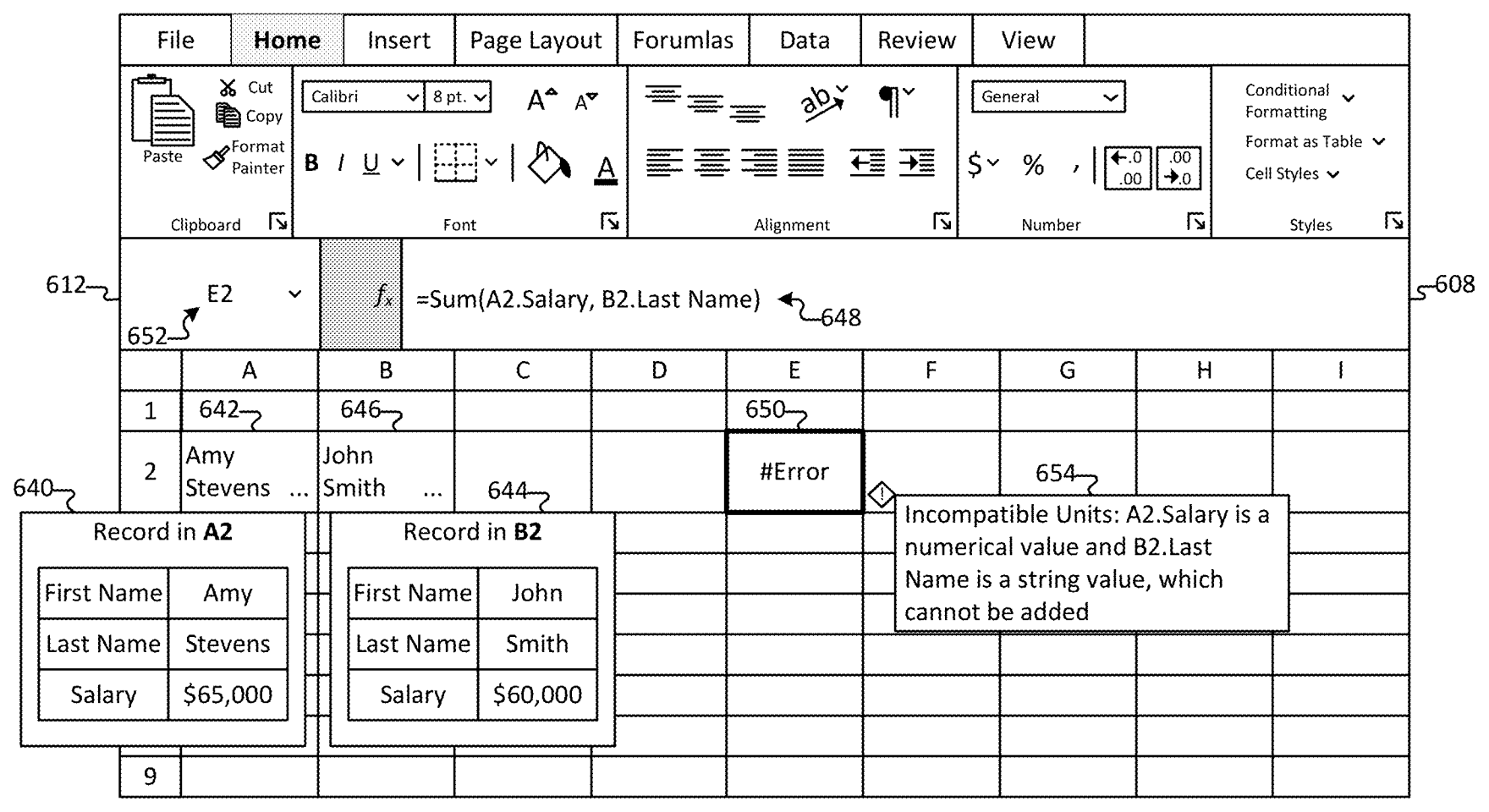

FIG. 6D illustrates an example embodiment in which an error message is displayed in response to a formula referencing incompatible values from one or more compound objects.

As illustrated in FIG. 6D, a first compound object 640 is stored in cell A2 642, and a second compound object 644 is stored in cell B2 646. The first compound object 640 is organized according to a record data structure, having three attributes (e.g., "First Name," "Last Name," and "Salary") and three corresponding values (e.g., "Amy," "Stevens," and "$65,000"). Likewise, the second compound object 644 is organized according to a record data structure, having three attributes (e.g., "First Name," "Last Name," and "Salary") and three corresponding values (e.g., "John," "Smith," and "$60,000").

In this example, values of one or more compound objects may be individually referenced and used in calculations, as illustrated in FIG. 6C. In this example, the sum function formula 648 (e.g., "=Sum(A2.Salary, B2.Last Name)") displayed in the formula bar 608 adds the value corresponding to the attribute "Salary" of the first compound object 640 with the value corresponding to the attribute "Last Name" of the second compound object 644. In particular, the sum function formula 648 adds "$65,000," which corresponds to the "Salary" attribute of the first compound object 626 to "Smith," which corresponds to the "Last Name" attribute of the second compound object 644. In this example, based on an analysis of the values, the spreadsheet application determines that the two values cannot be added because they are of inconsistent types. In particular, the spreadsheet application determines the first value is a numerical value (e.g., "$65,000") and the second value is a string value (e.g., "Smith"), which cannot be summed. Accordingly, cell E2 650—the cell in which the result is to be stored—displays a "#Error" value. In this example, an error message 654 is also displayed. The error message 654 identifies the type of error and provides an associated description of the error. In particular, the error message 654 identifies the error as resulting due to "Incompatible Units" and provides an associated description: "A2.Salary is a numerical value and B2.Last Name is a string value, which cannot be added." Oftentimes it is difficult to understand the error, and particularly when those values are not surfaced to the user, as when the value is stored in a compound object among multiple other values in a single cell. Aspects therefore provide an enhanced understanding and minimization of errors resulting from formula calculations using one or more values stored in one or more compound objects.

Additionally, a user may, via custom code extensibility, choose to override any existing spreadsheet application behavior. For example, for formulas, fill handle, sort, filter, etc. may be overridden to handle compound objects. In an example, a user or application developer may decide that the sum function can in fact take two compound objects of type "Person" and define what it means to add them, even adding a number to a string value to produce a valid result (e.g., a concatenated street number and street name to produce an address, or a concatenated team name and team statistics, for example).

In some embodiments, one or more values stored in a compound object are rich data values. As described herein, a rich data value is a novel data type described in U.S. Provisional Application Ser. No. 62/249,869, entitled "Rich Data Types," and U.S. Provisional Application Ser. No. 62/357,284, entitled "Rich Data Types," the disclosures of which have been incorporated herein by reference in their entirety. As described in that document, a rich data value is a type of data that has established relationships with other types of data. Understanding of established relationships provides the spreadsheet application with context about the value. This context provides the spreadsheet application with enhanced functionality, such as, for example, the ability to detect erroneous results due to a formula including incompatible types, the ability to provide suggested values when crafting a formula, etc. Accordingly, the disclosed spreadsheet application may minimize calculation errors. Still further, the disclosed spreadsheet application can also provide detailed explanations of the resultant error.

Figure 6E:
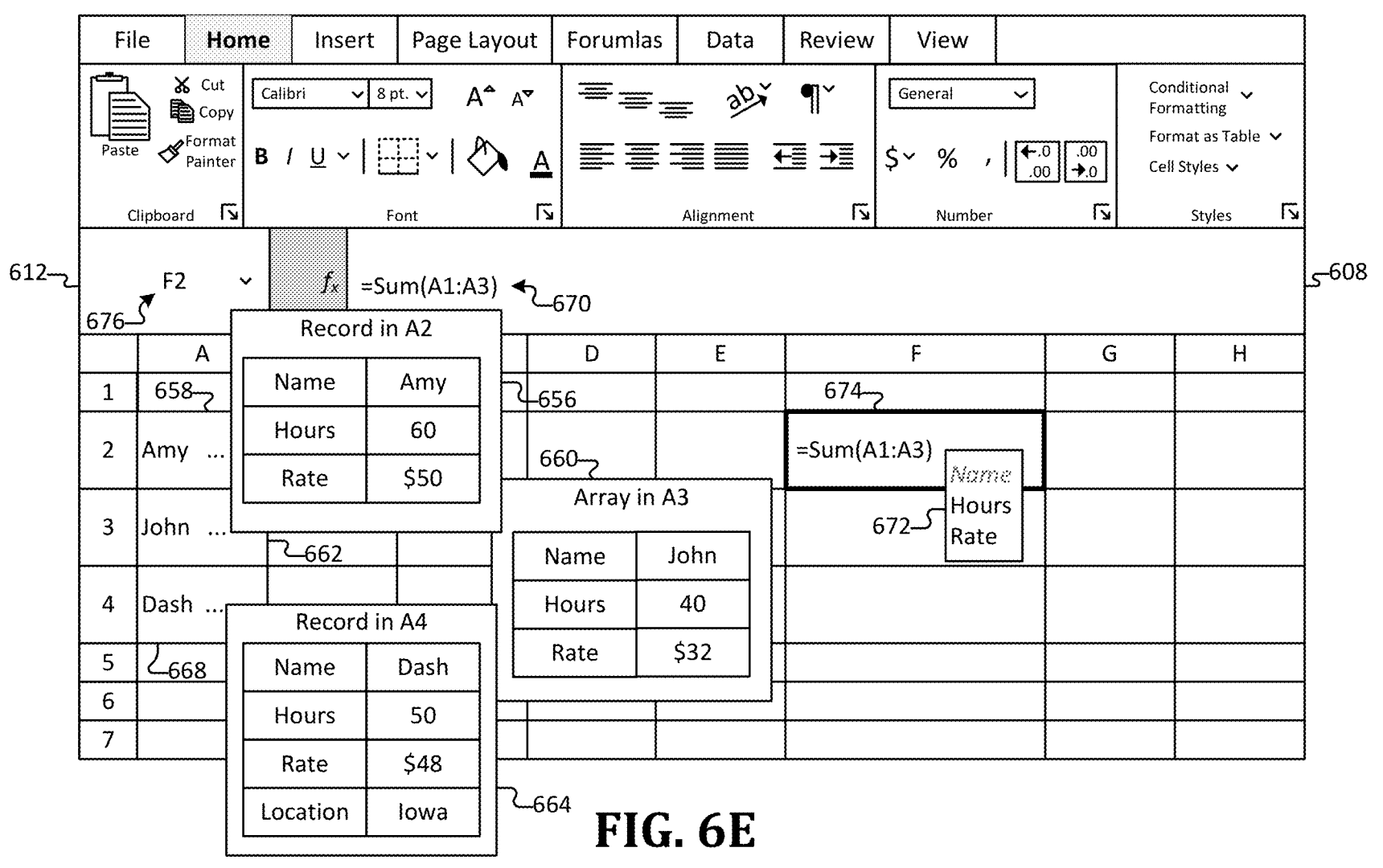

FIG. 6E illustrates an example embodiment in which values of multiple compound objects are referenced and used in calculations.

Three compound objects are illustrated: a first compound object 656 stored in cell A2 658, a second compound object 660 stored in cell A3 662, and a third compound object 664 stored in cell A4 668. The first compound object 656 is organized according to a record data structure and includes three attributes (e.g., "Name," "Hours," and "Rate") and three corresponding values (e.g., "Amy," "60," and "$50"). The second compound object 660 is organized according to a record data structure and includes three attributes (e.g., "Name," "Hours," and "Rate") and three values (e.g., "John," "40," and "$32"). The third compound object 664 is organized according to a record data structure and includes four attributes (e.g., "Name," "Hours," "Rate," and "Location") and four corresponding values (e.g., "Dash," "50," "$48," and "Iowa"). In embodiments presented herein, a range of multiple compound objects may be identified in a formula. For example, the formula 670 (e.g., "=Sum(A1: A3)") displayed in the formula bar 608 references the compound objects stored in cells A1 658, A2 62, and A3 668, but does not specify the value within each compound object to use in the calculation. In this example, the formula 670 is a sum function, which requires that each added value be of the same type (for example, have the same units and be of the same type, such as, for example a numerical value). Accordingly, in this example, a selection user interface 672 may be displayed in response to entry of the formula 670 in the formula bar 608, wherein the formula 670 does not specify a particular value of the compound object to use in the calculation. In this example, the selection user interface 672 is positioned near cell F2 674, which is the cell in which the result is to be displayed, as indicated by the cell identifier 676. The example selection user interface 672 displays selectable text corresponding to each attribute shared among the compound objects referenced in the formula 670. The selection user interface 672 allows the user to select the particular attribute corresponding to the desired value to use in the calculation. Thus, in this particular example, the selection user interface 672 displays three selectable text options: "Name," "Hours," and "Rate" because those attributes are shared among the three compound objects referenced in the formula 670. Note that in this example, the selection user interface 672 does not include the attribute "Location" of the third compound object 664 because that attribute is not shared among the other two compound objects. In other embodiments, however, the selection user interface 672 may display all attributes. Additionally, the "Name" attribute of the selection user interface 672 is grayed out and therefore is not selectable because the "Name" attribute corresponds to a string value, which, in this example, cannot be added to a numerical value. Accordingly, the "Name" attribute, although shared among the first compound object 656, the second compound object 660, and the third compound object 664, cannot be selected in this example. Based on a selection of an attribute in the selection user interface 672, the spreadsheet application can perform the sum function 670 by adding the values associated with the selected attribute from each of the compound objects stored in cells A1-A3.

Although in this example, no specific values are provided in the formula 670, the spreadsheet application can, in some embodiments, determine which values to add without receiving a selection of an attribute from the selection user interface 672. In particular, the sum function requires that each added value be of the same type (for example, values having the same unit, or at least having different units but of the same unit type). As described herein, compound objects may store rich data values having established relationships with other types of data that provide context about the value to the spreadsheet application. Referring back to FIG. 6E, each of the three compound objects have at least one string value and two numerical values. The string value is a name, the first numerical value has a unit "hours" of unit type "duration," and the second numerical value has a unit "dollar" of unit type "currency." By implementing rich data values and therefore understanding each of the values and their association with other values, the spreadsheet application can automatically determine which values to add. For example, the spreadsheet application may automatically determine that the values corresponding to the unit "hours" may be added together and that the values corresponding to the unit "dollars" may be added together. Still further, because the spreadsheet application understands relationships to other types of data, it may also automatically determine that the values corresponding to the unit "hours" may not be added with values corresponding to the unit "dollars" due to the inconsistent units and unit types. However, the spreadsheet application may add values of different units within the same unit type. For example, the spreadsheet application can determine that a value having the unit "hours" may be added to a value having the unit "seconds" because those values are within the same unit type (e.g., "duration") and therefore can be converted to a common unit within the same unit type in order to perform an addition operation. Accordingly, in the example illustrated in FIG. 6E, based on an implementation of rich data types, the spreadsheet application can, in some embodiments, automatically determine which values to add together if it receives a formula (e.g., the formula "=Sum(A1:A3)") that does not indicate the particular values to be added together.

Accordingly, in an example, the spreadsheet application can automatically select the "hours" attribute such that the result of the formula stored in cell F2 674 is a sum of the values corresponding to the hours attribute of the referenced compound objects. In other embodiments, the spreadsheet application may analyze the column or row of the cell in which the result is to be stored to identify a particular unit. Based on such an analysis, the spreadsheet application can select an appropriate attribute having a corresponding value with a unit consistent with the row or column of the cell in which the result is to be stored.

Figure 7A:
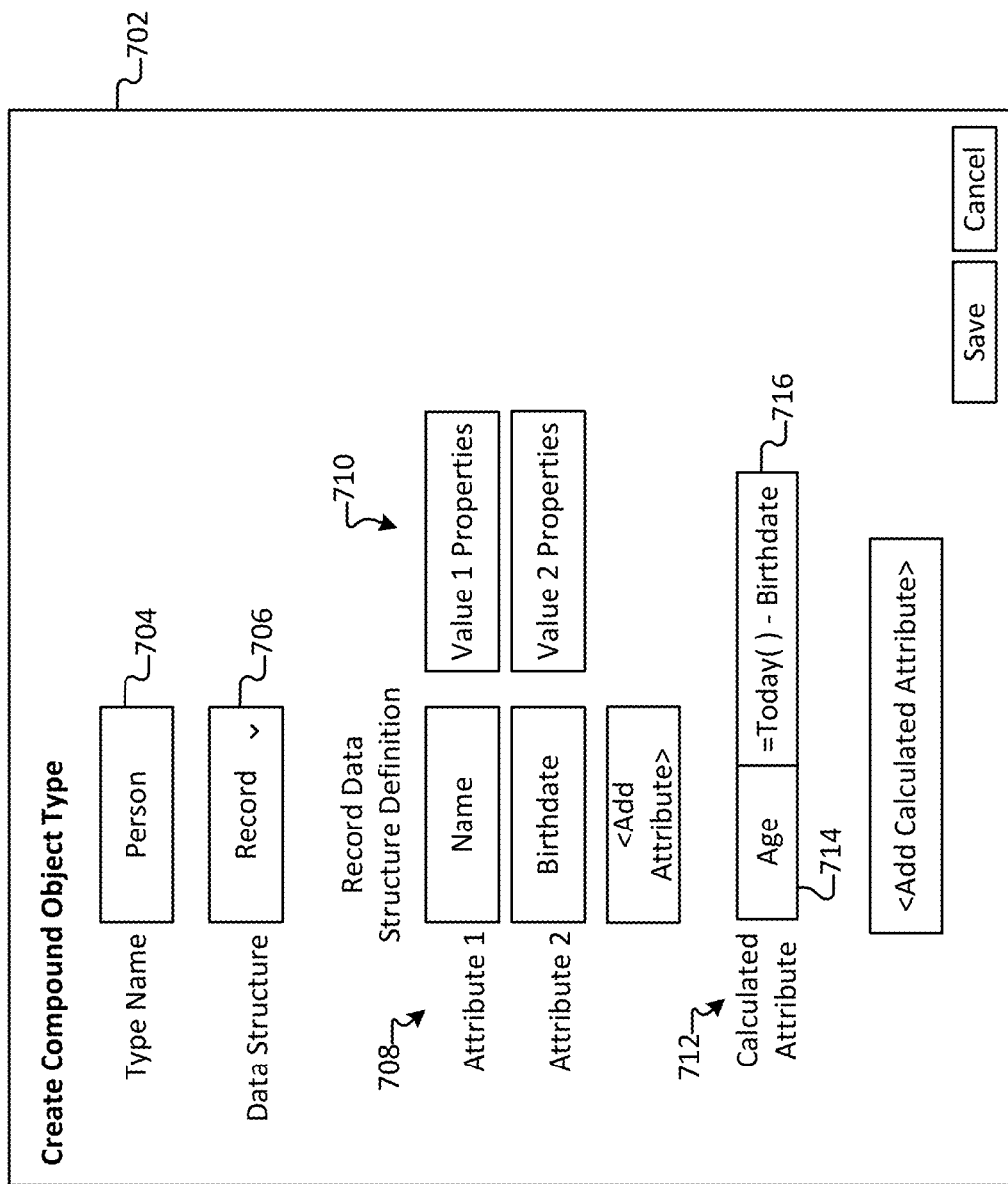
FIG. 7A illustrates an example embodiment in which calculated fields are defined in the schema of a compound object type.
Figure 7B:
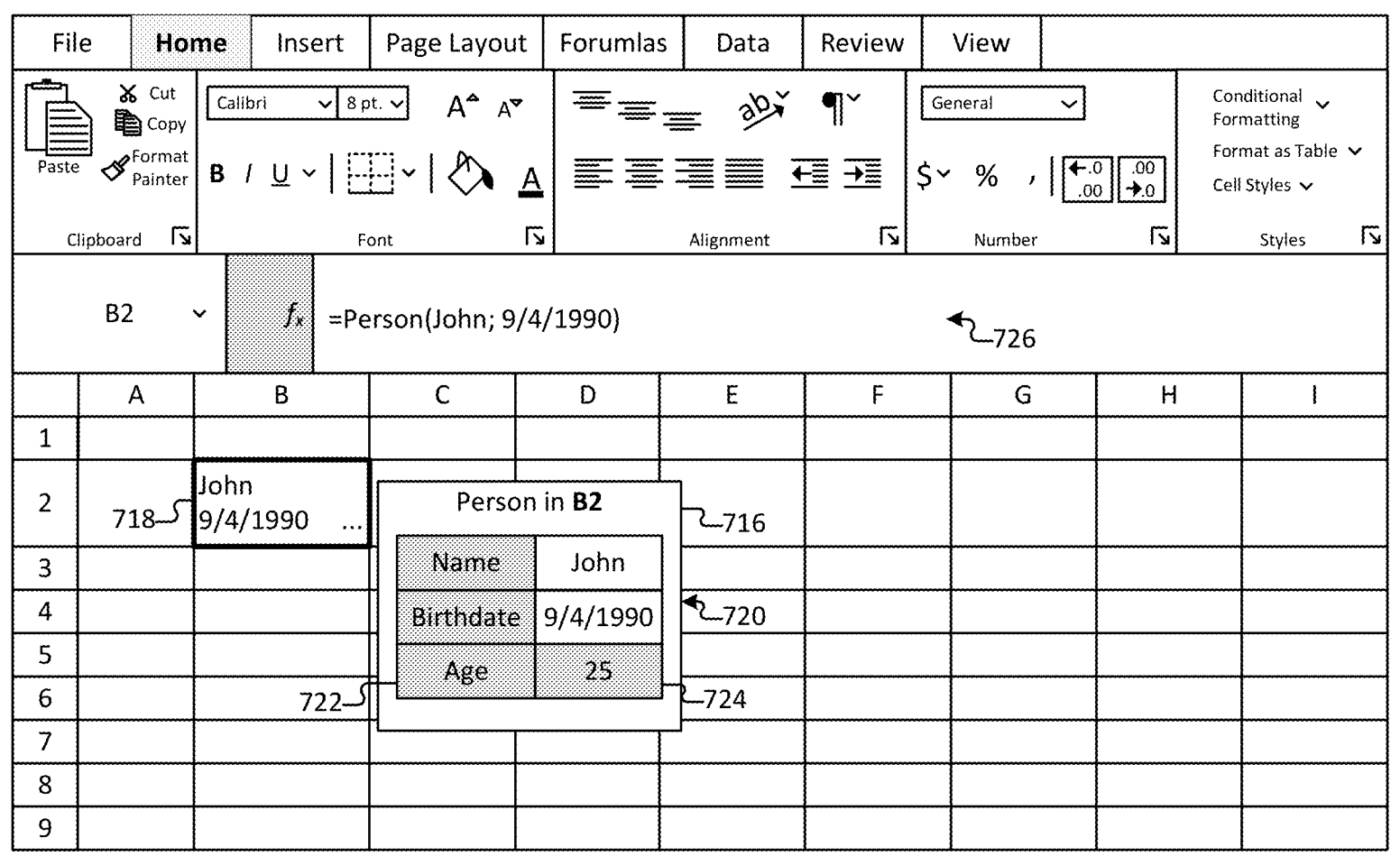
Figure 7C:
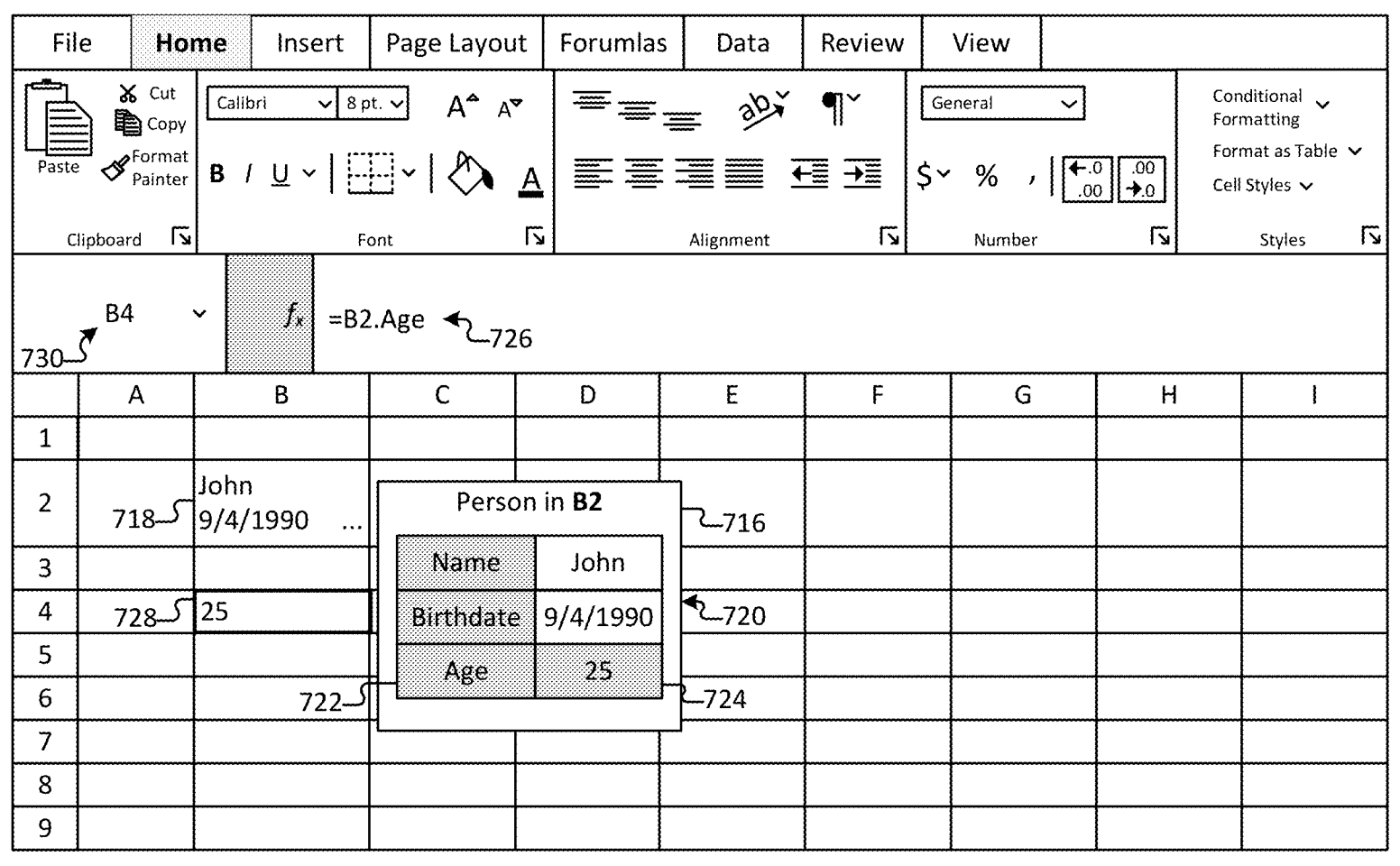

FIGS. 7A-7C illustrate defining and referencing calculated fields.

FIG. 7A illustrates an example embodiment in which calculated fields are defined in the schema of a compound object type.

Aspects of the present disclosure provide the ability to define a calculated field of a compound object type. As described herein, a compound object type is a structural definition of a compound object that can be reused or shared and is expressed by a schema. A schema identifies the data structure by which the values are organized (e.g., record, vector, matrix, table, array, or other data structure) and properties of the compound object (e.g., types of values to be received, a particular pattern by which values are received, cell and card views, validation rules, behavior of the compound object in calculations, etc.). The schema may also define a calculated field. A calculated field refers to an equation that defines a value. In some embodiments, one or more parameters of the equation may be dependent upon one or more values stored in the compound object, one or more values stored elsewhere on the spreadsheet, including within other compound objects, or any combination thereof. In embodiments, the calculated value can be referenced and used in other calculations.

Referring back to FIG. 7A, illustrated is an example schema editor card 702 that is used to create a compound object type, which defines the structure and compound object properties. In this example, the schema editor card 702 is used to create a compound object type 704 named "Person." Also in this example, the schema editor card 702 provides the option to select, from a drop down menu, a data structure 706. In this example, the record data structure is selected. In this example, based on the selection of the record data structure, the schema editor card 702 is updated to include attribute information 708. More specifically, attribute information 708 includes an identification of each attribute (e.g., "Name" and "Birthdate") added to the schema. Also provided is a value properties user interface 710 to specify properties of expected values corresponding to each attribute.

In this example, the editable schema editor card 702 further includes a calculated attribute field 712. As described herein, a calculated field refers to an equation that defines a value. In some embodiments, one or more parameters of the equation may be dependent upon one or more values stored in the compound object, one or more values stored elsewhere on the spreadsheet, including within other compound objects, or any combination thereof. The example calculated attribute field 712 includes the calculated attribute 714 (e.g., "Age"), which is defined by equation 716 (e.g., "=Today( )−Birthdate"). The equation 716 references a formula (e.g., "Today( )") denoting the current date and the value associated with an attribute (e.g., "Birthdate") stored within the compound object type 704. Accordingly, the calculated attribute 714 includes a calculated value that is updated over time and also references a value associated with an attribute of the compound object type 704.

FIG. 7B illustrates a compound object including a calculated field as viewed from the card view.

As illustrated, a compound object 716 is stored in cell B2 718. In this example, the compound object 716 uses the Person compound object type 704 as illustrated in FIG. 7A. Accordingly, as illustrated in the card view 720, the compound object 716 is organized according to a record data structure and includes two attributes (e.g., "Name," and "Birthdate") and two corresponding values (e.g., "John," and "Sep. 4, 1990"). Furthermore, the compound object 716 includes a calculated attribute 722 (e.g., "Age") and a corresponding calculated value 724 (e.g., "25"). As illustrated and described with reference to FIG. 7A, a calculated attribute is an attribute whose value is defined by the result of an equation. Furthermore, one or more parameters of the equation may be dependent on one or more values of the compound object, values stored outside the compound object, or any combination thereof. In this example embodiment, the calculated value 724 displays the resultant value (e.g., "25") of the calculation and is defined by equation 716 (e.g., "=Today ( )-Birthdate") as illustrated in the example of FIG. 7A. As further illustrated in this example, the "Name," "Birthdate," and "Age" attributes are displayed in the card view 720 as being a different shade than the corresponding values, thereby indicating that these values are not editable as they are part of a named schema (e.g., the schema of the "Person" compound object type defined in FIG. 7A). Furthermore, the calculated value 724 associated with the "Age" calculated attribute 722 is also shaded differently to indicate this value cannot be edited. However, this value may be automatically updated, for example, based on the age of the person increasing on the person's birthday.

As is also illustrated in this example, the compound object formula 726 is defined as, "=Person(John; Sep. 4, 1990)" and does not include the attributes "Name," "Birthdate," and "Age" because they are part of the named schema definition and are not editable values. Furthermore, in this example, because the calculated attribute 722 is calculated automatically, the calculated value 724 also does not appear in the compound object formula 726.

FIG. 7C illustrates a compound object including a calculated attribute that can be referenced.

Continuing the example illustrated in FIG. 7A and FIG. 7B, the compound object 716 is stored in cell B2 718, and includes two attributes (e.g., "Name," and "Birthdate") and two corresponding values (e.g., "John," and "Sep. 4, 1990"). Furthermore, the compound object 716 includes a calculated attribute 722 (e.g., "Age") and a corresponding calculated value 724 (e.g., "25"). In this example, the formula 726 represented as "=B2.Age" references the calculated attribute 722 (e.g., "Age") of the compound object 716 stored in cell B2 718. The result of the formula 726 references the calculated value 724 associated with the calculated attribute 722. The result is to be stored in cell B4 728 as indicated by the cell identifier 730. Accordingly, the calculated value 724 (e.g., "25") referenced by the formula 726 is to be stored and displayed in cell B4 728.

Figure 8A:
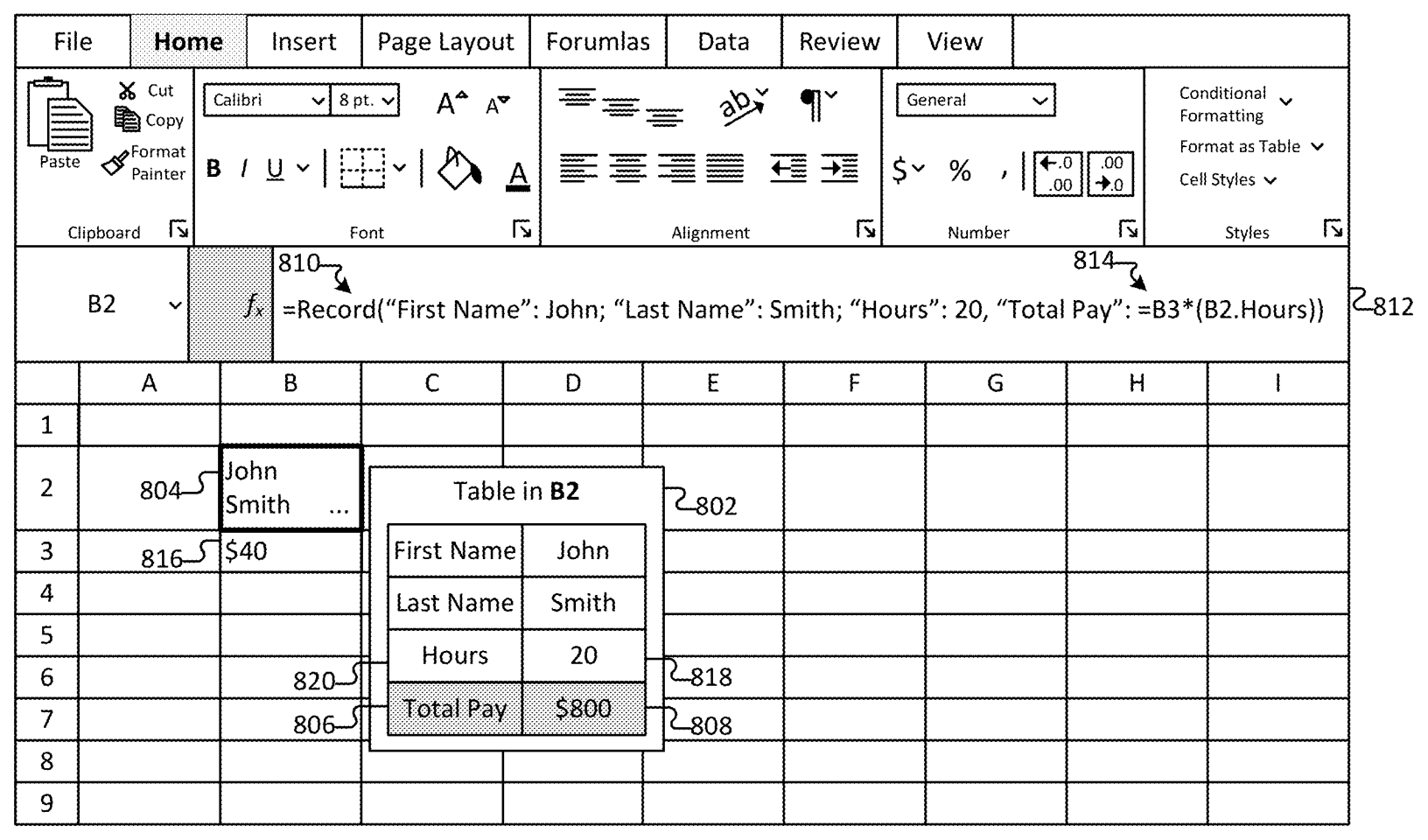
Figure 8B:
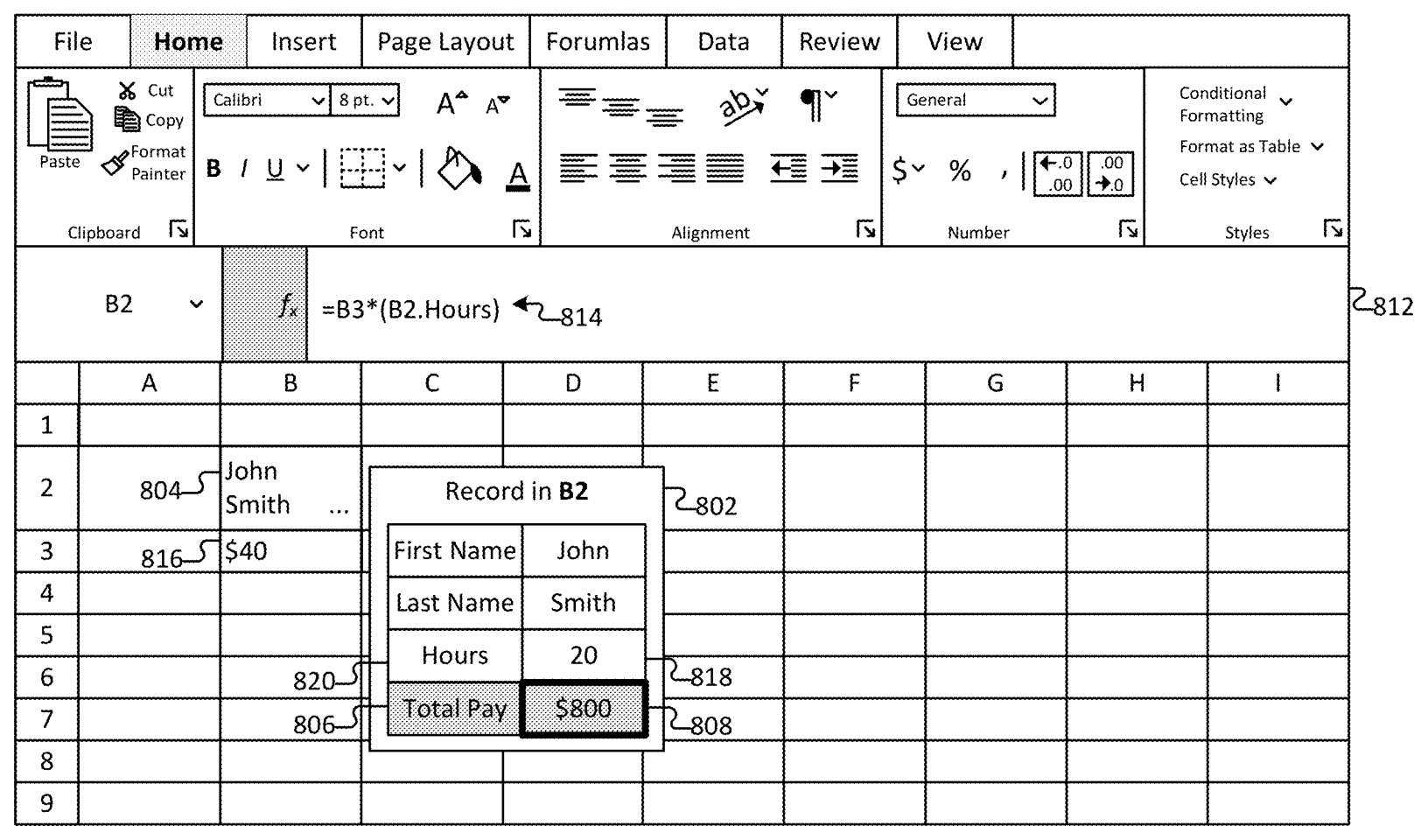

FIGS. 8A and 8B illustrate focusing on selected parts of the formula definition of a compound object.

FIG. 8A illustrates an example embodiment in which a referenced part of the compound object is focused in the formula definition.

As described herein, a compound object can be defined by a formula. In this example, the compound object 802 is stored in cell 804 and is organized according to a record data structure includes four attributes (e.g., "First Name," "Last Name," "Hours," and "Total Pay") and four corresponding values (e.g., "John," "Smith," "20," and "$800"). In this embodiment, the "Total Pay" attribute 806 is a calculated attribute having a corresponding calculated value 808 (e.g., "$800"). As described herein, a calculated attribute is an attribute whose value is defined by the result of an equation. Furthermore, one or more parameters of the equation may be dependent on one or more values of the compound object, values stored outside the compound object, or any combination thereof. In this example, the compound object formula 810 displayed in the formula bar 812 is represented as "=Record("First Name": John; "Last Name": Smith; "Hours": 20, "Total Pay": =B3*(B2.Hours)." As illustrated, the "Total Pay" calculated attribute 806 is defined in formula 810 as a calculated value, which is a formula 814 represented as "=B3*(B2.Hours)." This example formula 814 is a product of the value stored in cell B3 816 (e.g., "$40") and the value 818 (e.g., "20") associated with the "Hours" attribute 820 of the compound object 802. Accordingly, the result of the calculated value 808 is $800 (e.g., $40*20). Although a particular syntax is provided for formula 810 and formula 814, it is understood that aspects of the present disclosure are not limited to this particular syntax and any suitable formula syntax may alternatively be used (e.g., the formula "=B3*@Hours" may alternatively be used). As illustrated, formula 810 defining the compound object 802 in its entirety can be extensive and can easily become complex with additional values, calculated values, and even nested values. Accordingly, aspects of the present disclosure provide focused referencing to more easily identify relevant aspects of the formula, as will be described with reference to FIG. 8B.

FIG. 8B illustrates an example embodiment in which a referenced part of the compound object is focused in the formula definition.

In an example embodiment, based on a selection of an attribute or a value of the compound object, aspects disclose displaying the selected attribute or value in the formula bar.

As illustrated in FIG. 8A, the compound object 802 is defined by formula 810, which is represented as "=Record ("First Name": John; "Last Name": Smith; "Hours": 20, "Total Pay": =B3*(B2.Hours)." In the example illustrated in FIG. 8B, based on a selection of the calculated value 808 (e.g., "$800"), the corresponding formula 814 (e.g., "=B3* (B2.Hours)"), which is a subpart of formula 810, is displayed in the formula bar 812. In other embodiments, the values referenced in the formula 814 may also be highlighted. For example, cell B3 816 and the value 818 corresponding to the attribute "B2.Hours" may be highlighted to provide further context to the user regarding the values used in the formula.

Compound objects, which are also defined by a formula may become quite extensive, complex, and difficult to read. Accordingly, the disclosed focused referencing enables users to more easily identify the relevant aspects of the formula. Users may therefore easily edit the formula without requiring an understanding of complex formulaic language.

Figure 9A:
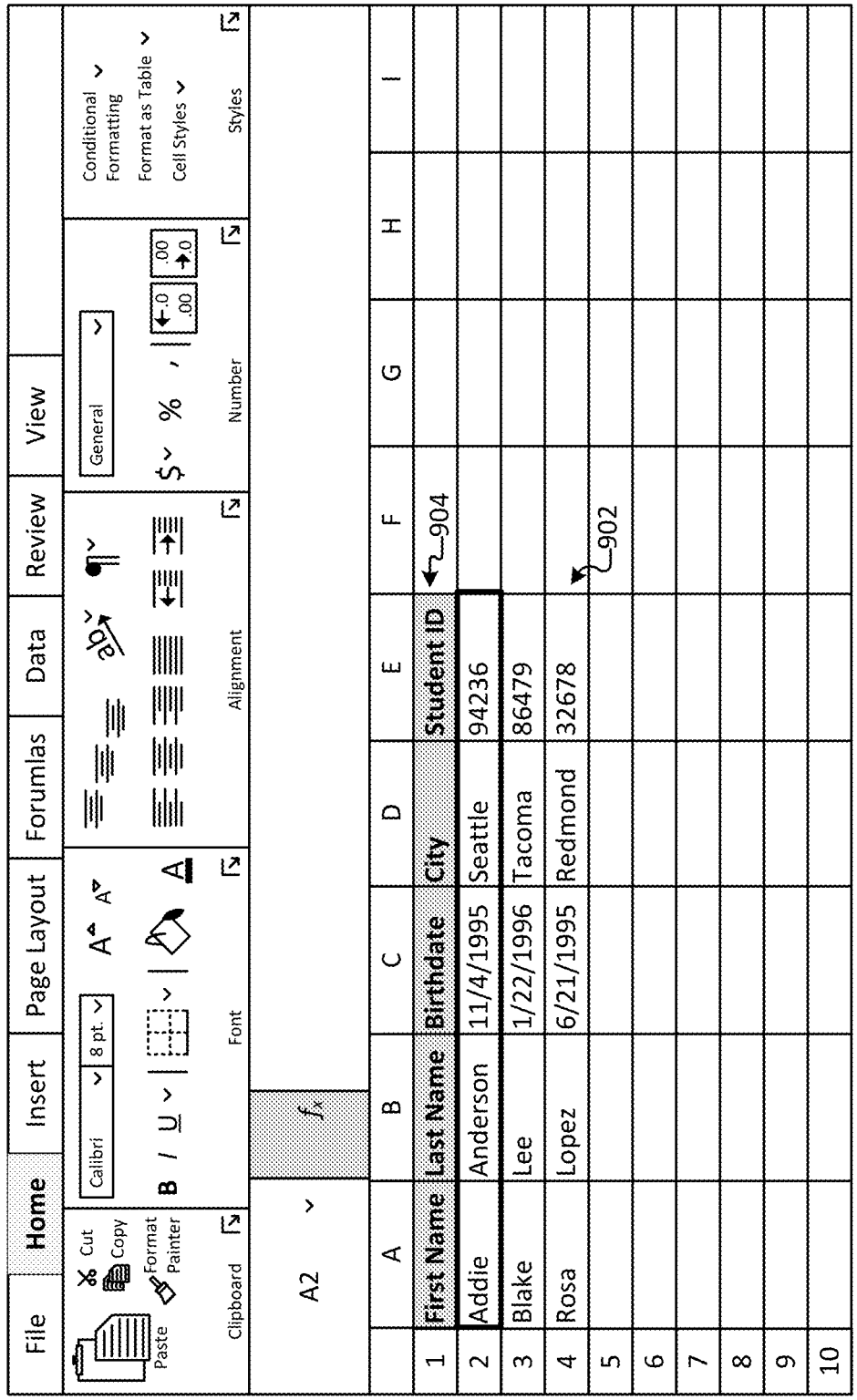
FIG. 9A illustrates an example embodiment in which values stored in multiple cells of a row or a column can be collapsed into a compound object stored in a single cell.
Figure 9B:
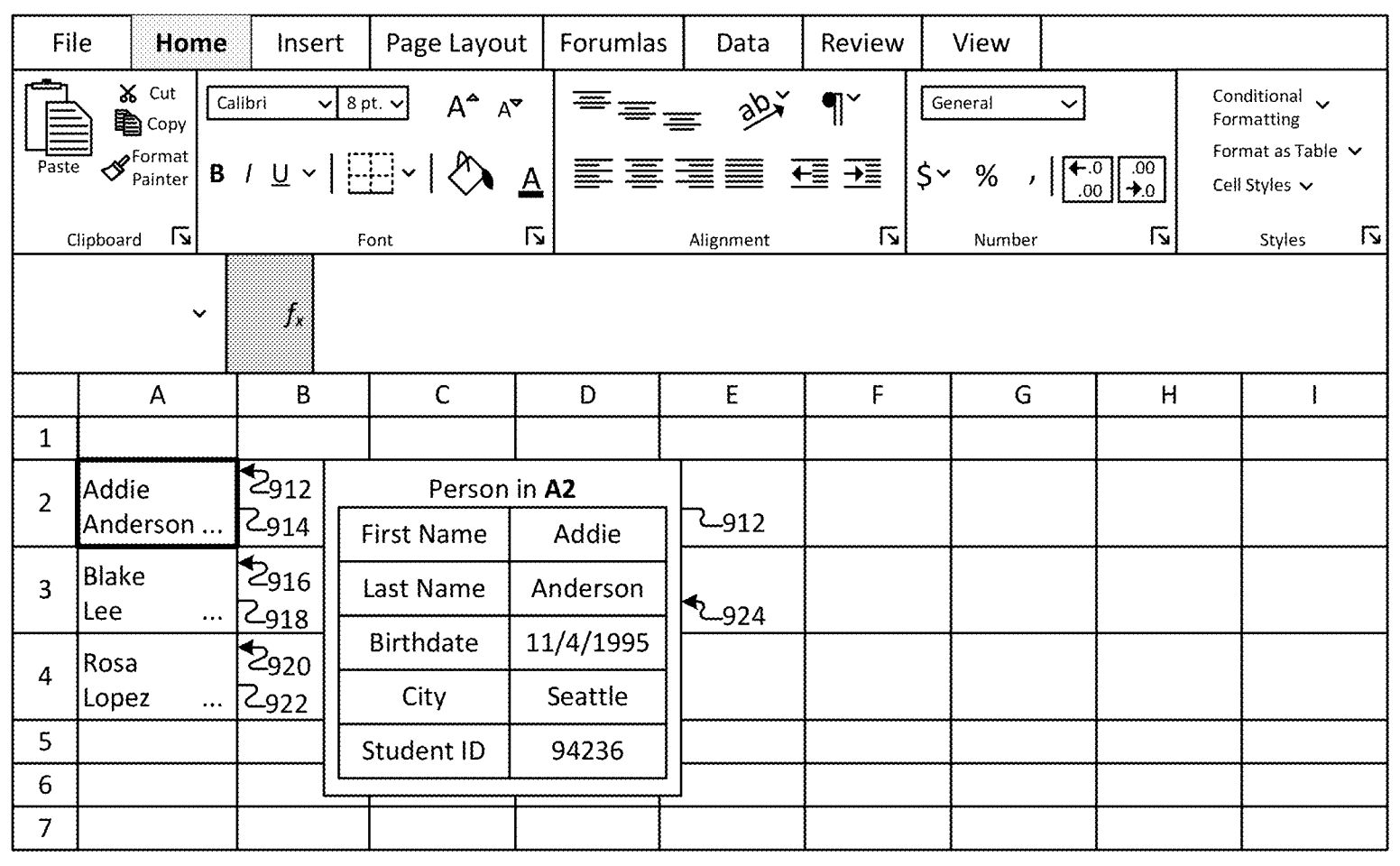

FIG. 9A and FIG. 9B illustrate collapsing values into a compound object stored in a single cell and spilling values over multiple cells.

FIG. 9A illustrates an example embodiment in which values stored in multiple cells of a row or a column can be collapsed into a compound object stored in a single cell.

As illustrated, multiple values 902 are stored in individual cells across several rows of a spreadsheet (e.g., cells A2-E2 of row 2; cells A3-E3 of row 3; cells A4-E4 of row 4). The example further illustrates a header row 904 in which header values are stored in individual cells across a row of the spreadsheet (e.g., cells A1-E1 of row 1). As illustrated, each row represents a person having multiple elements that are each characterized by the respective header value. As described herein, compound objects store multiple values in a single cell, wherein the multiple values may be related values. Thus, each row, which represents multiple related values of a person, can be represented as a single compound object stored in a single cell.

Additionally, as will be described in further detail herein with reference to FIG. 9B, compound objects can be spilled into the spreadsheet grid, for example, to view the contents stored therein, or for editing.

As described herein with reference to FIGS. 4A-4D and FIGS. 5A-5C, compound objects can be created through a formula definition or an editable card view. In the example illustrated in FIG. 9A, values are stored in multiple cells of a spreadsheet. Aspects of the present disclosure further provide the ability to collapse pre-existent values stored in multiple cells of a spreadsheet into a compound object stored in a single cell.

In some example embodiments, collapsing multiple values across multiple cells into a compound object may be performed through a user interface in which a user may specify the particular cell or cells storing values to be collapsed into the compound object, header information (if any), and a data structure by which the values are to be organized. In another example embodiment, collapsing multiple values across multiple cells into a compound object may be performed through the selection of one or more cells, for example by highlighting such cells, and selecting a "create compound object" option. In such embodiments, the cells may be quickly and efficiently collapsed as a compound object stored in a single cell. Cells corresponding to header values may also be similarly selected, either simultaneously with the selection of the cells storing the values or at a different time. In embodiments in which a header row or column is selected as, for example, attribute information or header information, the user may further choose whether to delete that header row or column from the spreadsheet. In some embodiments, the user may not wish to delete the header row or column because that information is still relevant to other values of the spreadsheet. In some embodiments, the spreadsheet application may apply a pre-defined structure based on, for example, identification of one or more header values. However, in embodiments in which no header values are present, the user may specify the data structure by which the values are to be stored. In other embodiments, a default data structure is used.

FIG. 9B illustrates an example embodiment in which the values stored in multiple cells of a row or a column are collapsed into a compound object stored in a single cell.

As illustrated and described with reference to FIG. 9A, each row of cells represents a person having several elements (e.g., a first name, a last name, a birthdate, a city, and a student ID) wherein each element is listed in a header row (e.g., header row 904). In the example illustrated in FIG. 9B, each of the three rows of cells (e.g., rows 2-4) is collapsed into a compound object stored in a single cell. Accordingly, three compound objects are illustrated in this example: a first compound object 912 stored in cell A2 914 (corresponding to row 2 of FIG. 9A), a second compound object 916 stored in cell A3 918 (corresponding to row 3 of FIG. 9A), and a third compound object 920 stored in cell A4 922 (corresponding to row 4 of FIG. 9A).

Further illustrated is a card view 924 of the first compound object 912. It is understood that each of the compound objects (e.g., the first compound object 912, the second compound object 914, and the third compound object 916) can also be viewed and edited from a card view, as described herein. Accordingly, each of the created compound objects can fully participate in the compound object features as described throughout this disclosure.

Accordingly, this collapse feature provides for a more compact view of a large amount of data in which multiple values of a compound object can be individually referenced and used in calculations. In some embodiments, collapsing values stored in multiple cells into a compound object stored in a single cell may be temporary or permanent.

Further aspects of the present disclosure provide for the ability to expand or "spill" the values of a compound object to multiple cells. Spilling values of a compound object over multiple cells is, for example, the reverse operation of collapsing values stored in multiple cells into a compound object. In some embodiments, however, the spilling operation may take further factors into consideration. For example, in some embodiments, spilling cells may occur only if there are no obstructions present in the cells to where the compound object would be expanded. Obstructions may be, for example, one or more value-storing cells. In such an example, the spreadsheet may provide an option to overwrite such value-storing cells, shift the value storing cells to an open row or column of cells, or expand the compound object in another open row or column. Shifting a value-storing cell may in turn shift other cells as well. The action might be performed using a user interface or via a function. A function may be defined as, for example, "=SPILL(A1, B1:B6)." Such an example spill function identifies the cell storing the compound object (e.g., cell A1) and the range of cells (e.g., cells B1:B6) to where the values are to be spilled. Spilling enables bulk editing, including, for example, search/replace, data entry and fill-down, and flash-fill, thereby providing rapid control of multiple objects' values.

In some embodiments, spilling a compound object to multiple cells may be permanent or temporary. For permanent spilling, each of the values may be stored in individual cells and the compound object definition deleted. Yet in other embodiments, the compound object definition could be saved such that the cells could be reverted back to the compound object at some other time. For temporary spilling, the spilled values provide a visual representation of each of the values and the corresponding data structure of the compound object while the compound object definition remains intact. In some embodiments, temporary spilling of a compound object also provides the ability to edit the one or more values in individual cells.

In some embodiments, spilling the values and headers of a compound object to multiple cells may be done through an edit mode, a paste special edit mode, dragging the compound object over multiple cells, or selecting the compound object and selecting a spill option. In some embodiments, only some of the values and headers are spilled, and in other embodiments, all the attributes and values are spilled.

FIG. 10 illustrates pattern matching an input to a compound object.

In an aspect, the present spreadsheet application can receive one or more values in a single cell or multiple cells and, based on various pattern matching techniques, the spreadsheet application can automatically suggest a compound object within which to store those values. In an example, a user may enter one or more values across a row or column, wherein those values relate to a person (e.g., first name, last name, address, birthdate). Alternatively, those values may be entered in a single cell, for example, by an in-cell edit or using the formula bar. The disclosed spreadsheet application can detect a pattern and suggest a stored compound object type that could be used to store those values. In some embodiments, the spreadsheet application analyzes one or more header values (e.g., column or row header values), values in nearby rows or columns, values in other rows or columns, surrounding information, etc. In other embodiments, spreadsheet application detects schemas used by other people connected to the user (e.g., family, friends, coworkers, etc.).

Alternatively or additionally, the spreadsheet application may suggest labels, headers, or attributes for entered values. For example, if the spreadsheet application detects an entry of a person into a row of cells with no header information, the spreadsheet application may suggest storing those values into a compound object and further, may suggest header values corresponding to each value.

In the example illustrated in FIG. 10, values are stored into rows one and two of the spreadsheet. The first row 1002 is a header row and the second row 1004 stores the corresponding values. The first row 1002 of header values stores the values "Player," "Position," "Year," "Height," and "City." The second row 1004 stores the corresponding values "Desmond Smith," "Soph," "5'11"," and "Detroit, Mich." As described herein, the spreadsheet application may analyze these header values, corresponding values, or surrounding information to detect a pattern that matches a schema of a pre-existing compound object type. As described herein, a schema may express the structural definition of a compound object type, identifying, for example, the structured organization of the data (e.g., record, vector, matrix, table, array, or other data structure) and any properties of the compound object (e.g., numerical values are to be received, a particular pattern in which values are received, etc.). For example, a schema may express the structural definition of a "Person" compound object type or a "Car" compound object type. In this example, the spreadsheet application may detect a "Football Player" compound object type that is stored in memory that would match the values stored across multiple cells of the spreadsheet. The spreadsheet application may also auto-populate the compound object type 1006 with the values such that the user may visually see the values organized in the compound object according to the detected schema of the compound object type.

FIGS. 11-14 and the associated descriptions provide a discussion of a variety of operating environments in which aspects of the disclosure may be practiced. However, the devices and systems illustrated and discussed with respect to FIGS. 10-13 are for purposes of example and illustration and are not limiting of a vast number of computing device configurations that may be utilized for practicing aspects of the disclosure, as described herein.

Figure 11:
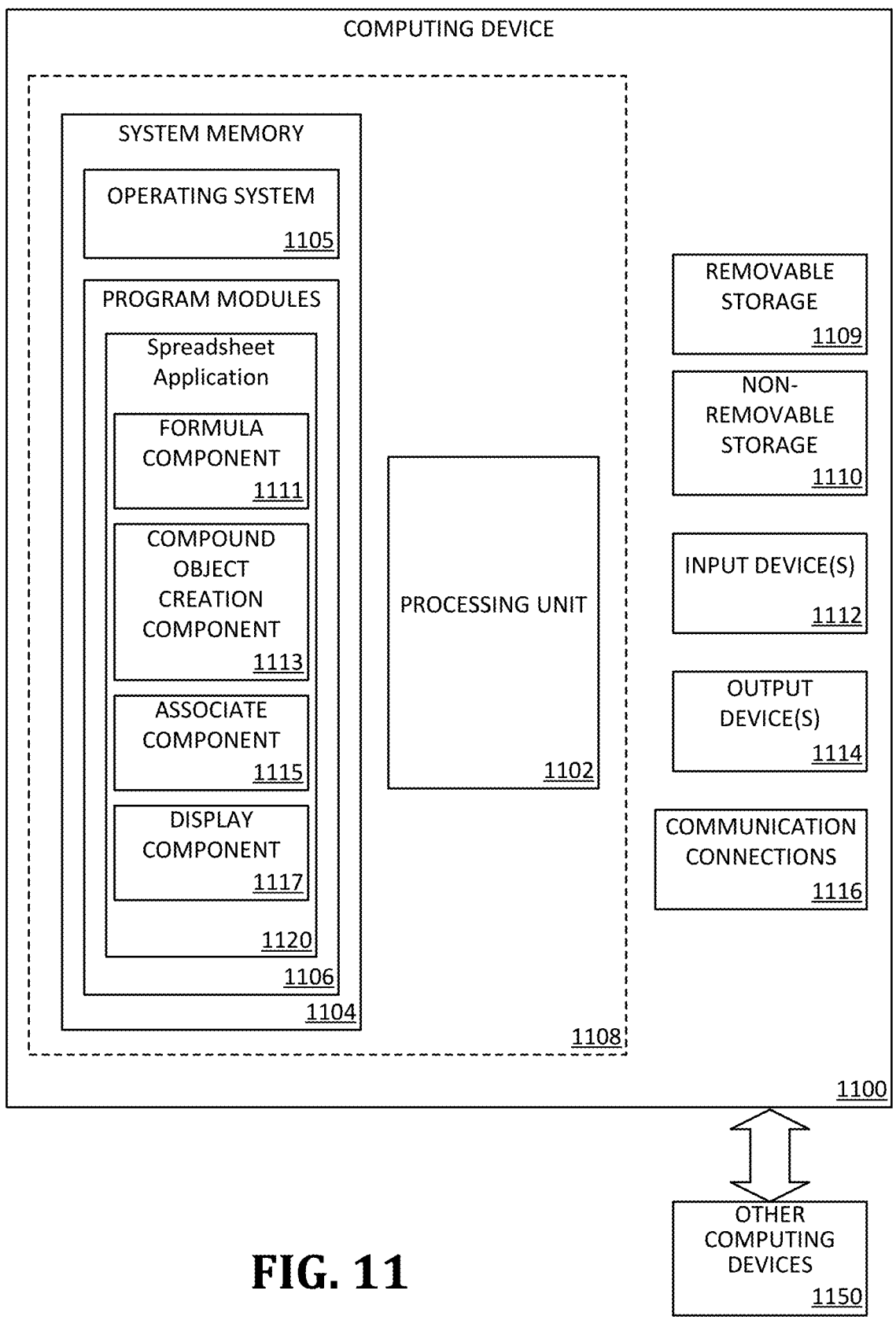
FIG. 11 is a block diagram illustrating physical components of a computing device with which aspects of the disclosure may be practiced.

FIG. 11 is a block diagram illustrating physical components (e.g., hardware) of a computing device 1100 with which aspects of the disclosure may be practiced. The computing device components described below may have computer executable instructions for implementing a spreadsheet application 1120 on a computing device (e.g., server computing device 108 and/or client computing device 104), including computer executable instructions for spreadsheet application 1120 that can be executed to implement the methods disclosed herein. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running spreadsheet application 1120, such as one or more components with regard to FIG. 1 and, in particular, formula component 1111 (e.g., corresponding to formula component 112), compound object creation component 1113 (e.g., corresponding to compound object creation component 114), associate component 1115 (e.g., corresponding to associate component 116), and/or display component 1117 (e.g., corresponding to display component 118).

The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., spreadsheet application 1120) may perform processes including, but not limited to, the aspects, as described herein. Other program modules that may be used in accordance with aspects of the present disclosure, and in particular for implementing compound data objects in a spreadsheet, may include formula component 1111, compound object creation component 1113, associate component 1115, display component 1117, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12A:
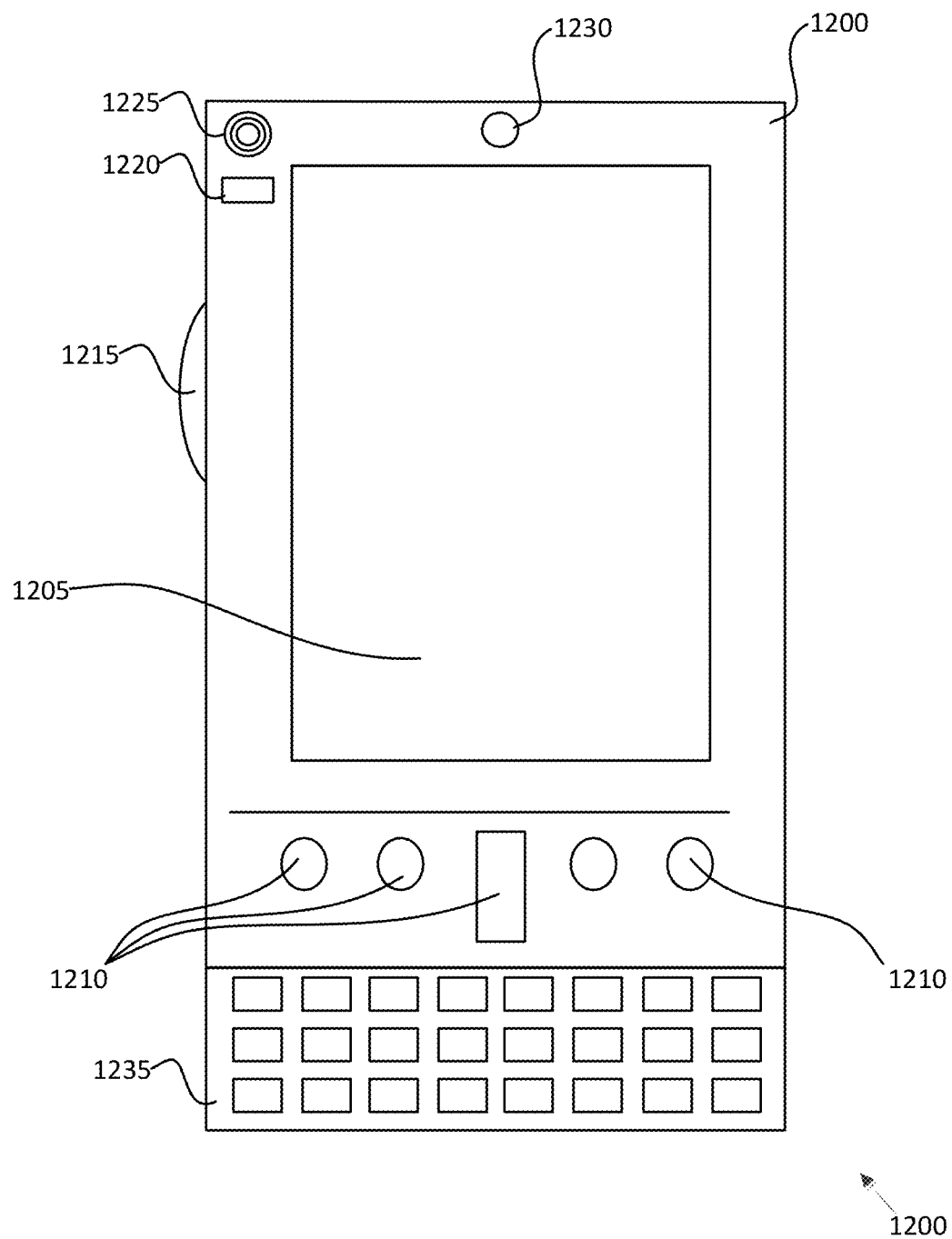
FIGS. 12A and 12B illustrate a mobile computing device, for example, a mobile telephone, a smart phone, wearable computer, a tablet computer, a laptop computer, and the like, with which embodiments of the disclosure may be practiced.
Figure 12B:
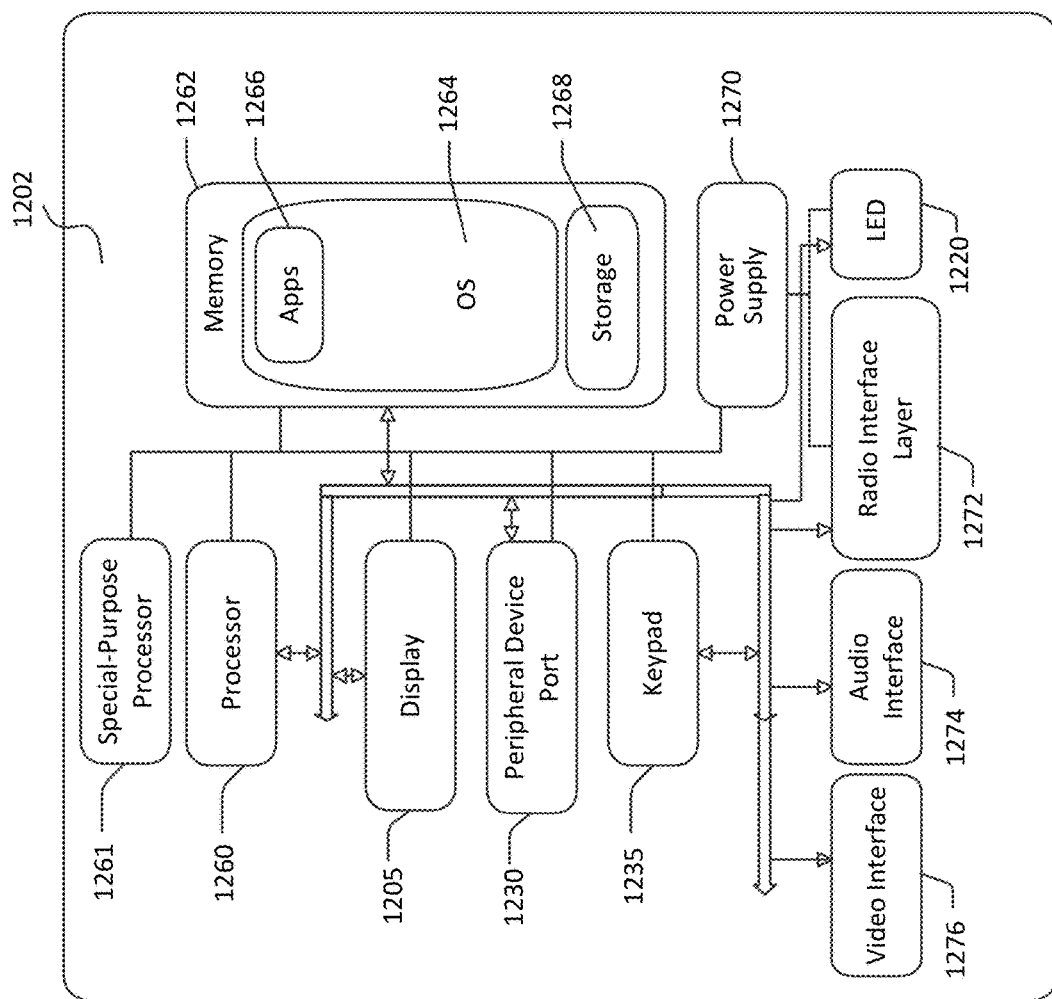

FIGS. 12A and 12B illustrate a mobile computing device 1200, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative aspects, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 1200 can incorporate a system (e.g., an architecture) 1202 to implement some aspects. In one embodiment, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as email or other messages used by an email application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the instructions for associating one or more images with one or more cells of a spreadsheet as described herein (e.g., attribute component, associate component, array component, hybrid component, operation component, and/or UX component, etc.).

The system 1202 has a power supply 1270, which may be implemented as one or more batteries. The power supply 1270 may further include an external power source, such as an AC adapter or a powered docking cradle that supplements or recharges the batteries. The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator 1220 may be used to provide visual notifications, and/or an audio interface 1274 may be used for producing audible notifications via an audio transducer 1225 (e.g., audio transducer 1225 illustrated in FIG. 12A). In the illustrated embodiment, the visual indicator 1220 is a light emitting diode (LED) and the audio transducer 1225 may be a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of peripheral device 1230 (e.g., on-board camera) to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio interface layer 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

As should be appreciated, FIGS. 12A and 12B are described for purposes of illustrating the present methods and systems and is not intended to limit the disclosure to a particular sequence of steps or a particular combination of hardware or software components.

Figure 13:
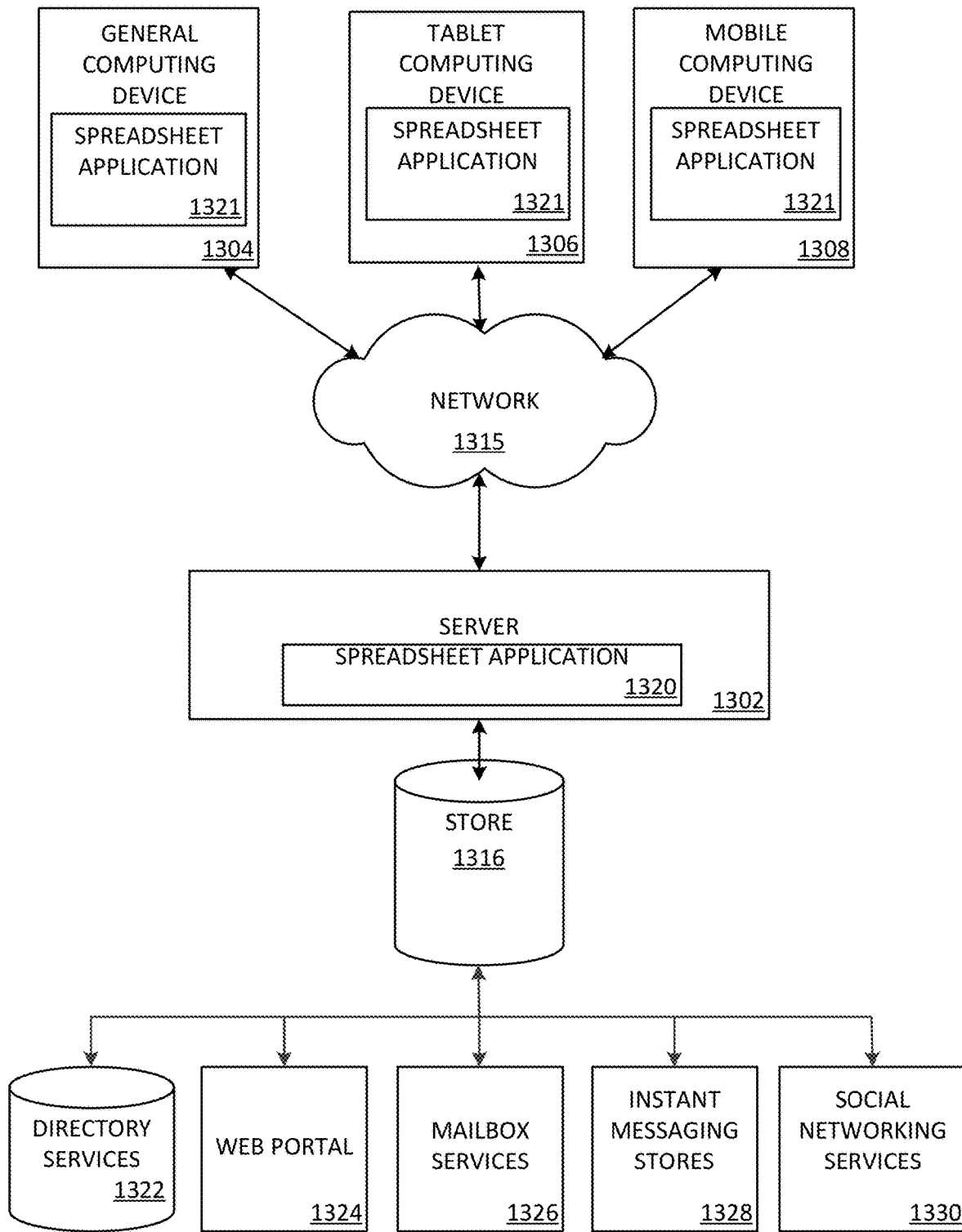
FIG. 13 illustrates one aspect of the architecture of a system for processing data received at a computing system from a remote source, such as a general computing device, tablet computing device, or mobile computing device.

FIG. 13 illustrates one aspect of the architecture of a system for processing data received at a computing system from a remote source, such as a general computing device 1304 (e.g., personal computer), tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking service 1330. The spreadsheet application 1321 may be employed by a client that communicates with server device 1302, and/or the spreadsheet application 1320 may be employed by server device 1302. The server device 1302 may provide data to and from a client computing device such as a general computing device 1304, a tablet computing device 1306 and/or a mobile computing device 1308 (e.g., a smart phone) through a network 1315. By way of example, the computer system described above may be embodied in a general computing device 1304 (e.g., personal computer), a tablet computing device 1306 and/or a mobile computing device 1308 (e.g., a smart phone). Any of these embodiments of the computing devices may obtain content from the store 1316, in addition to receiving graphical data useable to either be pre-processed at a graphic-originating system or post-processed at a receiving computing system.

As should be appreciated, FIG. 13 is described for purposes of illustrating the present methods and systems and is not intended to limit the disclosure to a particular sequence of steps or a particular combination of hardware or software components.

Figure 14:
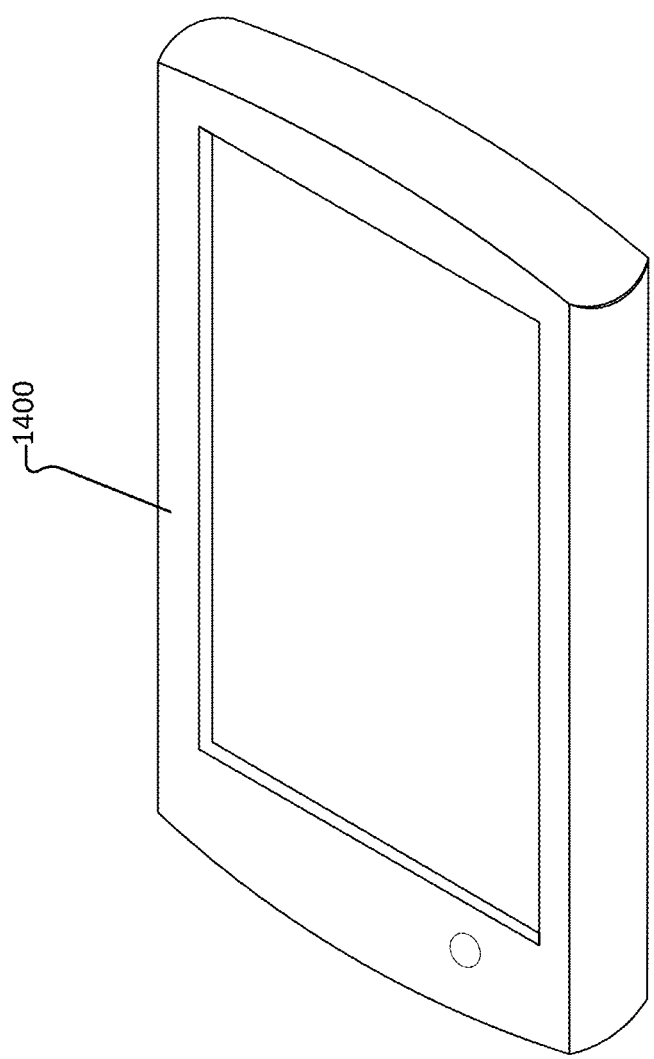
FIG. 14 illustrates an exemplary tablet computing device that may execute one or more aspects disclosed herein.

FIG. 14 illustrates an exemplary tablet computing device 1400 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 14 is described for purposes of illustrating the present methods and systems and is not intended to limit the disclosure to a particular sequence of steps or a particular combination of hardware or software components.

Aspects of the present disclosure, for example, are described above with reference to block diagrams or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for pattern identification associated with an input to a cell of a spreadsheet, comprising:
receive a first value in a first cell;
receive a second value in a second cell;
identify a pattern corresponding to the first value and the second value, wherein the pattern is related to a schema;
based on identification of the pattern, create an object defined by the schema to store the first value and the second value;
associate the object with a third cell; and
enable at least one spreadsheet operation to operate on the first value and the second value of the object associated with the third cell.

2. The method of claim 1, further comprising:
identify a second pattern corresponding to the first value and the second value, wherein the second pattern is related to a second schema; and
provide a prompt to select one of the schema and the second schema.

3. The method of claim 1, wherein identifying the pattern is based on analyzing the first value and the second value.

4. The method of claim 1, wherein a first header value corresponds to the first value and a second header value corresponds to the second value.

5. The method of claim 4, wherein identifying the pattern is based on analyzing the first header value and the second header value.

6. The method of claim 1, wherein identifying the pattern is based on analyzing one or more other values stored in the spreadsheet.

7. The method of claim 6, wherein the one or more other values stored in the spreadsheet are stored in at least one of: an adjacent row and an adjacent column.

8. The method of claim 1, wherein the schema is one of a plurality of schemas stored in a database.

9. A computer-implemented method for pattern identification associated with an input to a cell of a spreadsheet, comprising:
receive a first value in a cell;
receive a second value in the cell;
identify a pattern corresponding to the first value and the second value, wherein the pattern is related to a schema;
based on identification of the pattern, create an object defined by the schema to store the first value and the second value;
associate the object with a third cell; and
enable at least one spreadsheet operation to operate on the first value and the second value of the object associated with the third cell.

10. The method of claim 9, further comprising:
identify a second pattern corresponding to the first value and the second value, wherein the second pattern is related to a second schema; and
provide a prompt to select one of the schema and the second schema.

11. The method of claim 10, further comprising:
in response to receiving a selection of at least one of the schema and the second schema, create a new object storing the first value and the second value organized according to the selected at least one of the schema and the second schema.

12. The method of claim 9, wherein identifying the pattern is based on analyzing the first value and the second value.

13. The method of claim 9, wherein a first attribute corresponds to the first value and a second attribute corresponds to the second value.

14. The method of claim 13, wherein identifying the pattern is based on analyzing the first attribute and the second attribute.

15. The method of claim 9, wherein identifying the pattern is based on analyzing one or more other values stored in the spreadsheet.

16. The method of claim 9, wherein at least one of the first value and the second value comprises:
a string;
a number;
a graph;
a chart; and
an error.

17. A system comprising:
at least one processing unit; and
at least one memory storing computer executable instructions that, when executed by the at least one processing unit, cause the system to perform a method, the method comprising:
receiving a first value in a first cell;
receiving a second value in a second cell;
identifying a pattern corresponding to the first value and the second value, wherein the pattern is related to a schema;
based on identification of the pattern, creating an object defined by the schema to store the first value and the second value, the object including a first attribute associated with the first value and a second attribute associated with the second value;
associating the object with a third cell; and
enabling at least one spreadsheet operation to operate on the first value and the second value of the object associated with the third cell utilizing the first attribute and the second attribute.

18. The method of claim 17, further comprising:
identifying a second pattern corresponding to the first value and the second value, wherein the second pattern is related to a second schema; and
providing a prompt to select one of the schema and the second schema.

19. The method of claim 17, wherein identifying the pattern is based on analyzing the first value and the second value.

20. The method of claim 17, wherein a first header value corresponds to the first value and a second header value corresponds to the second value, the method further comprising:
identifying the pattern is based on analyzing the first header value and the second header value.

* * * * *